United States Patent [19]
Kershaw et al.

[11] Patent Number: 5,513,994
[45] Date of Patent: May 7, 1996

[54] CENTRALIZED SYSTEM AND METHOD FOR ADMINISTERING COMPUTER BASED TESTS

[75] Inventors: Roger C. Kershaw, Hopewell; Frank J. Romano, Yardville, both of N.J.

[73] Assignee: Educational Testing Service, Princeton, N.J.

[21] Appl. No.: 415,757

[22] Filed: Apr. 3, 1995

Related U.S. Application Data

[63] Continuation of Ser. No. 129,473, Sep. 30, 1993, abandoned.
[51] Int. Cl.⁶ .................................................. G09B 3/00
[52] U.S. Cl. .................... 434/350; 434/118; 434/323; 434/362; 364/419.2; 273/430
[58] Field of Search ............................... 434/118, 307 R, 434/308, 322, 323, 327, 347, 350, 353, 362; 364/419.08, 419.19, 419.2; 395/100, 118, 144, 152, 154, 927; 273/429–432

[56] References Cited

U.S. PATENT DOCUMENTS

| | | | |
|---|---|---|---|
| 4,768,087 | 8/1988 | Taub et al. ............................. | 358/84 |
| 5,002,491 | 3/1991 | Abrahamson et al. ................. | 434/322 |
| 5,170,362 | 12/1992 | Greenberg et al. ..................... | 364/550 |
| 5,176,520 | 1/1993 | Hamilton ............................... | 434/350 |
| 5,195,033 | 3/1993 | Samph et al. ....................... | 434/323 X |
| 5,204,813 | 4/1993 | Samph et al. ......................... | 364/419 |
| 5,211,564 | 5/1993 | Martinez et al. ...................... | 434/323 |
| 5,247,670 | 9/1993 | Matsunaga ............................. | 395/650 |
| 5,287,519 | 2/1994 | Dayan et al. .......................... | 395/700 |
| 5,309,564 | 5/1994 | Bradley ................................. | 395/200 |
| 5,318,450 | 6/1994 | Carver .................................. | 434/336 |
| 5,321,611 | 6/1994 | Clark et al. ........................ | 364/419.2 |
| 5,432,932 | 7/1995 | Chen et al. ........................... | 395/650 |
| 5,442,759 | 8/1995 | Chiang et al. ..................... | 434/118 X |

OTHER PUBLICATIONS

*The Integrated Instructional Systems Report;* Feb. 1990; EPIE Institute; Water Mill, NY.
*1992 Computerized Testing Products Catalog;* Assessment Systems Corporation.

*Primary Examiner*—Joe H. Cheng
*Attorney, Agent, or Firm*—Woodcock Washburn Kurtz Mackiewicz & Norris

[57] ABSTRACT

The invention provides a centralized administrative system and method of administering standardized tests to a plurality of examinees. The administrative system according to the present invention is implemented on a central administration workstation and at least one testing workstation located in different rooms at a test center. The administrative system software which provides substantially administrative functions is executed from the central administration workstation. The administrative system software which provides functions carried out in connection with a testing session are executed from the testing workstations.

20 Claims, 14 Drawing Sheets

CENTRAL ADMIN STATION b1.35

| NAME | CHECKED IN? | SKS ID: | PROGRAM | STATION |
|---|---|---|---|---|
| MILLER, JANE | YES | 00000000000003652 | NCLEX | 0004 |
| WHEELER, LINDA | NO | 00000000000003682 | FAA DE | 0001 |

[START SERVICE] [MORE INFO...] [CANCEL]

*FIG. 10A*

EXAMINEE CONFIRMATION

YOUR TESTING SESSION IS ABOUT TO START.

IS THE INFORMATION BELOW CORRECT?

IF THE INFORMATION IS NOT CORRECT, PLEASE CONTACT THE CENTER STAFF NOW.

INSERT PHOTO HERE

TEST: NCLEX PN

NAME: LINDA SMITH

JURISDICTION: NEW YORK PN

PRESS THE ENTER KEY IF CORRECT.

*FIG. 12*

CENTRALIZED SYSTEM AND METHOD FOR ADMINISTERING COMPUTER BASED TESTS

This is a continuation of application Ser. No. 08/129,473, filed Sep. 30, 1993, now abandoned.

BACKGROUND

The recent availability of a computer based testing system such as that described in co-pending application no. 08/082,058 has substantially automated the entire process of standardized testing. A typical standardized testing arrangement using a computer based testing system is shown in FIG. 1. A central processing facility 1 provides the software development to support the computer based testing system and post processing activities. For instance, one test program such as a GRE (General Record Examination) may be developed, produced and packaged at the central processing facility 1. The computer based test is then transferred to one or more test centers 2. Each test center 2 has at least one computer workstation 3 on which the computer based test can be delivered to an examinee.

Examinees typically register to take a particular computer based test at which time the examinee schedules an appointment to take that test at a specified test center 2. When the examinee arrives at a test center 2 to take the test according to his or her appointment, a test administrator typically confirms the examinee's appointment and initiates the test. After an examinee has taken the test the examinee responses and other information recorded during the testing session are transferred to the central processing facility 1 for post processing, i.e., for statistical and analytical studies used in the development of new tests.

In contrast to classroom tests which are usually given to a small number of students and are scored by one person familiar with the activities of the students and conditions in the classroom during a testing session, standardized tests may be given to thousands of examinees at literally hundreds of test centers on different days and at different times. Thus, in a standardized testing environment it is crucial to be able to track conditions at a test center, such as problems with the hardware or software or power outages which may effect examinees' testing sessions. Additionally, when a test is not given at the same time and same place for all or most examinees it is necessary to provide additional security measures for maintaining the security and integrity of the computer based tests and any related test data including examinee responses. Therefore, the computer based testing system provides an administrative system to implement these functions.

Unfortunately, the administrative system and the test delivery system (which is the software that delivers the computer based test to the examinee and records examinee responses) reside together on a computer workstation 3 at a test center 2 shown in FIG. 1. Therefore, an administrator must perform many the administrative tasks on the computer workstation 3 prohibiting the use of the computer workstation 3 for testing. Moreover, most test centers 2 will provide a single testing room wherein the computer workstation 3 will be set up for computer based testing since it is usually logistically impractical to provide a private room for each computer workstation 3. Therefore, when each examinee arrives to take his or her scheduled test, the administrator must necessarily bring the examinee into the testing room where other examinees may be currently taking a computer based test, to check-in the examinee when he or she arrives, check the examinee's identification, capture the examinee's image if required, and initiate the test according to the examinee's appointment data. Such activities may be disruptive to other examinees taking a test particularly where the test includes timing constraints often required by standardized tests.

Furthermore, unexpected events occur at the testing center to which the administrator must quickly respond. For example, an examinee may call to make an appointment while the administrator is attending to a different administrative function. The administrator must be able to respond to the phone call without losing the work in progress. Computer based testing systems currently do not permit test administrators to quickly switch from one function to another in order to respond to events as they occur.

Furthermore, computer based testing systems currently do not permit different test developers to produce tests deliverable by the administrative systems provided as part of computer based testing system. For instance, Educational Testing Service develops, produces, and packages computer based GREs (Graduate Requirement Examination). An independent testing service, such as Sylvam Kee Systems (SKS), provides the scheduling and registration, the test centers, and the administrators at the test centers. The computer based testing system includes a test production system, a test delivery system, and a test administration system. Examples of such system are described in co-pending application Ser. No. 08/082,038 filed on Jun. 22, 1993 which is incorporated by reference herein. Testing services such as SKS, however, are currently unable to interface computer based tests produced by different entities without each entity providing a separate administrative system to perform the administrative functions discussed above.

Furthermore, computer based testing systems do not contain a feature that allows new tests to be added, old tests deleted, tests to be enabled or disabled, or ancillary system functions to be added, enabled or disabled easily, particularly if the administrative system is in operation.

Therefore, there is a need to provide a versatile and flexible administrative system on a workstation dedicated to administrative functions.

SUMMARY OF THE INVENTION

The present invention fulfills this need by providing a centralized administrative system and method for administering computer based tests. The system according to the present invention is configured in software to provide a start-up procedure for initializing a central administration workstation and to display a main menu on the central administration workstation display. The system also provides a start of day subsystem to receive an update of the scheduled tests in the form of appointment data and to start-up at least one testing workstation on which the scheduled tests will be delivered to an examinee. A start test subsystem comprising start service and general station administration modules generate a job info file and a job data file which are used to invoke and execute the computer based test are also provided. A check-in subsystem is utilized by an administrator to verify each examinee's identity and appointment data and to provide the administrative system with an indication that the examinee has arrived and is ready to take the scheduled computer based test. A close of day subsystem is also provided to transfer any records generated while the administrative system is operating to an independent data center. A communications manager is preferably provided to transmit and receive data between the test centers and the independent data centers.

The centralized administrative system according to the present invention is preferably implemented at a test center at which one central administration workstation, one file server and at least one testing workstation are provided. The central administration workstation is preferably configured to execute an administrative kernel, a start of day procedure, a start service procedure and a central station administration procedure. In combination these procedures permit the administrator to carry out start of day, close of day, check-in, maintenance, start service, restart service, and center message transfer functions. The testing workstation invokes a test delivery application which initiates and controls the testing session. The testing workstation is configured to execute a testing kernel and a testing station administration procedure. In a preferred embodiment the file server provides the only memory for the central administration workstation and the testing workstations.

The method according to the invention is carried out by first invoking the administrative system by logging onto a central administration workstation using a unique login ID. Then an input of appointment data identifying each examinee scheduled to take a test at the test center over some specified period of time is received by the adminstrative system. The administrator then verifies the appointment data associated with each examinee when the examinee arrives at the test center to take a test. At that time, the administrator provides an indication to the administrative system that the examinee is ready for testing. The examinee is then escorted to one of the testing workstations located in a testing room remote from the location of the central administration workstation. The administrative system then initiates the delivery of the standardized test to the examinee on the testing workstation. During the testing session, the examinee's responses are preferably recorded in an examinee performance file and subsequently transmitted to an appropriate post processing system so that the responses can be scored.

BRIEF DESCRIPTION OF THE DRAWINGS

The present invention will be better understood, and its numerous objects and advantages will become apparent by reference to the following detailed description of the invention when taken in conjunction with the following drawings, in which:

FIG. 10A is an example of a check-in screen displayed by the central administration workstation;

FIG. 12 is an example of an examinee confirmation screen displayed on the testing workstation.

DETAILED DESCRIPTION

Figure 1:
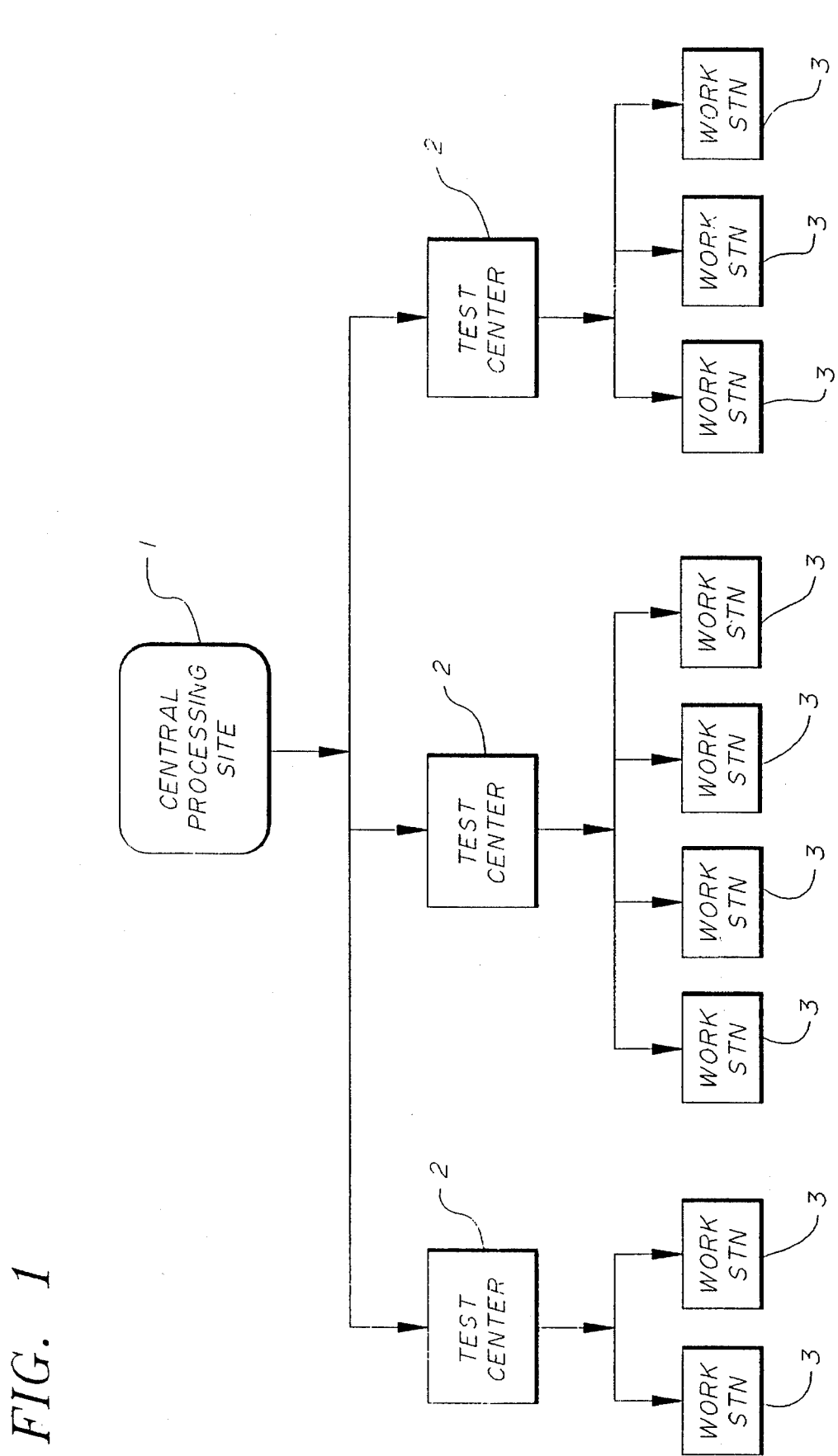
FIG. 1 is a block diagram of a typical computer based testing arrangement.
Figure 2:
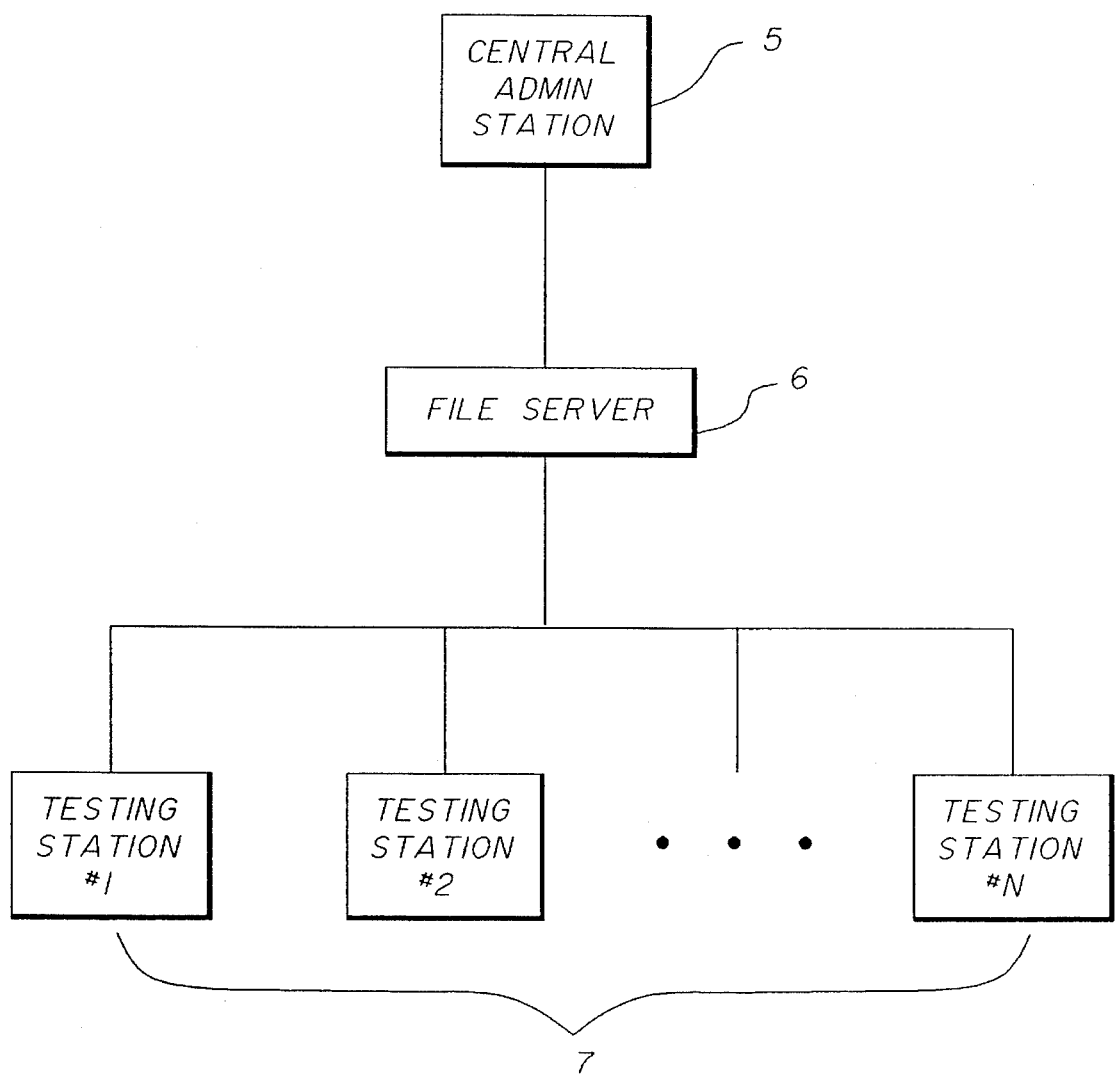
FIG. 2 is a block diagram of the hardware architecture according to a preferred embodiment of the invention.

FIG. 2 is a block diagram of the basic hardware architecture of a preferred embodiment of the administrative system at a testing center. As shown in FIG. 2 the hardware comprises one central administration workstation 5, a single file server 6, and one or more testing workstations 7. In a preferred embodiment, the central administration workstation 5 is an IBM PS2/35 having a minimum of 4 MB of RAM, a standard VGA monitor, a standard mouse, a 1.44 MB floppy drive and a Zoom 9600 baud V.32/V.42 modem with MNP for communications. The testing workstations 7, in this preferred embodiment are identically configured, namely, an IBM PS2/35 having a minimum of 4 MB of RAM, and a standard VGA monitor and a standard mouse. Testing workstations 7 preferably have no floppy drive so that unauthorized persons cannot copy information onto the file server 6 or copy data or files from the file server 6.

In this preferred embodiment, the file server 6 is an IBM PS2/57SX having a minimum of 8 MB of RAM, a floppy disk drive, an internal tape backup unit and a monochrome monitor. The central administration workstation 5 and the testing workstations 7 are connected via EtherNet to the file server 6, which preferably serves as the only permanent disk storage for the workstations to secure the files and data from unauthorized access or manipulation. It should be understood, however, that other compatible hardware can be used.

The Central Administration Workstation 5 is typically located outside the testing room and is used, for example, for the following purposes:

to perform system start up and shut down procedures;

to schedule appointments;

to check-in arriving examinees;

to start a test for an examinee at a designated testing station;

to restart a test after a testing workstation or general administrative system failure;

to provide routine system functions such as adding new administrators, changing the access rights of others, etc.;

to send pending files and transactions to an independent data center; and to receive files and transactions for distribution to various software components.

Typically the testing workstations 7 are located inside the testing room. Preferably no central administration workstation features are provided on a testing workstation 7. A testing workstation 7, for example, provides the following functions:

Start a testing session;

End a testing session; and

Interrupt an in-progress testing session via command from the central administration workstation.

Figure 3:
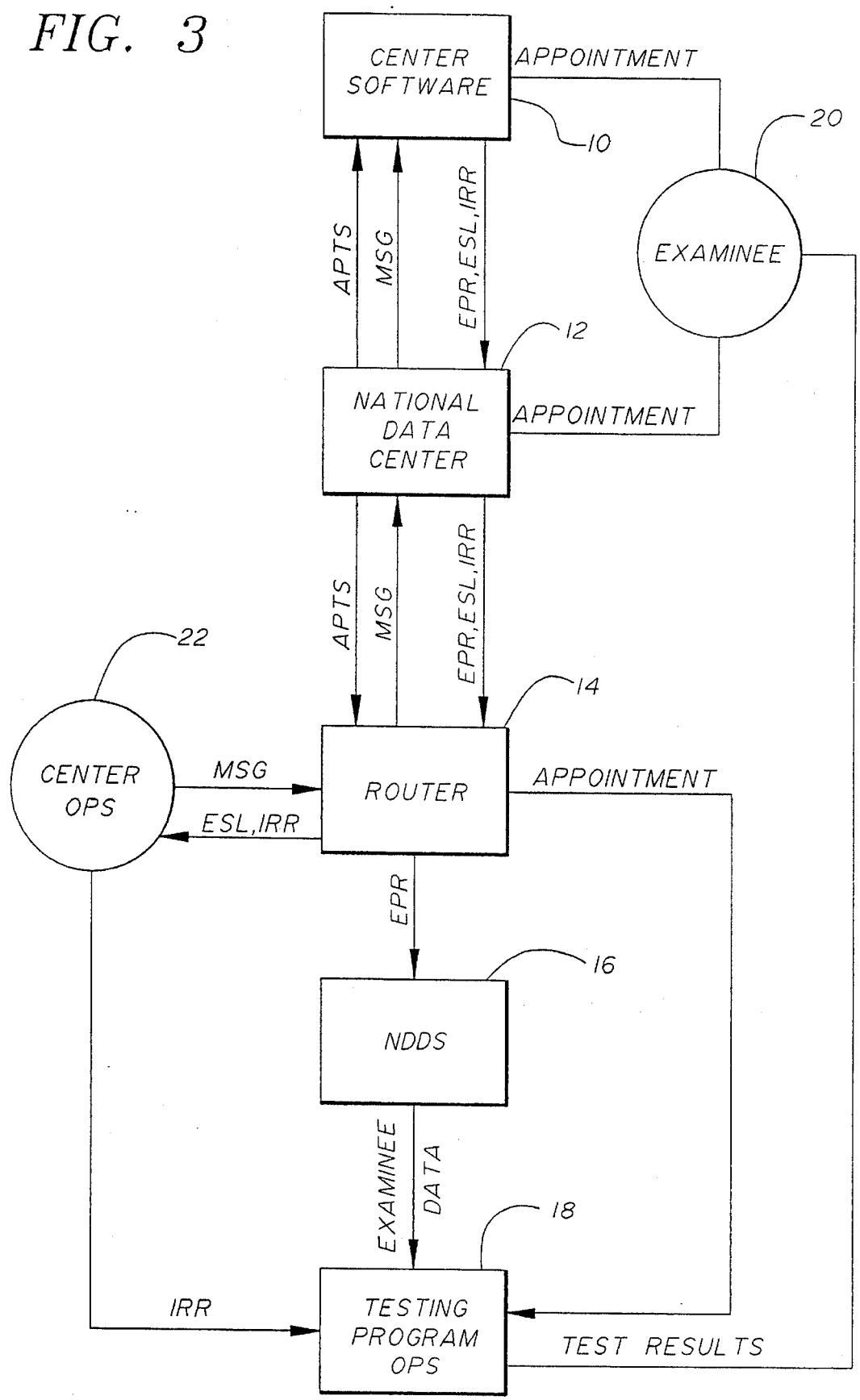
FIG. 3 is a block diagram showing one implementation of the administrative system within the computer based testing system according to a preferred embodiment of the present invention.

FIG. 3 is a block diagram showing an implementation of the administrative system 10 and its interfaces in a computer based testing system. When an examinee 20 registers to take a test, the independent data center 12 schedules the examinee to take a selected test at a predetermined test center at a specified time on a specified date. Independent data center 12 is managed by an independent testing service such as SKS. Information identifying the examinee 20 and the examinee's schedule arrangements are defined as the examinee's appointment data and are stored in a database at the independent data center 12.

In a preferred embodiment, a test center administrator will start-up the administrative system 10 on the test center's central administration workstation each day before invoking any testing sessions. During the central administration workstation start-up procedure, the independent data center 12 provides the appointment data to the administrative system 10 as shown in FIG. 3. Alternatively, an on-line registration and scheduling system (not shown) may be provided on the central administration workstation so that an examinee 20 may walk in to a test center and register prior to taking a test. The appointment data would be generated by the registration and scheduling system and provided to the administrative system 10 and the administrative system 10 would transmit the appointment data to the independent data center 12 to be stored in an appropriate database.

During a testing session, examinee performance records (EPR) are created for recording the examinee's activities while taking the test, e.g., the examinee's responses to the questions presented by the computer based test during the testing session. Event security log (ESL) records are also preferably generated each day. The ESLs would record information related to the security of the computer based system and tests such as the identity of the administrator who invoked the administrative system start-up procedure and the name of each administrator who initiated a testing session. Examples of the format and contents of EPRs and ESLs may be found in co-pending application Ser. No. 08/082,038. Additionally, in preferred embodiments irregularity report records (IRR) are generated to report any problems an examinee may have during a testing session with the equipment or problems related to conditions at the testing center during the test session, e.g., the testing room being too hot.

The EPRs, ESLs, and IRRs are transmitted to the independent data center 12 which provides them to a router 14. Router 14 then separates the records depending upon the record type. The EPRs are transferred to an appropriate Network Data Distribution System (NDDS) 16 which formats each EPR for scoring according to a testing-program specific format. An example of a NDDS and a description of this formatting procedure are described in co-pending application 08/082,038. The ESLs and IRRs are transferred to an operations center 22 so that equipment and security problems at the test center can be monitored. For example, daily activity reports can be generated from these records as described in co-pending application Ser. No. 08/082,038.

Testing program operations 18 scores the examinee responses and generates a score report for the examinee 20. The scoring system parameters depend upon the specific testing program, e.g., GRE, etc. Testing program operations 18 in a preferred embodiment receives IRR information from the operations center 22 so that examinees' score reports can reflect any security or equipment problems identified at the test center during each examinee's testing session.

In a more preferred embodiment, the administrative system 10 is configured to receive on-line messages from either the operations center 22 or the independent data center 12 as shown in FIG. 3. Such an on-line message capability permits real-time instructions to be sent to an administrator at a test center in the event of equipment failure or security problems.

Figure 4:
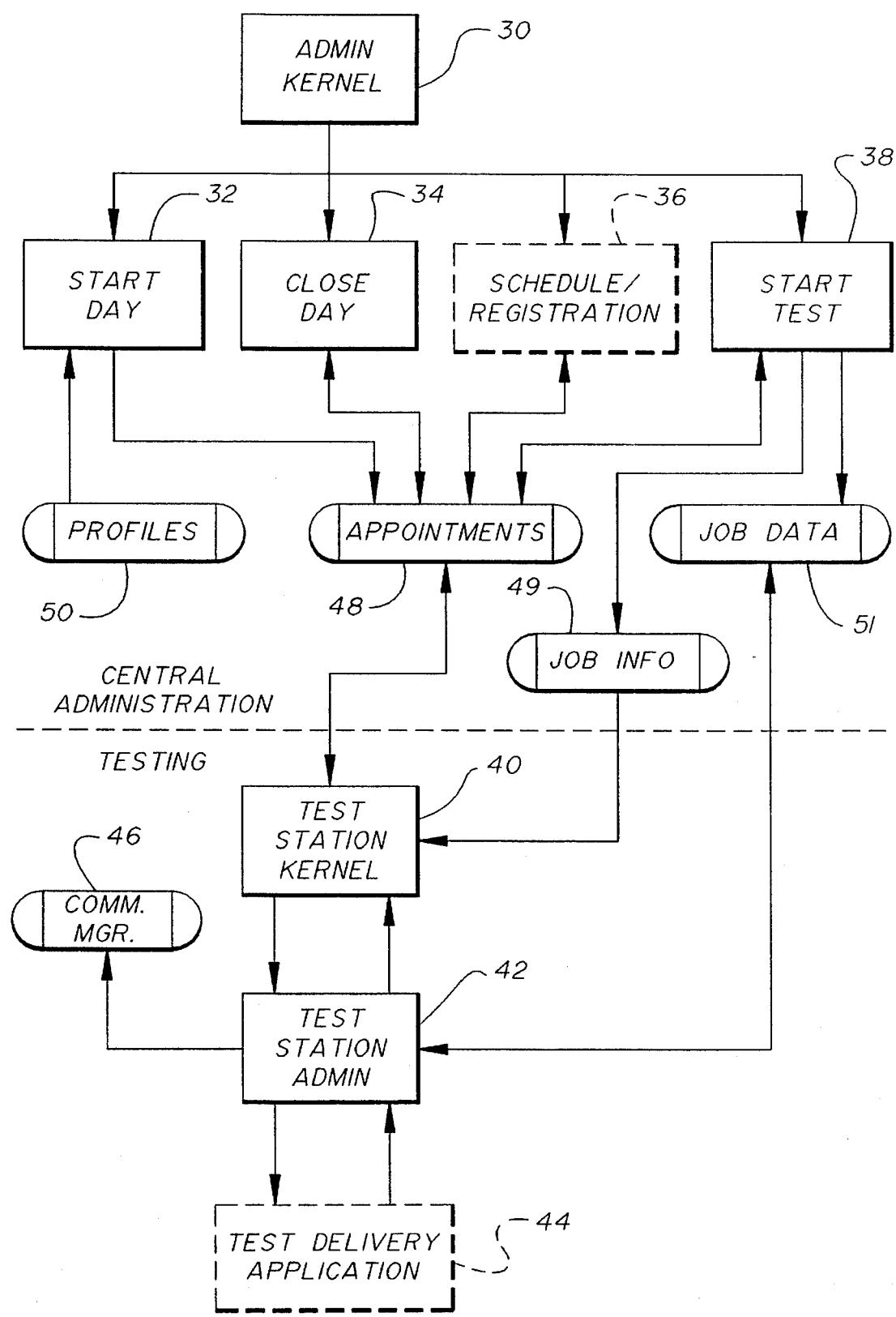
FIG. 4 is a block diagram of the software architecture according to a preferred embodiment of the present invention.

The administrative system architecture according to a preferred embodiment of the present invention is shown in FIG. 4. The administrative system architecture includes several subsystems which are run on either the central administration workstation or on each of the testing workstations. As indicated in FIG. 4, the Administrative Kernel 30, the start-of-day (SOD) subsystem 32, the close-of-day (COD) subsystem 34, and the start test subsystem 38 are run on the central administration workstation. The Test Station Kernel 40 and the Test Station Administration subsystem 42 are run on the testing workstations.

The Administrative Kernel 30 is executed by the central administration workstation's operating system as a result of the administrator starting the system. The following are examples of some of the functions it provides:

displays the system menu and executes programs associated with menu items;

displays messages for the system administrator which originate from the independent data center or operations center;

provides virus scan detection;

automatically runs the Close of Day (to be described in detail below) procedure if the system is left unattended overnight; and provides access security via login to prevent unauthorized access to menu items.

The start-of-day (SOD) subsystem 32 is a generic title given to a program that is run as part of the system start-up procedure. Programs that carry out available administrative system functions are stored as profiles 50 on the file server at each testing center as required by the independent data center. The format of the profiles may include several fields including a field used to identify those function which are to be executed during the administrative system start-up procedure. One exemplary format for the profiles 50 is described in Appendix A. The SOD subsystem 32 checks the profiles to determine which functions are to be run when the administrative system is started. The SOD subsystem 32 also preferably down loads the appointment data from the independent data center.

The Close-of-Day (COD) subsystem 34 is preferably run before the administrative system is shutdown. It uploads the status of each appointment to the independent data center.

The scheduling/registration module 36 shown in FIG. 4 provides the ability to schedule a test, check-in an examinee, cancel a scheduled test and perform other similar tasks. It is preferably customized for the a particular test program or the particular testing service (e.g., SKS) which administers the computer based tests. Therefore, the scheduling/registration module 36 is preferably provided by the test producer or testing service. Consequently, the administrative system according to a preferred embodiment of the present invention does not include a scheduling/registration module 36 as indicated by the dashed lines in FIG. 4 but includes interfaces to the scheduling/registration module 36. However, it should be understood that a suitable scheduling/registration module 36 can be provided by the administrative system of the present invention.

The start test subsystem 38 consists of two software modules. The Start Service module, which displays the list of examinees who have appointments to take a test, and the Central Station Administration module, which is the generic name given to a class of programs that provide testing-program specific features prior to starting a test for a particular examinee.

The features provided depend upon the needs of the testing-program. For example, GRE tests require that a photograph be taken. Therefore, the GRE Central Station Administration preferably checks for the existence of a photograph.

The Start Test subsystem 38 produces the Job Info 49 and Job Data 51 files, which direct the Test Station Kernel 40 and Test Station Administration 42 respectively. The computer based test is available on the testing workstation after the administrator makes a final confirmation of the examinee's identification and appointment data.

The Test Station Kernel 40 is executed by the operating system as a result of the administrator starting the testing workstation. The following are examples of the functions it can provide:

confirm the date and time with the administrator;

allows the administrator to assign a station number to the testing workstation responds to Job Info files 49 from the start service module of the Start Test subsystem 38, which runs on the central administration workstation;

displays a preliminary administrator confirmation screen; and responds to 'Kill Signals' from the central administration workstation, which cause the workstation to shutdown hurriedly—even in the middle of a testing session.

The Test Station Administration 42, is a generic class of software lying between the Test Station Kernel 40 and the Test Delivery Application 44. The functions performed by this component are determined by the needs of the testing program. However, its typical uses are a) to display an examinee confirmation screen, and b) to translate the administrative system data into the Test Delivery Application's standard format. One example of a Test Delivery Application 44 is described in co-pending, application Ser. No. 08/082,038. The Test Delivery Application 44 primary function is to execute the computer based test.

Figure 5:
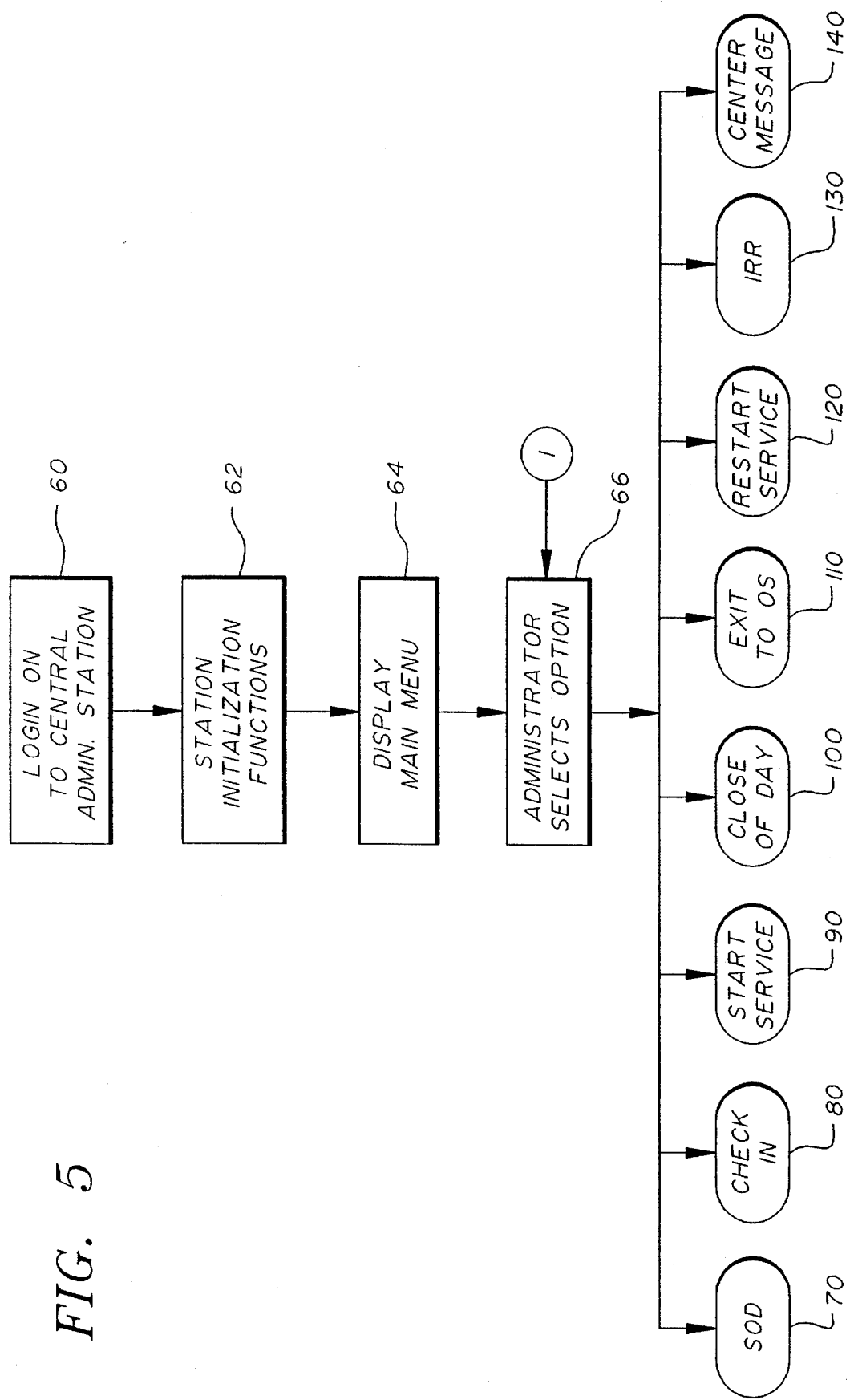
FIG. 5 is a functional flow diagram of the administrative workstation start-up procedure.
Figure 6:
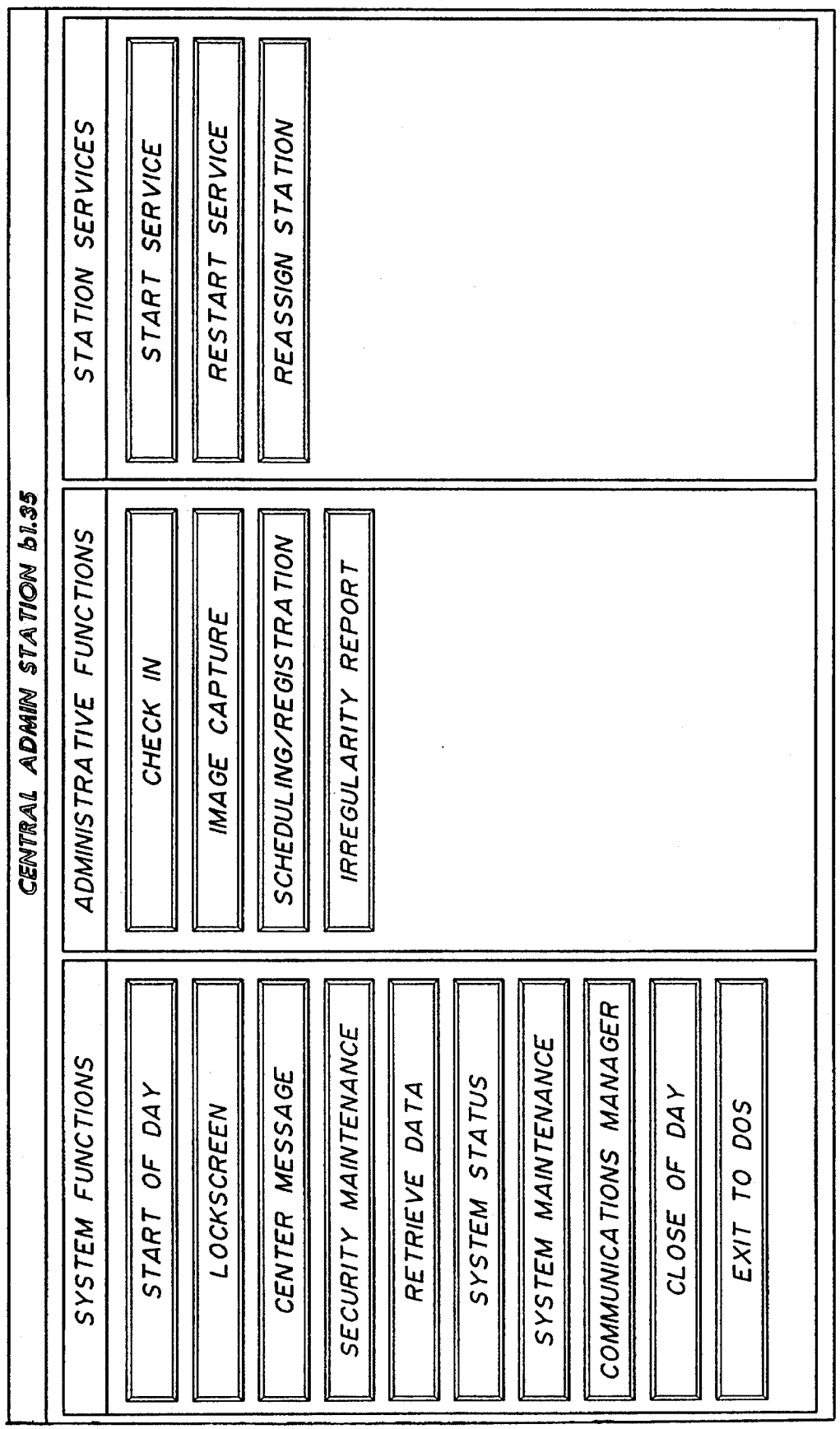
FIG. 6 is an example of the main menu displayed on the central administration workstation display.

FIG. 5 is a functional flow diagram of the administration workstation start-up procedure. The administrator first logs onto the central administration workstation from the operating system using a personal login ID as shown at 60 in FIG. 5. This action invokes the Administrative Kernel. The Administrative Kernel's first task is to perform internal initialization at 62. In a preferred embodiment, the Administrative Kernel then verifies that important software and data files have not been corrupted. This can be done using commercially available virus scan detection software described in co-pending application Ser. No. 08/082,038. When the initialization 62 is complete the main menu shown in FIG. 6 is displayed at 64. The Administrative Kernel then waits for the administrator to select one of the menu options at 66 which include but are not limited to SOD 70, check-in 80, start service 90, COD 100, exit to the operating system 110, restart service 120, IRR 130, and center message 140.

Figure 7:
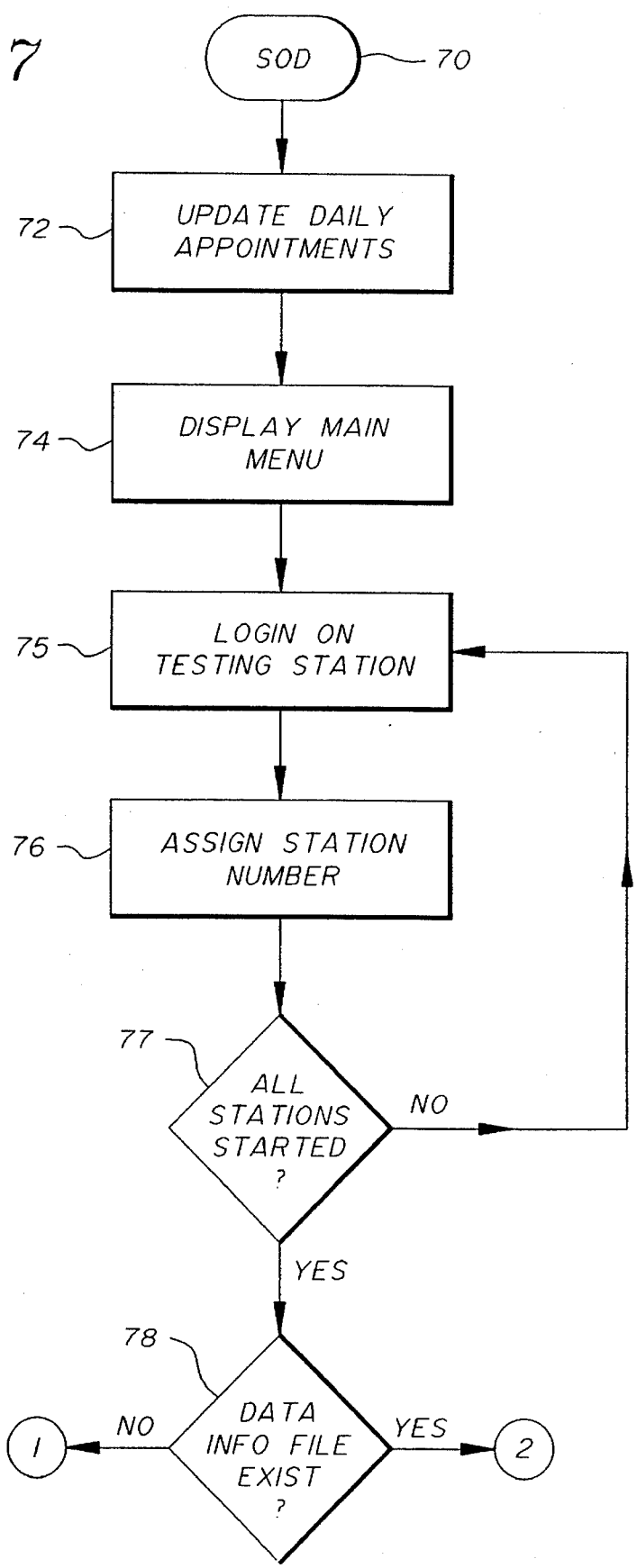
FIG. 7 is a functional flow diagram of the Start of Day administrator procedure.

If it is the start of a day, i.e. the system is not being restarted for instance after a power outage, the administrator will select the SOD option from the main menu at 70. This invokes the SOD administrator procedure which is shown in FIG. 7. The first and primary function of this procedure is to preferably call up the independent data center as shown at 72 to receive the appointment data. In a preferred embodiment, the SOD procedure is performed each day that a test will be given and the appointment data includes substantially all of the appointments for the day. The main menu can then be redisplayed as shown at 74. The SOD procedure and the start-up procedure run on the central administration workstation and are part of the Administrative Kernel. Detailed flowcharts and pseudo code for the Administrative Kernel programs are provided in Appendix B.

The SOD administrator procedure continues at the testing workstations. Next the administrator would enter the testing room and login to each of the testing workstations at 75, one-by-one, preferably using a different login than the login to the central administration workstation. The operating system then automatically executes the Test Station Kernel as a result of the login. As each testing workstation is started, the Test Station Kernel prompts the administrator to verify 35 the date and time and then enter a station number. The station number is checked to ensure that no other testing workstation is assigned the same number as shown at 76. When all of the testing workstations have been assigned a station number as determined at 77, the Test Station Kernel displays an appropriate idle screen and begins polling for a Job Info File as shown at 78. Detailed flowcharts and accompanying pseudo code for the Test Station Kernel programs are provided in Appendix C.

Figure 8:
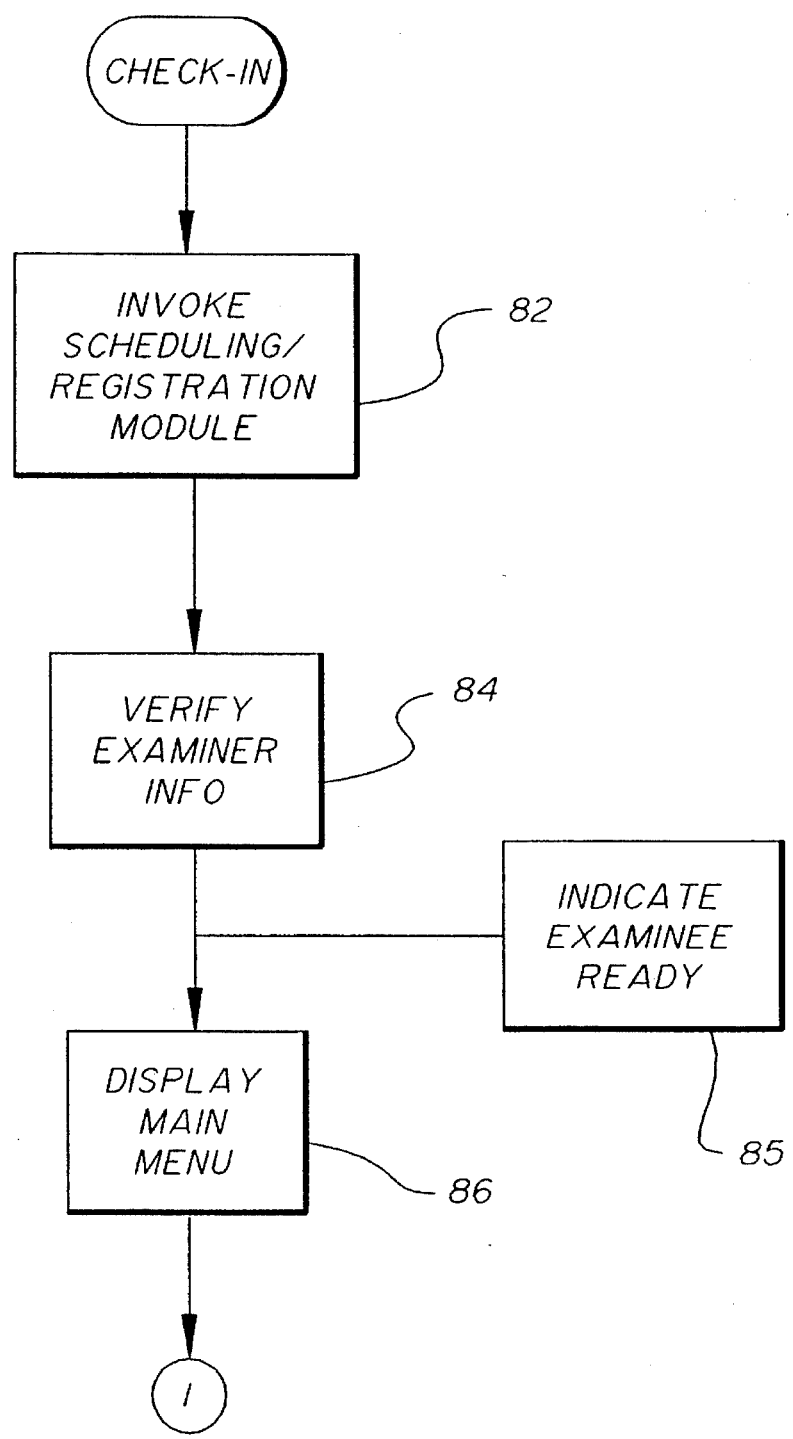
FIG. 8 is a functional flow diagram of the check-in procedure.

When an examinee arrives to take a test, the administrator selects the "Check-in" option from the main menu as indicated at 80 in FIG. 5. A flow diagram of the check-in procedure is shown in FIG. 8. This will invoke a corresponding check-in function of the scheduling/registration module as shown at 82 in FIG. 8. The administrator would then review the appointment data available through the scheduling/registration module with the examinee at 84 and provide an indication that the examinee is ready to take the test at 85. The main menu is then redisplayed at 86 and the Administrative Kernel awaits the next menu selection.

Figure 9:
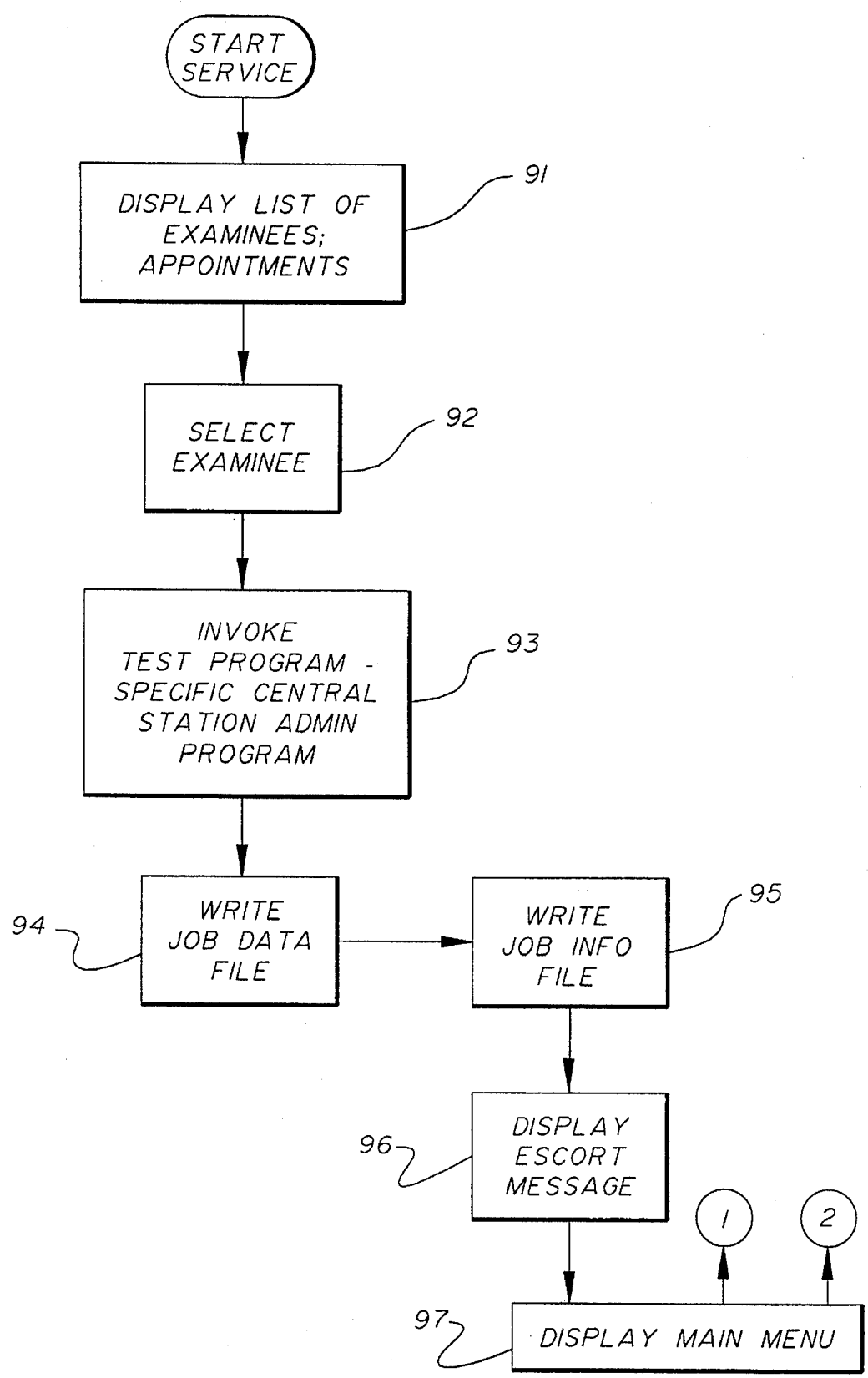
FIG. 9 is a functional flow diagram of the start service procedure.

The next step would be to invoke the "Start Service" option from the main menu as shown at 90 in FIG. 5. A flow diagram of the start service procedure is shown in FIG. 9. The Start Service module displays the list of appointments at 91. The just-checked-in examinee would appear in a list as indicated on the screen shown in FIG. 10 as an example. The administrator selects the examinee from the list at 92. The Start Service module then invokes the Central Station Administration module for the testing-program at 93.

The Central Station Administration module performs any tasks required by the testing-program; for example, determining whether a photograph has been taken and prompting the administrator to take one if necessary, prompting the administrator to review critical identification information, etc. When all information is reviewed and completed, the Central Station Administration module one of the available subtests based upon internal rules and writes a Job Data File containing examinee and test delivery information.

More specifically, the Job Data File contains information required by the Test Delivery Application. Some examples of information contained therein are as follows:

Examinee's name;

Examinee's identification number;

Examinee's date of birth;

Examinee's social security number;

Authorization to test number;

A flag indicating whether this is a restart of a previously started but incomplete test;

A flag indicating the type of restart, if the above flag indicates restart;

A string containing the package name about to be delivered;

The package title (e.g. GRE General Test);

A string that describes where on the disk the package can be found;

A string that describes where on the disk the resulting Examinee Performance Record is to be written;

A count, possibly zero, of the number of dynamically selected testing components to be delivered;

The testing components themselves, if any;

A fully constructed Start Session Record of the Examinee Performance Record;

The Central Station Administration then exits and returns a code to the Start Service module. Detailed flowcharts and accompanying pseudo code are provided in Appendices D and E.

If the return code indicates that the Central Station Administration was successful, the Start Service module writes a Job Info file at 95 for the Test Station Kernel and exits. The Job Info File preferably contains two ASCII lines, a Command Line and an Appointment Number Line. The Command Line is preferably a fully qualified string containing a coldstart/restart indicator, the name of a testing-program, and any arguments it requires. The Appointment Number Line is a string containing the Appointment Number.

Figure 10B:
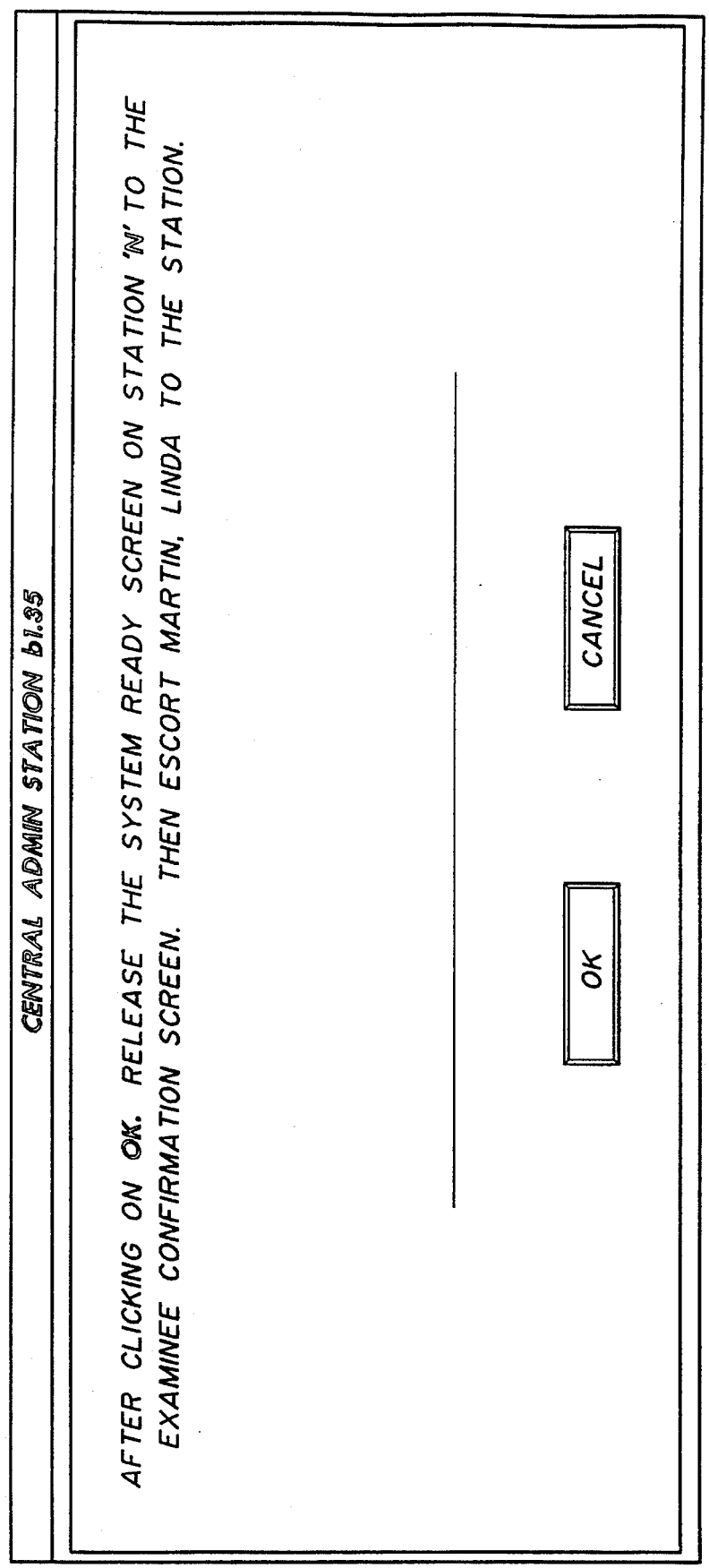
FIG. 10B is an example of an escort message screen displayed on the central administration workstation.

The Administrative System then displays an escort message such as the one shown in FIG. 10B. The administrator then would escort the examinee into the testing room to the testing workstation to which she or he was assigned. The Administrative System Kernel then redisplays the main menu at 97.

Figure 11:
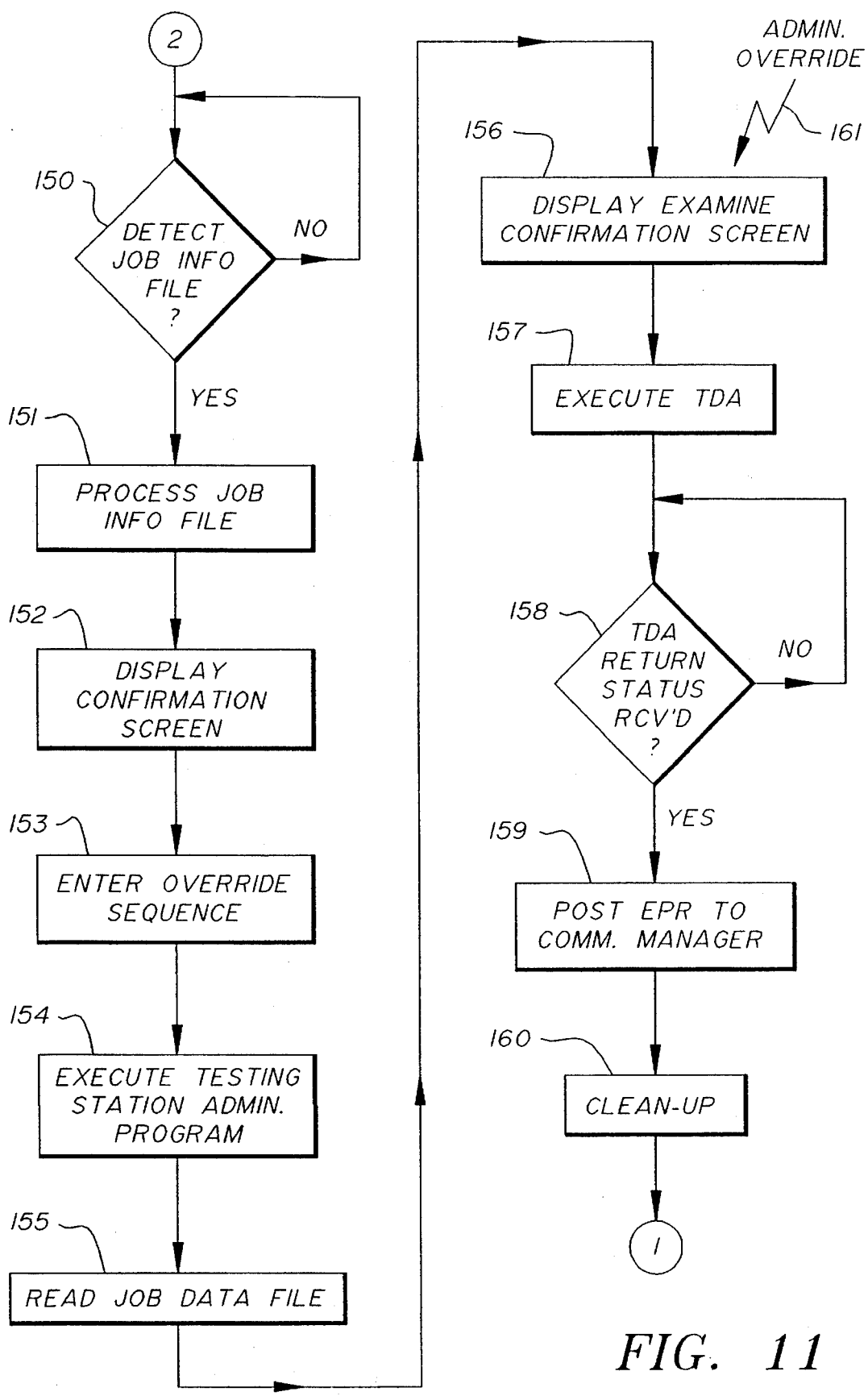
FIG. 11 is a functional flow diagram of the administrative procedure for initiation and termination of the testing session.

In the meantime, the Testing Station Kernel (on the testing workstation to which the examinee was assigned) will detect the Job Info File as shown in FIG. 11 at 150, process the information contained therein at 151 and display a preliminary confirmation screen at 152.

When the administrator arrives at the testing workstation, he or she reviews the preliminary confirmation screen and keys in a unique override key sequence at 153. The Test Station Kernel then executes the Test Station Administration program for the testing-program at 154, which is specified by the Job Info File at 155.

The Testing Station Administration reads the Job Data File 155 and displays the examinee confirmation screen at 156. An example of an examinee confirmation screen is shown in FIG. 12. The examinee reviews the information.

If the information is correct, the examinee presses ENTER and the Test Delivery Application (TDA) is started at 157. The Test Station Administration polls for a return status from the TDA at 158. When the Testing Station Administration detects the TDA return status, it is processed as follows: The Test Station Administration, then cleans up at 160 and, in turn, signals the Test Station Kernel, which cleans up and sets the appointment to the appropriate status.

If the test ended successfully, the Examinee Performance Record, photo, etc., are posted to the communications manager at 159 for eventual transmission to ETS. The Test Station Administration then cleans up at 160 and, in turn, signals the Test Station Kernel, which cleans up and sets the appointment status such that the appointment no longer appears in either Start Service or Restart Service.

Otherwise, the EPR, photo, etc., are retained and the appointment status is set such that the appointment appears in the Restart Service list (which will be described below) through which the test can be restarted.

If the information is incorrect, the examinee notifies the administrator at 156. The administrator enters the special key combination to force an administrative override at 161. This terminates the Test Station Administration, which returns an abort code to the Test Station Kernel, which, in turn, sets the status of the appointment accordingly. Detailed flowcharts of the Test Station Administration program and accompanying pseudo code are provided in Appendix F.

Testing sessions that ended abnormally, either through administrator intervention or system failure, can be restarted via Restart Service. The Restart Service module, displays the list of examinees who have had a testing session prematurely terminated.

As described above, the TDA provides a return status to the Test Station Administration subsystem. If the test was terminated prematurely, the Test Station Administration subsystem updates the Job Data File with the <JOB> parameter set to Restartable. Detailed flowcharts and accompanying pseudo code are provided in Appendix F. In a preferred embodiment, Restart Service merely allows the administrator to select a test to restart from the list. Upon selection an escort message as shown in FIG. 10B is displayed. When the escort message is confirmed by the administrator, a Job Info file is written—this time with a restart indicator—to direct the Test Station Kernel and Restart Service. The Job Data file created during the Start Service procedure is preferably reused during the Restart Service procedure so that no testing-program specific features are required to restart a test. The administrator would then escort the examinee into the testing room to the testing workstation to which she or he was assigned. The sequence of events at the testing station, namely, the progression from the Test Station Kernel, to Test Station Administration, to Test Delivery Application, is executed in a similar fashion as described above in connection with the Start Service procedure—except that each testing-program is notified that this is a restart for post processing purposes.

Figure 13:
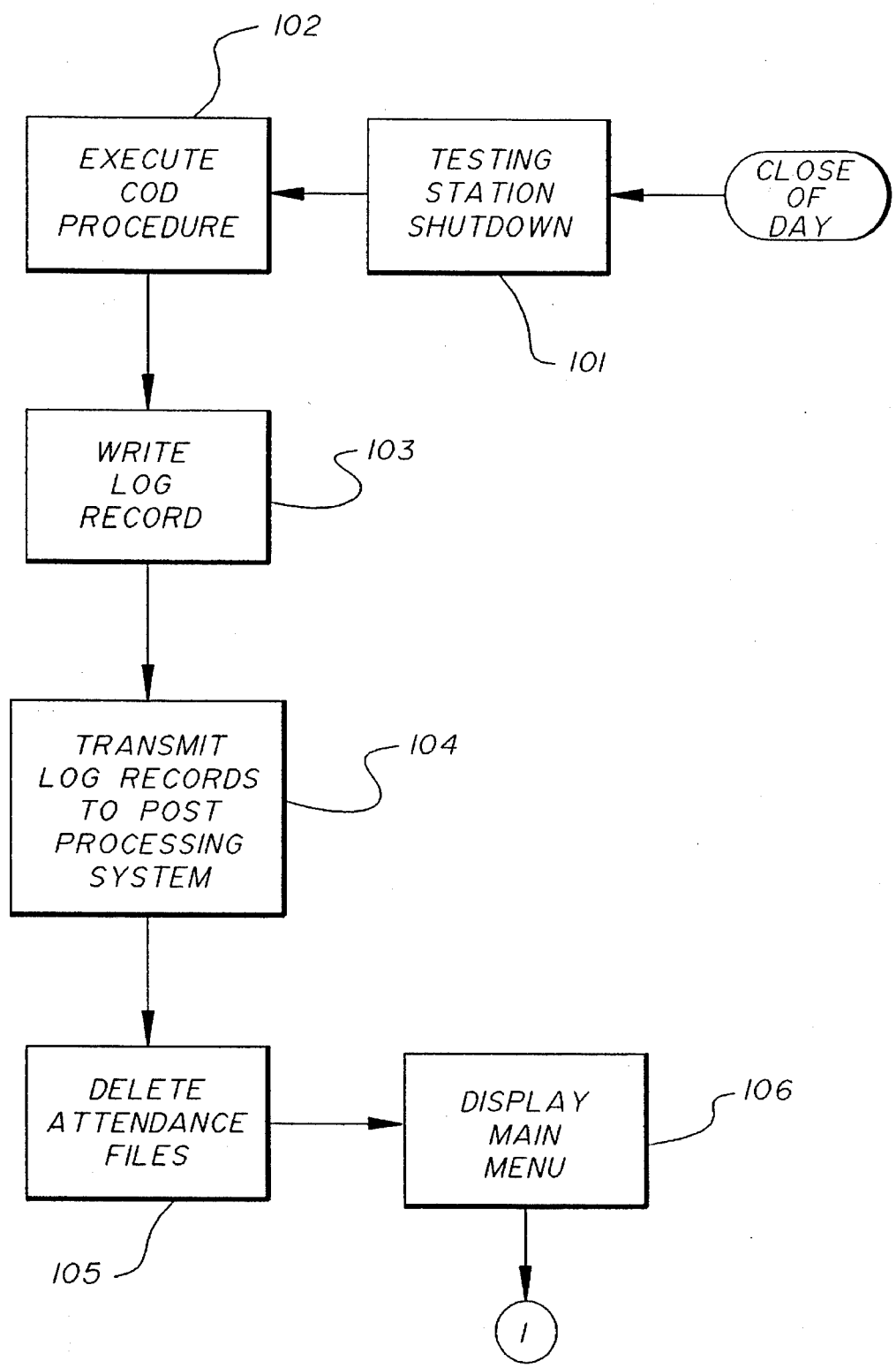
FIG. 13 is a functional flow diagram of the Close of Day procedure.

The sequence described above repeats throughout the day until the close of business. FIG. 13 is a flow diagram of the administrator's COD process. At the end of the testing day or other period of time defined by the testing service, the administrator re-enters the testing room and shuts down each of the testing workstations at 101. Returning to the central administration workstation, the administrator selects the Close Day menu item at 100, which invokes the COD program for each testing-program, if the testing program has one.

Many tasks can be performed by a COD program but some examples are as follows:

The status of all appointments is written to a log record at 103 and returned to the Independent Data Center at 104.

Any EPRs, photos, etc., for tests that failed and were never restarted are posted to the communications manager for transmission to the appropriate test producer also shown at 104.

The day's attendance files are deleted from the file server shown at 105.

When close of day is complete the Administrative System Kernel redisplays the main menu to await the next Start of Day at 106.

The administrator can then exit to the operating system by logging off of the administrative system as indicated at 110 in FIG. 5. For instance, an "Exit to DOS" button may be provided by the main menu as shown in FIG. 6.

An additional testing workstation feature which can also be made available is the "Reassign Station" option shown in FIG. 6. This feature may be used if one or more testing workstations become unavailable during the day due to faulty equipment or when the testing workstation is used for another purpose. The workstation numbers can be reassigned by selecting an appointment from a list of appointments that are not in progress and then selecting a station from a list of stations. Upon confirming the choices, the selected appointment is updated with the selected station number.

In addition to the "check-in" feature described above, the administrator may be provided with the capability to perform other administrative functions using the central administration workstation. For instance, some testing programs require the examinee's photograph to be taken prior to the examinee's scheduled testing session. The "Image Capture" button permits the administrator to capture the examinee's image and store it digitally with the examinee's identification and appointment data. Electronic image capture techniques are generally known to those skilled in the art.

Another administrative function which can be accessed by the administrative system according to a preferred embodiment of the present invention, is the "Scheduling/Registration" feature shown in FIG. 6. By selecting this button the administrator can access an on-line scheduling and administration facility which would permit examinees to register at the test center and schedule the test on a walk-in basis. However, the scheduling and registration software would preferably be provided by the testing service which administers tests at the particular test center.

The "Irregularity Report" button shown in FIG. 6 would be selected by the administrator when the administrator wants to generate an irregularity report. For instance, the testing service administering the test and the test producer may want to be informed when certain equipment failures cause an examinee problems during the testing session. As an example if the air conditioner at a testing center failed to work on a hot day, all of the examinees taking a test on that day may not perform as well as they would have if the testing room had been cooled. Therefore, such information is helpful to the testing program operations when scoring the examinees' responses and is helpful to test producers which use the examinees' responses for evaluating the tests that they have produced. The irregularity report may be generated by creating a log file having a format which can be identified as an irregularity report and writing a log record with the desired information to the file.

The "Lock Screen" button shown in FIG. 6 would be selected by the administrator when the administrator wants to generate and leave the central administration workstation unattended. This causes the Administrative System Kernel to display an idle screen. To unlock the screen the administrator must use the administrative override key combination which causes a login screen to appear and after successful login the main menu is redisplayed.

The "Center Messages" button shown in FIG. 6 would be selected by the administrator to review a queue of waiting messages. When selected the program preferably displays a short description of each message in the queue along with the security level required to read the message. The administrator selects a message from the list and if the administrator has the required security level the message is displayed. The administrator can then print or delete the message. After disposing of the message the list of remaining messages is preferably displayed.

The "Security Maintenance" button shown in FIG. 6 would be selected by the administrator password, or in the case of the highest level administrator to reset his or her to reset the password of any other administrator, or to add, delete or change login information for any administrator.

The "Retrieve Data" button shown in FIG. 6 would be selected by the administrator to copy backup copies of data that had been previously sent via the Communications Manager to the independent data center. When selected the program preferably displays a list of the data available during the last several days in which the system was in operation. The administrator then selects a day. The program then prompts the administrator to insert a floppy disk and copies the data transmitted that day to floppy disks. When complete the program exits.

The "System Status" button shown in FIG. 6 would be selected by the administrator to display, for example, the following information:

the date and time center number and name available disk space (in bytes)

communications status, namely, whether communications is on or off station information, namely, whether the station is active or available, the examinee at an active station and the test being taken a list of the installed functions, the status (enabled or disabled), and the function version.

The "System Maintenance" button shown in FIG. 6 would be selected by the administrator to apply system maintenance from a diskette. When selected the administrator is prompted to enter a diskette. The diskette is preferably checked to ensure it is a valid maintenance diskette and is intended for the center at which it is being used. If so, work orders are copied from the diskette to the file server and the program exits. In due time a background maintenance program is preferably executed by the Administrative System Kernel. The maintenance program detects the new work orders and applies them. A work order contains files or commands, and a delay flag that tells the maintenance program whether to apply the work order immediately or to wait for an active command (described below). A file may contain a profile, data, program, or any other system file plus the file's destination. The maintenance program 'applies' the file by moving it to the specified destination. Examples of some possible commands are:

the enable command, which either enables or disables a function (profile)

activate and deactivate, which either activate or removes a previously sent but unapplied work order deregister, which removes an installed profile and data associated with the profile delete, which removes a specified file.

While the invention has been described and illustrated with reference to specific embodiments, those skilled in the art will recognize that modification and variations may be made without departing from the principles of the invention as described hereinabove and set forth in the following claims.

APPENDIX A

EXAMPLE FORMAT FOR

A PROFILE

PROFILE FORMAT*

| Field | Description |
|---|---|
| Code | Contains the function number (e.g. 01000) |
| RootDir | Contains the root directory of this function. All information associated with this function is contained under this directory. |
| WorkingDir | Contains the default working directory, that is, the root directory of any programs or data specific to this function. |
| MaintPassword | A password that a maintenance subsystem (if any) must match in order to perform maintenance on this function. |
| Function Name | The full name of this function as it might appear on a report (e.g. XYZ Occupational Assessment Testing Program) |
| Event Name | A shortened version of Function Name useful for screen displays (e.g. XYZ Assessment Test). |
| Short Title | A very brief synopsis of Function Name useful for screen displays where only a limited amount of information is possible (e.g. XYZ Test). |
| Button Title | A brief title that can appear in a button if this function appears on the system menu (e.g. Start Day). |
| Button Priority | An integer value used to control the placement of this function's button within the menu. Low value appear at the top of the menu. |

| | |
|---|---|
| | Contains the root directory of this function. All information associated with this function is contained under this directory. |
| :kingDir | Contains the default working directory, that is, the root directory of any programs or data specific to this function. |
| intPassword | A password that a maintenance subsystem (if any) must match in order to perform maintenance on this function. |
| iction Name | The full name of this function as it might appear on a report (e.g. XYZ Occupational Assessment Testing Program) |
| int Name | A shortened version of Function Name useful for screen displays (e.g. XYZ Assessment Test). |
| ort Title | A very brief synopsis of Function Name useful for screen displays where only a limited amount of information is possible (e.g. XYZ Test). |
| :ton Title | A brief title that can appear in a button if this function appears on the system menu (e.g. Start Day). |
| :ton iority | An integer value used to control the placement of this function's button within the menu. Low value appear at the top of the menu. |

| | |
|---|---|
| Qc Status | The status of this function. Some possible values are as follows:<br>    0-Enabled<br>    1-MaintQC Failure<br>    2-SODQC Failure<br>    3-Admin unable to exec. |
| Net Status | An external group (e.g. Operations Center Group) can enable or disable this function via this field. Some permissible values are as follows:<br>    0-Enabled<br>    1-Network Admin disabled |
| Type of System | The host operating system to be used to run programs associated with this function. |
| Type of Function | Determines how the function is used. Some possible values are as follows:<br>    0-Sys<br>    1-Admin<br>    2-Test<br>    3-Support<br>    4-DemoTest<br><br>Additionally, if this function appears as a button in the menu, values 0-2 are preferably used to place the button in the appropriate menu column. |
| Exec Path | Values to be added to the operating system's environment prior to executing any programs for this function. |
| Exec Cmd Line | A program to execute if the user clicks on a menu button and/or if the 'Exec at Start Day' field parameter is true. |
| Exec at Start | If true, the Exec Cmd Line is executed during the Administrative System Kernel's initialization procedure each time the Kernel is started. |

| | |
|---|---|
| Dependency | A list of other functions that must be operational before this function can be used. |
| Availability | Determines when the function is active. Some possible values are as follows:<br><br>0 - Available during both the active and inactive states.<br>1 - Available only during the active state.<br>2 - Available only during the inactive state. |
| Qc Check | If true, this function is QC checked during Start Day processing. |
| Per Program | The name of a load module that contains code specific to this function that may be used by Start Day, Close Day, etc. |
| Return EPR | If true, Examinee Performance Records are returned when the testing session is completed or at Close Day, otherwise. If false, they are discarded. |
| Photo Required | If true, an electronic photo of the examinee is required in order to start a test |
| User Security Level | The minimum security level an administrator must have in order to execute this function, if the function is displayed on the menu. |
| Customer Service Command Line | Contains the name of a program, if any, to be executed as the Testing Station Admin by the Testing Station Kernel. |
| Start of Day Exec | Contains the name of a program to be executed during Start of Day procedures. |

| | |
|---|---|
| Start of Day Sequence | Contains a value that orders this function's Start of Day Exec in the list of all other functions that also have a Start of Day Exec. Lower values are run first. |
| Close of Day Exec | Contains the name of a program to be executed during Close of Day procedures. |
| Close of Day Sequence | Contains a value that orders this function's Close of Day Exec in the list of all other functions that also have a Close of Day Exec. Lower values are run first. |

\* A profile is the vehicle for important configuration information for both system programs and testing program data. For example, a profile is required in order to add a button to the system menu and to add a testing program's data to the system volume.

APPENDIX B

Pseudo Code and Corresponding

Flowcharts for the

Administrative System Kernel

Main_Procedure:

A flowchart of this procedure is shown in Figure B-1.

- Install a keyboard hook to post event ADM_KERN -- subevent KERN_KEYCOMBO when the user hits the special admin key combination.

- Post event ADM_KERN -- subevent KERN_COLDSTART.

- Fetch the next event from the event queue. Perform the procedure associated with the event. Loop until 'END_PROGRAM' event is retrieved form the queue.

- Return to the operating system.

Admin Kernel messages (ADMK_KERN):

KERN_ALARM

A flowchart of this procedure is shown in Figure B-2.

100 If the Alarm subsystem is about to display the alarm:

- Save the currently active window.

200 Else, the alarm has been dismissed:

- Make the saved window the active window.

2000 Return to caller.

KERN_COD

A flowchart of this procedure is shown in Figure B-3.

100 Perform the Process_COD procedure passing in the restart COD code if available. If something went wrong:

- Goto 2000.

150 Perform event ADM_MENU -- subevent MENU_UNLOAD.

200 Perform event ADM_KERN -- subevent KERN_SETSTATE -- Inactive code, now.

2000 Return to caller.

KERN_COLDSTART

A flowchart of this procedure is shown in Figures B-4(a) and B-4(b).

100 Go through the profiles and execute the programs that indicate that they must be run at startup. Do not wait for them to return.

150 Perform Timer_Init procedure, now.

200 Perform Timer_Set procedure, now.

300 Perform Timer_On procedure, now.

400 Confirm the Date/Time. If the user indicates that it is incorrect:

- Post event END_PROGRAM.

- Goto 2000.

500 Perform Timer_Off procedure, now.

600 Check if the Kernel is running anywhere else by seeing If the 'Admin in Use' file is open:

- Post event END_PROGRAM.

- Goto 2000.

700 Check system parameter file to see if virus checking is required. If yes:

- Run McAfees NETSCAN.EXE to find viruses. If something went wrong:

- Post event END_PROGRAM.

- Goto 2000.

800 Check the 'State' file to see if this is a new installation. If yes:

- Copy old passwords, set site name, update Center Unique Diskette. If something went wrong:

- Post event END_PROGRAM.

- Goto 2000.

900 Else, check system parameter file to see if the 'Center Unique Diskette' is required: If Yes:

- Compare verification files on floppy to system's. If they do not compare correctly:

- Post event END_PROGRAM.

- Goto 2000.

1000 Initialize Active and Inactive message processors, and perform 'INIT' message for the Alarm, Screen Saver and Menu subsystems. If any fails:

- Post event END_PROGRAM.

- Goto 2000.

1100 Perform event ADM_SCRNSVR -- sub event SW_SHOW, now.

1200 Check the 'State' file again and set the base system state appropriately.

1300 Post event ADM_KERN -- subevent KERN_STARTSTATE.

1400 Set a system variable to indicate the cold start has been performed.

2000 Return to caller.

KERN_KEYCOMBO

A flowchart of this procedure is shown in Figure B-5.

100 If the system is not displaying the 'Logo Screen':

- Goto 2000.

200 Perform Login procedure, now. If failed:

- Goto 2000.

300 Perform event ADM_SCRNSVR -- subevent SW_HIDE, now.

400 Perform event ADM_MENU -- subevent SW_SHOW, now.

2000 Return to caller.

KERN_LOGOFF

A flowchart of this procedure is shown in Figure B-6.

100 Write a 'LOG_DOS' record to the event log.

200 Post event END_PROGRAM.

2000 Return to caller.

KERN_SETSTATE

A flowchart of this procedure is shown in Figure B-7.

100 Set the base system state to requested state.

200 Write the state out to the 'State' file.

300 Post event ADM_KERN -- subevent KERN_STARTSTATE.

2000 Return to caller.

A flowchart of this procedure is shown in Figure B-7.

KERN_SOD

A flowchart of this procedure is shown in Figure B-8.

100 If this is a restart:

- Save SOD code passed in.

200 Else, check system parameter file to see if the 'Center Unique Diskette' is required: If Yes:

- Compare verification files on floppy to systems. If they do not compare correctly:

- Goto 2000.

300 Perform the Process_SOD procedure passing in the restart SOD code if available. If something went wrong:

- Goto 2000.

350 Perform event ADM_MENU -- subevent MENU_UNLOAD, now.

400 Perform event ADM_KERN -- subevent KERN_SETSTATE -- Active code, now.

2000 Return to caller.

KERN_STARTSTATE

A flowchart of this procedure is shown in Figure B-9.

100 Load the menus from the profiles and enable/disable buttons for this state (figure 10).

200 Perform the Timer_Set procedure, now.

300 If the current 'state' is Active:

- Perform event ADM_MENU -- subevent MENU_LOAD -- Active state code.

- Check 'State' file to see if this is a restart for Close of Day (COD). If so:

- Post event ADM_KERN -- subevent KERN_COD -- COD code.

400 Else, if the current 'state' is InActive:

- Perform event ADM_MENU -- subevent MENU_LOAD -- InActive state code.

- Check 'State' file to see if this is a restart for Start of Day (SOD). If so:

- Post event ADM_KERN -- subevent KERN_SOD -- SOD code.

500 Else, perform the Timer_On procedure, now.

2000 Return to caller.

KERN_TIMEOUT

A flowchart of this procedure is shown in Figure B-10.

100 Check system variable to see if cold start has been performed. If not:

- Execute the maintenance program.

- Goto 2000.

200 If a window of the Kernel's is on the screen, (for example: Login screen):

- Perform event WM_CLOSE on the window, now.

300 If the user is running another application:

- Perform event WM_CLOSE on the application, now.

400 Perform event ADM_SCRNSAV -- subevent SW_SHOW, now.

450 Perform event ADM_MENU -- subevent SW_HIDE, now.

500 Execute the maintenance program.

2000 Return to caller.

Admin Kernel procedures:

Login

A flowchart of this procedure is shown in Figure B-11.

100  Prompt user for login and password.

200  Verify login and password against the 'password' file.

250  If password fails after three attempts or user cancels:

- Goto 2000 with Failure.

300  If password has expired:

350    - Prompt user for new password.

- If new password matches any of the last ten passwords:

- Goto 350.

- Update the 'password' file with the new password.

400  Get security level of user.

500  If security level of user is lower than value passed to procedure:

- Goto 2000 with Failure.

2000 Return Success/Failure to caller.

Process_COD

A flowchart of this procedure is shown in Figures B-12(a) and B-12(b).

100  Perform the Timer_Off procedure, now.

200  If this a Manual Close of Day:

- Confirm user wants to do a Close of Day. If user says no:

- Goto 2000.

300  Else, if this is an Automatic or Forced Close of Day:

- Display count down. If user cancels it:(Automatic COD only)

- Add 15 minutes to the COD time.

- Goto 2000.

400  Make a list from the profiles that indicate they have COD executables and sort them according to their COD priorities.

500 Get the current/next profile in the list. If there are no more profiles:

- Goto 2000.

600 If the restart indicator is set:

- Is the current profile the one that failed? If not:

- Goto 500.

700 Reset the restart indicator.

800 Write 'STATE_COD' -- substate 'current profile number' to the 'State' file.

900 Execute the program and wait for it to return.

1000 If the return code is 'SUCCESS':

- Goto 500

1010 If the return code is 'FAIL_ABORT' or 'FAIL_CONTINUE':

- Create the an alarm file for the alarm subsystem with message code 30001 -- subcode 00005.

1020 If the return code is 'FAIL_CONTINUE':

- Update the current profile to indicate a failed Close of Day.

1030 If the return code is 'FAIL_ABORT' or 'FAIL_ABORT_NOALARM':

- Goto 2000.

1040 Goto 500.

2000 Write a 'LOG_CAND_REC' to the event log for each candidate record in the attendance file.

2010 Write a 'LOG_COD' record to the event log with a completion code.

2020 Send the log file back to ETS.

2030 Delete the attendance file.

2040 Perform the Timer_On procedure, now.

2050 Return to caller.

Process_SOD

A flowchart of this procedure is shown in Figures B-13(a) and B-13(b).

100  Perform the Timer_Off procedure, now.

200  Check system parameter file to see if virus checking is required. If yes:

- Run McAfees NETSCAN.EXE to find viruses. If something went wrong:

- Goto 2000.

300  Perform quality control check on each program whose profile indicates that it should be done. If something went wrong:

- Goto 2000.

400  Make a list from the profiles that indicate they have SOD executables and sort them according to their SOD priorities.

500  Get the current/next profile in the list. If there are no more profiles:

- Goto 2000.

600  If the restart indicator is set:

- Is the current profile the one that failed? If not:

- Goto 500.

700  Reset the restart indicator.

800  Write 'STATE_SOD' -- substate 'current profile number' to the 'State' file.

900  Execute the program and wait for it to return.

1000 If the return code is 'SUCCESS':

- Goto 500

1010 If the return code is 'FAIL_ABORT' or 'FAIL_CONTINUE':

- Create the an alarm file for the alarm subsystem with message code 30001 -- subcode 00005.

1020 If the return code is 'FAIL_CONTINUE':

- Update the current profile to indicate a failed Start of Day.

1030 If the return code is 'FAIL_ABORT' or 'FAIL_ABORT_NOALARM':

- Goto 2000.

1040 Goto 500.

2000 Write a 'LOG_SOD' record to the event log with a completion code.

2010 Perform the Timer_On procedure, now.

2020 Return to caller.

Alarm subsystem messages (ADM_ALARM):

INIT

A flowchart of this procedure is shown in Figure B-14.

100 Perform subsystem initialization (for example: Create a system timer that will post a WM_TIMER message to the alarm subsystem every two seconds). If any failures:

- Return failure to call.

2000 Return success to caller.

WM_TIMER

A flowchart of this procedure is shown in Figure B-15.

100 Search for an alarm file. If found:

- Perform event ADM_KERN -- subevent KERN_ALARM and indicate alarm is about to be displayed, now.

- Display the alarm message (message code and subcode, sample in figure 11).

- Write a 'LOG_ALARM' record to the event log and include alarm information.

- Wait for the user to dismiss the alarm.

- If the alarm is a MAJOR alarm:

- Post event END_PROGRAM.

- If the alarm is a MINOR alarm:

- Update the profile associated with the alarm to indicate that the kernel had a problem with this profile.

- Perform event ADM_KERN -- subevent KERN_ALARM and indicate alarm has been dismissed, now.

- Delete the alarm file.

2000 Return to caller.

Menu subsystem messages (ADM_MENU):

INIT

A flowchart of this procedure is shown in Figure B-16.

100 Create the three menus: System Functions, Administrative Functions, and Station Services.

200 If any failures:

- Return Failure to caller.

2000 Return Success to caller.

MENU_BUTTON

A flowchart of this procedure is shown in Figure B-17.

100 Perform Timer_On procedure, now.

200 If this function has security:

- Perform Login procedure, now. If failed or not high enough security:

- Goto 2000.

300 Load the profile for the given function.

400 If the function is disabled:

- Disable the menu button.

- Goto 2000.

500 Execute the function.

600 If the function is a DOS function:

- Perform Timer_Off procedure, now.

2000 Return to caller.

MENU_LOAD

A flowchart of this procedure is shown in Figure B-18.

100 Load and enable the functions for this state as indicated by the profiles.

2000 Return to caller.

MENU_UNLOAD

A flowchart of this procedure is shown in Figure B-19.

100  Remove the menus that were loaded.

2000 Return to caller.

SW_SHOW

A flowchart of this procedure is shown in Figure B-20.

100  Display the menus (figure 10).

2000 Return to caller.

SW_HIDE

A flowchart of this procedure is shown in Figure B-21.

100  Hide the menus.

2000 Return to caller.

Screen Saver subsystem messages (ADM_SCRNSVR):

INIT

A flowchart of this procedure is shown in Figure B-22.

100 Perform subsystem initialization. If any failures:

- Return failure to call.

2000 Return success to caller.

SW_SHOW

A flowchart of this procedure is shown in Figure B-23.

100 Display 'Logo screen'

2000 Return to caller.

SW_HIDE

A flowchart of this procedure is shown in Figure B-24.

100 Hide the 'Logo screen'.

2000 Return to caller.

Timer subsystem procedures:

Timer_Init

A flowchart of this procedure is shown in Figure B-25.

100 Create a system timer that will perform the Timer_Proc procedure every one second.

2000 Return to caller.

Timer_Set

A flowchart of this procedure is shown in Figure B-26.

100 Set the inactivity time from the value in the system parameter file.

2000 Return to caller

Timer_On

A flowchart of this procedure is shown in Figure B-27.

100 Set inactivity timer flag to ON.

2000 Return to caller.

Timer_Off

A flowchart of this procedure is shown in Figure B-28.

100 Set the inactivity timer flag to OFF.

2000 Return to caller.

Timer_Proc

A flowchart of this procedure is shown in Figure B-29.

100 If a minute has passed since last performing a communications health check:

- Check status of the communications device.

- If the status has changed:

- Write a 'LOG_COMM_STAT' record to the event log indicating the current status.

200 If the Close of Day (COD) time has passed just passed:

- Post event ADM_KERN -- subevent KERN_COD -- indicate Automatic COD.

300 Else, if the COD time has passed over an hour ago:

- Post event ADMK_KERN -- subevent KERN_COD -- indicate Forced COD.

400 If the inactivity timer flag is set ON:

- If the user has not manipulated the system (used mouse or keyboard):

- Post event ADM_KERN -- KERN_TIMEOUT.

2000 Return to caller.

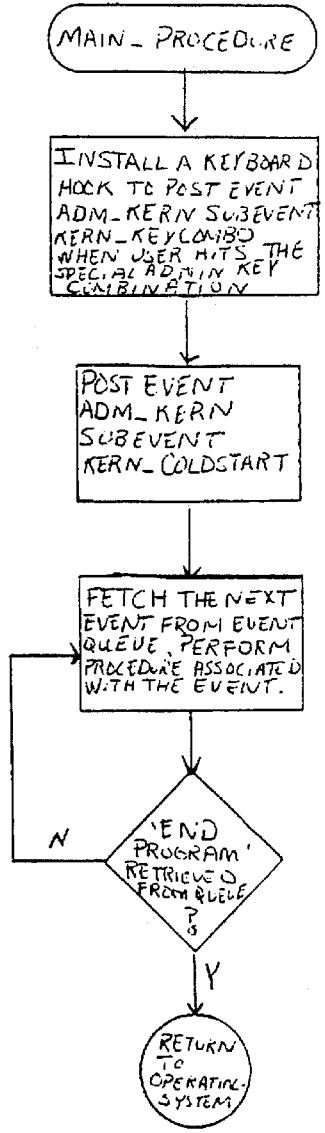
Figure B-1

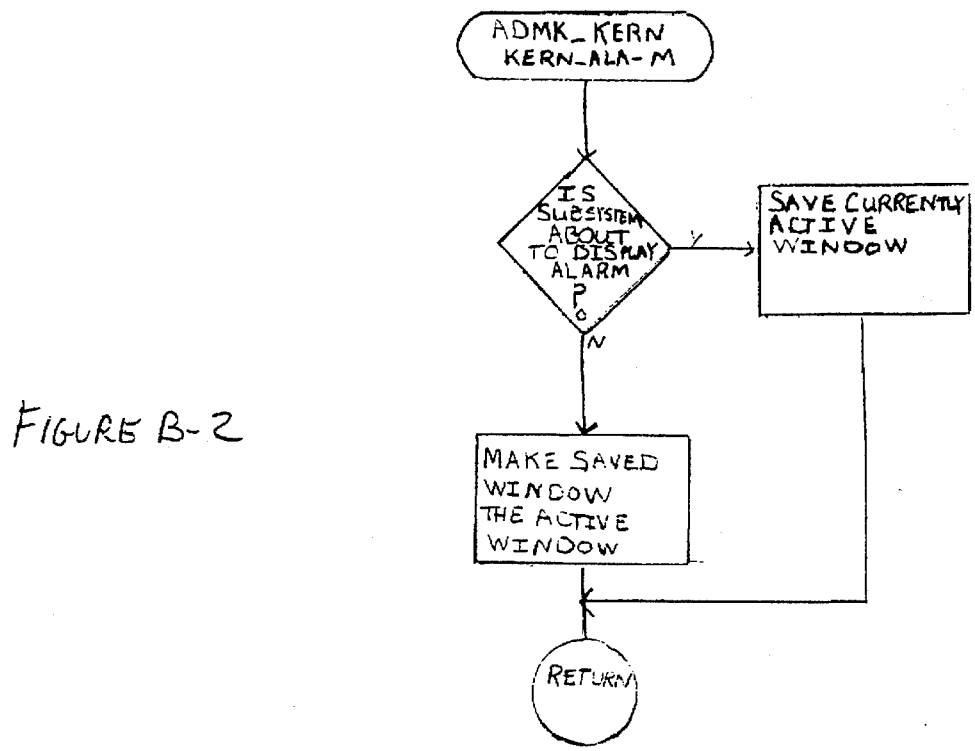
FIGURE B-2
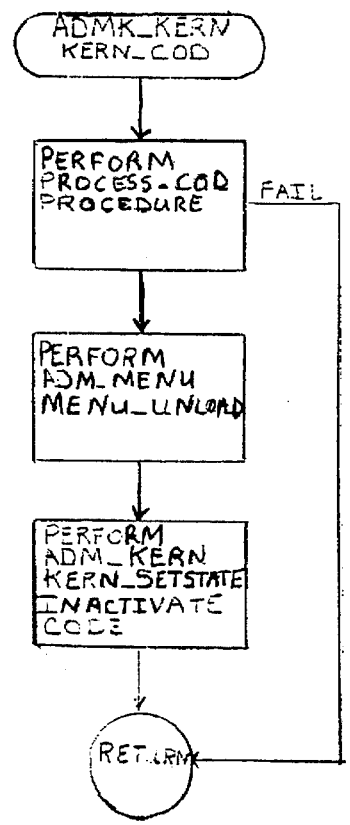
FIGURE B-3

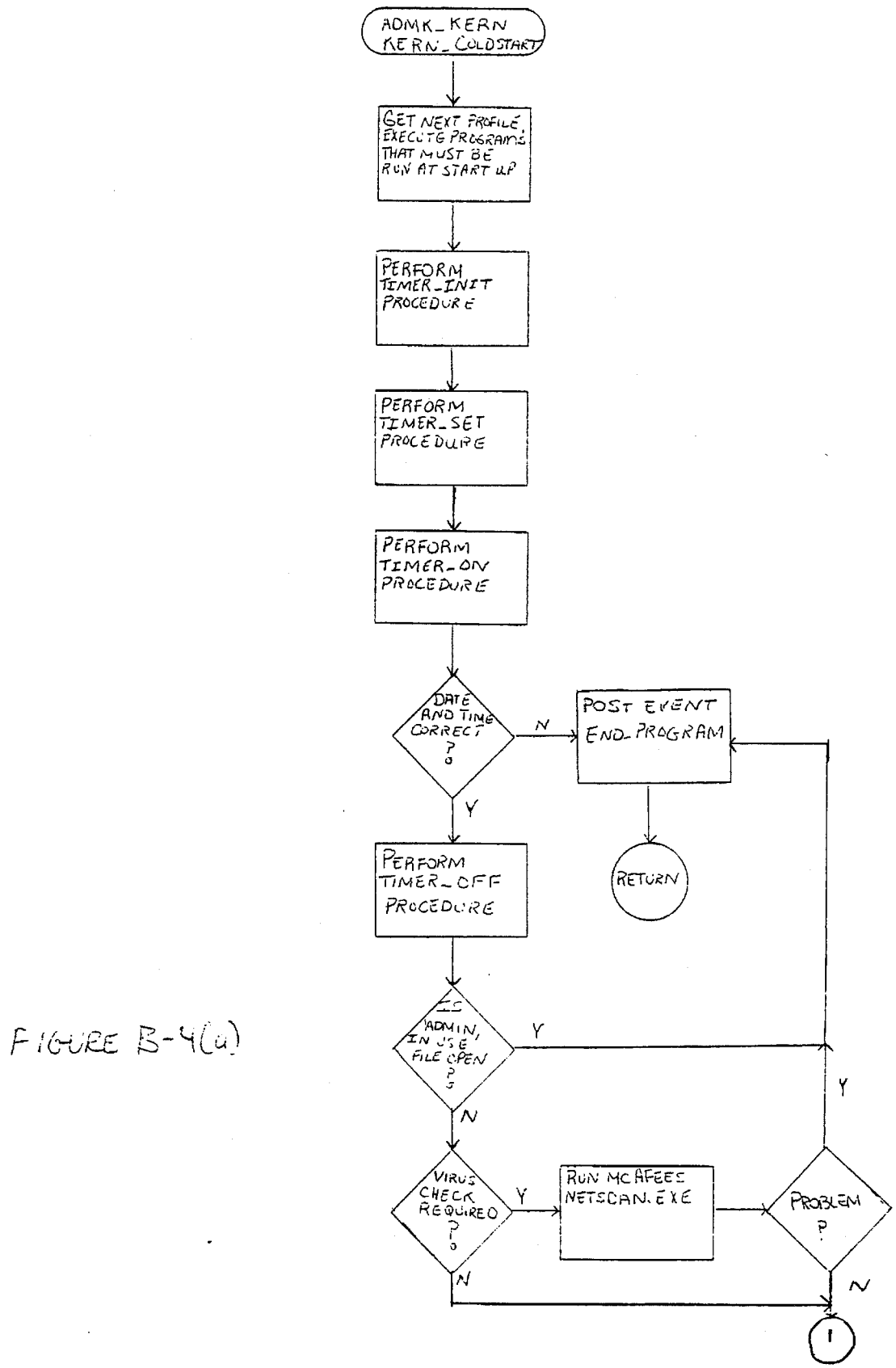
FIGURE B-4(a)

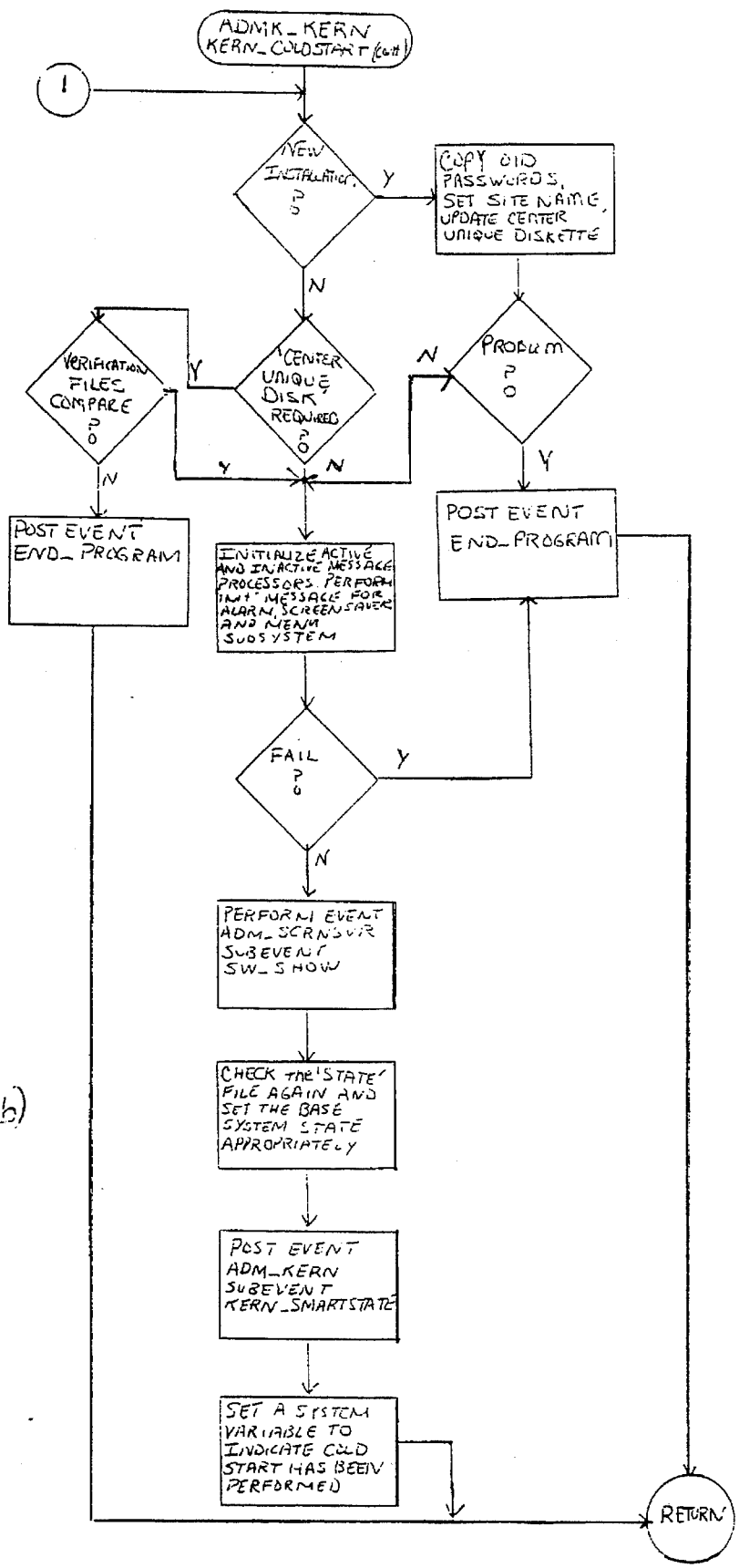
FIGURE B-4(b)

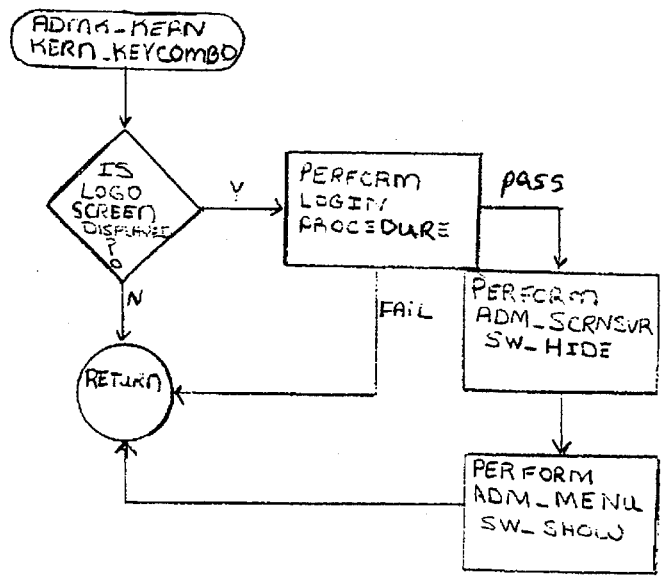
Figure B-5
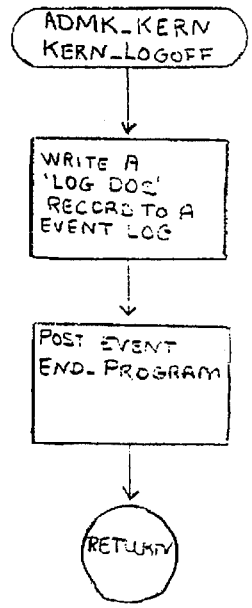
Figure B-6

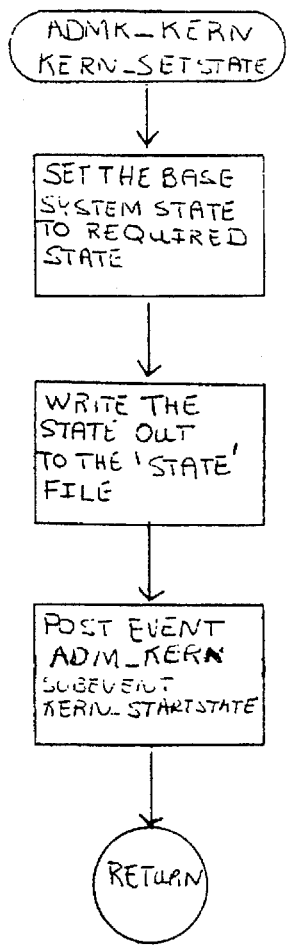
Figure B-7

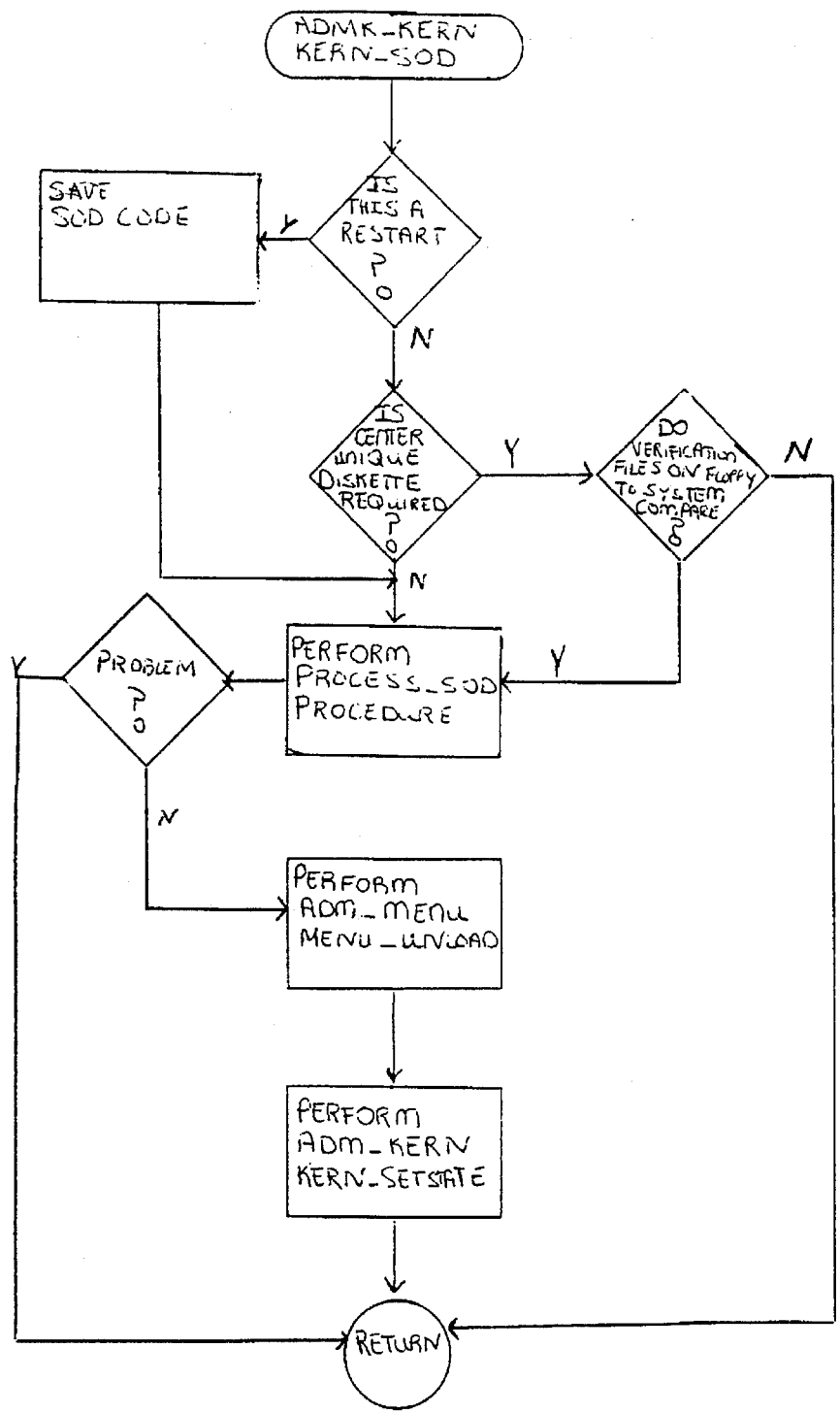
Figure B-8

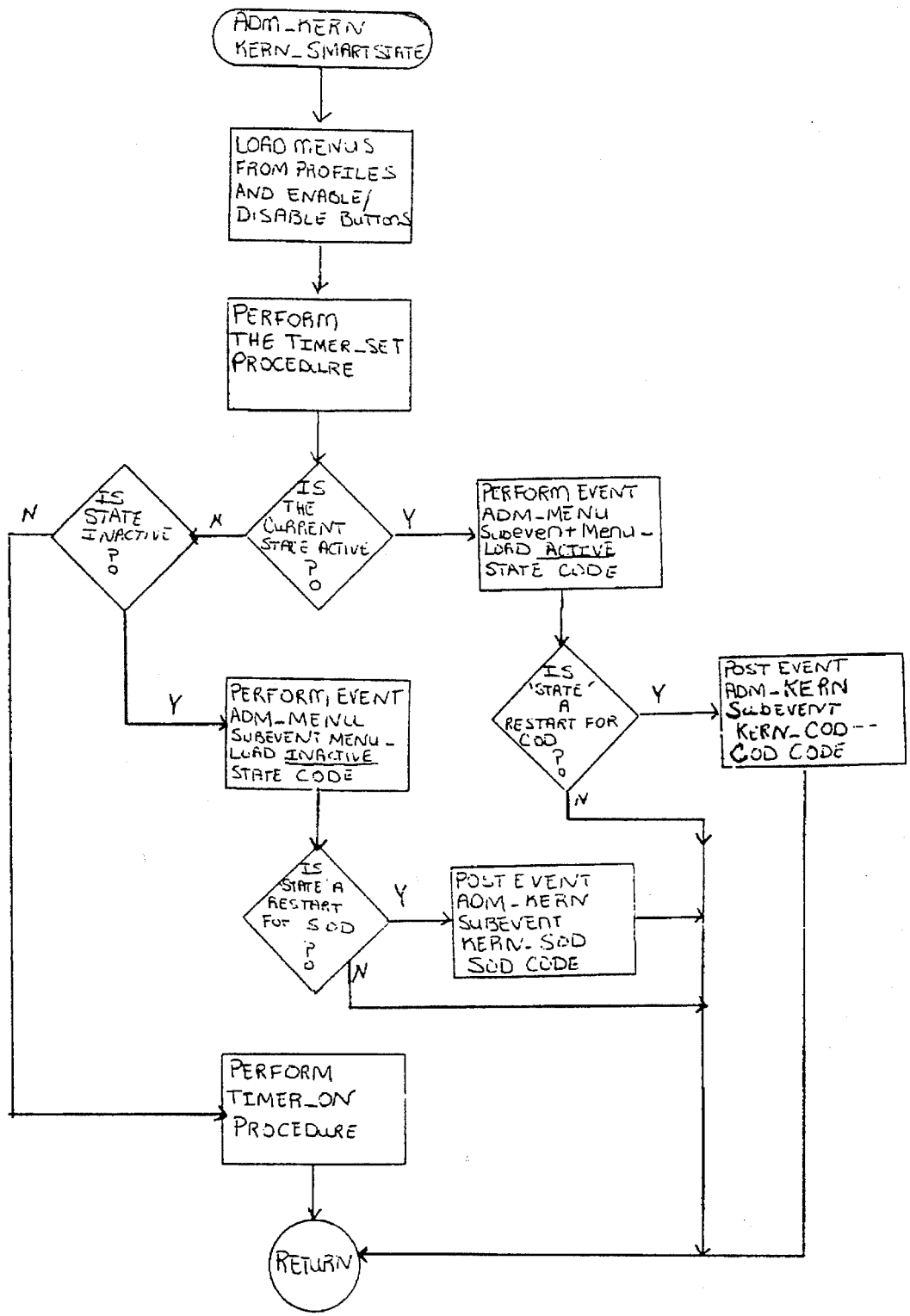
Figure B-9

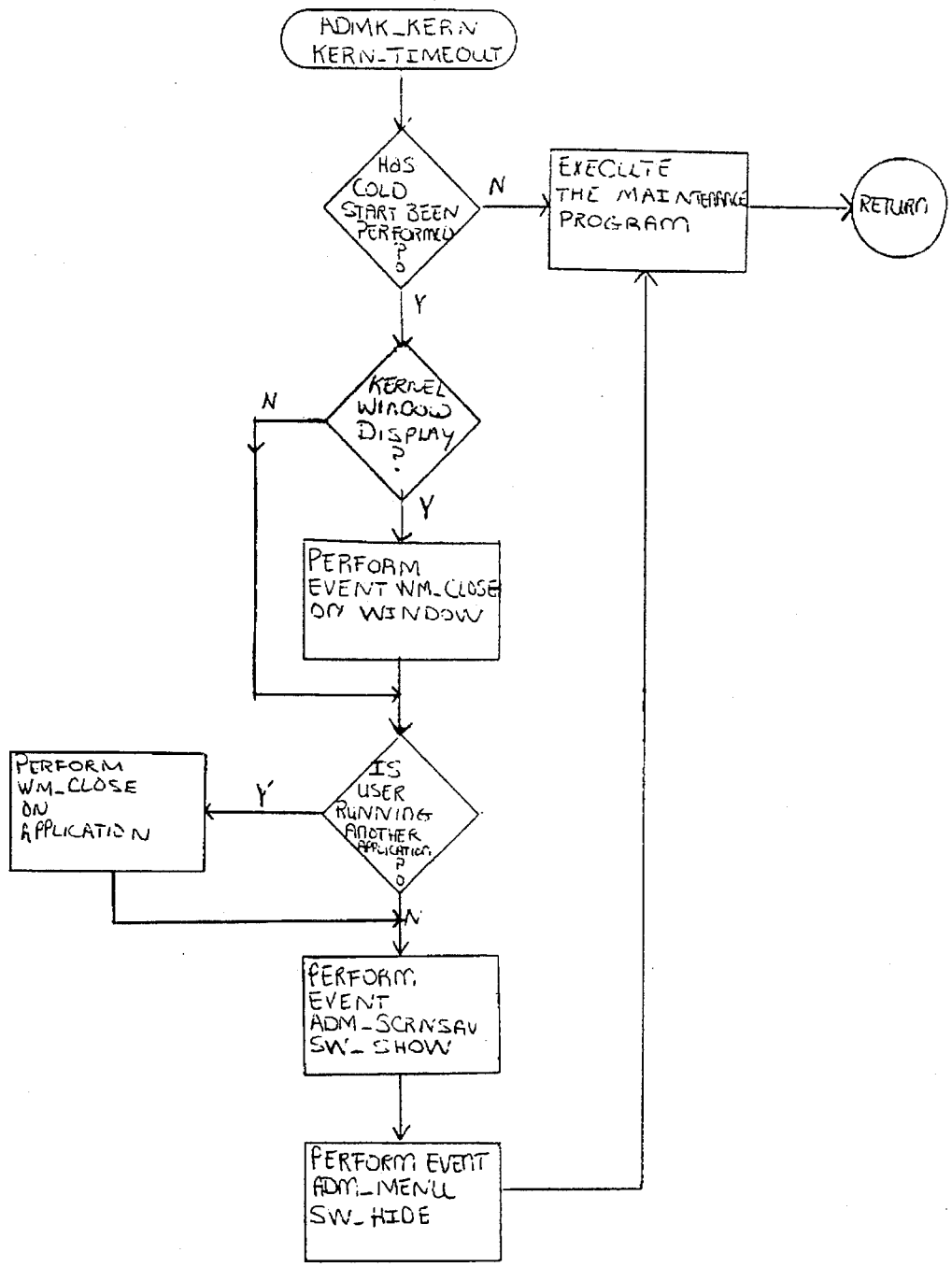
Figure B-10

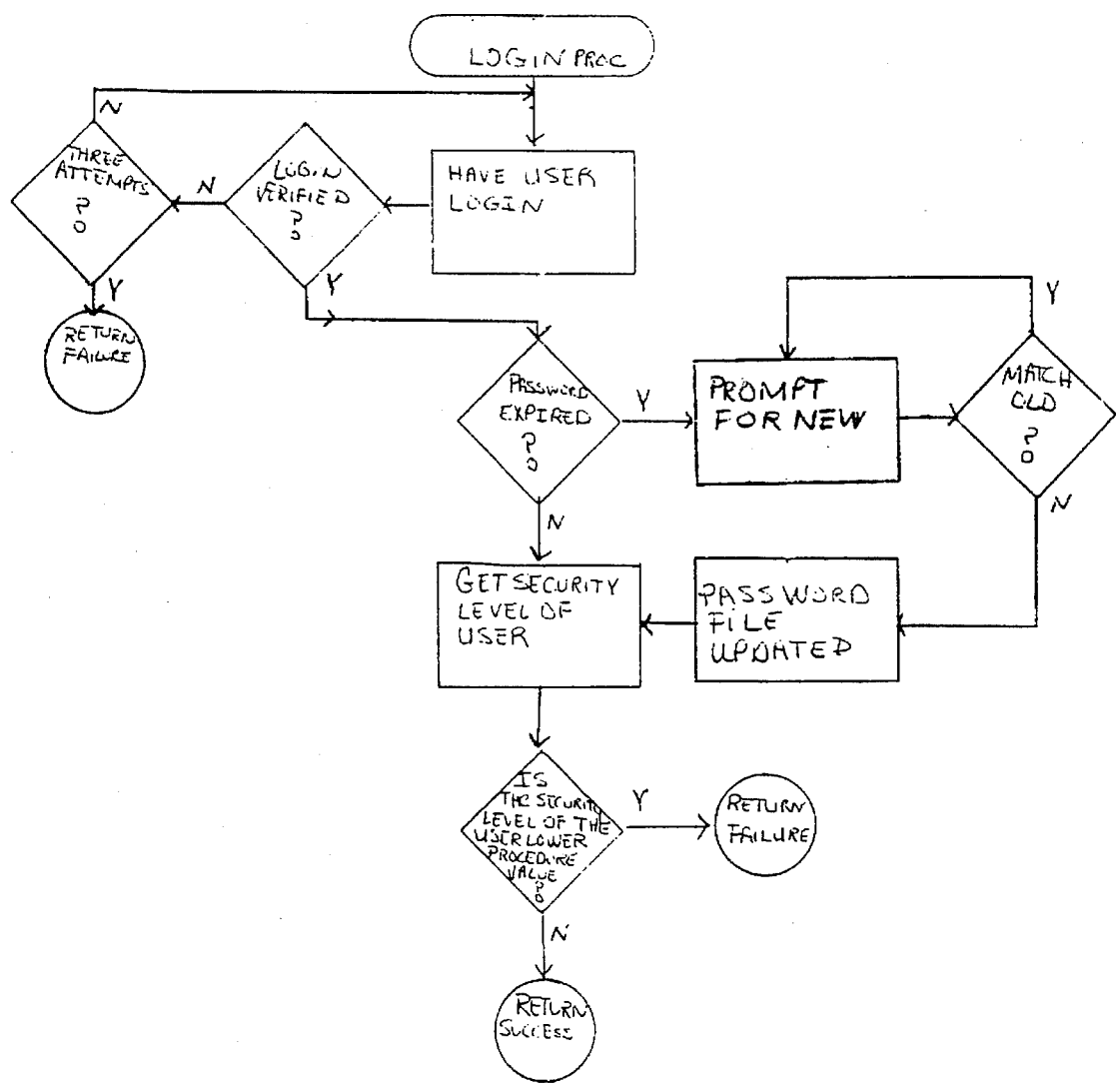
FIGURE B-11

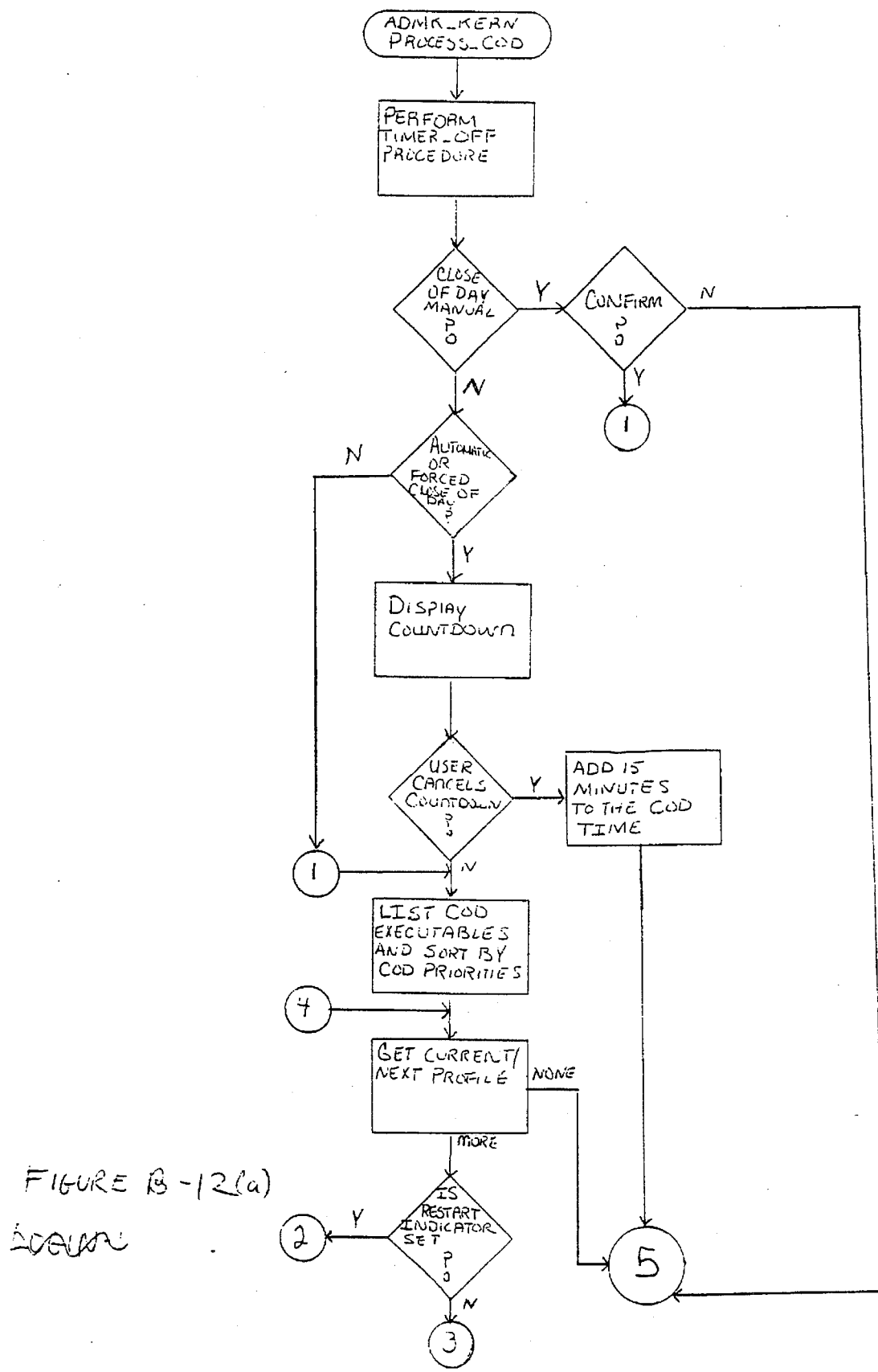
FIGURE B-12(a)

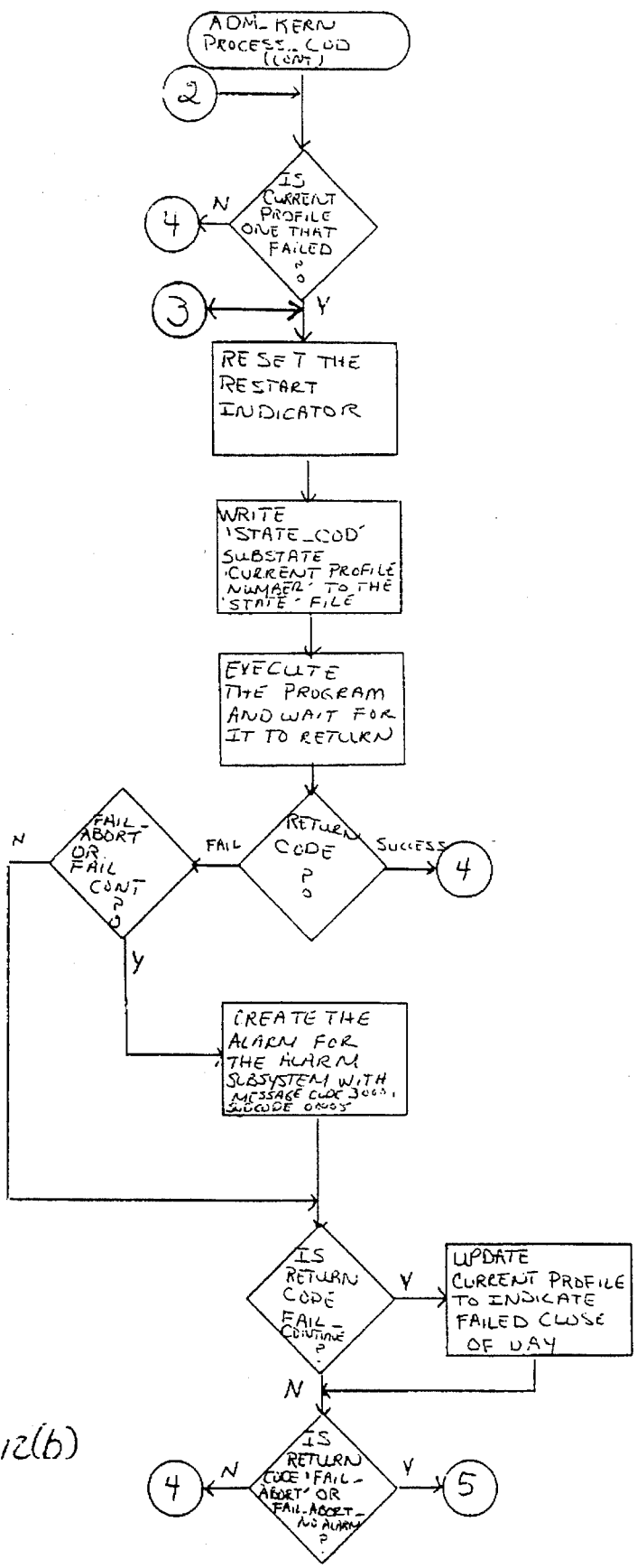
FIGURE B-12(b)

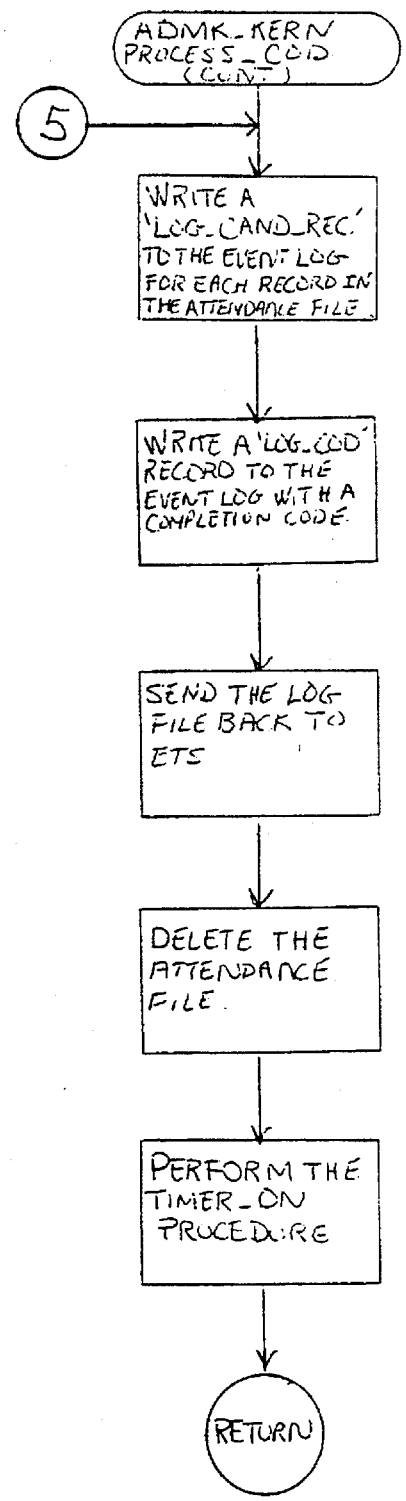
Figure B-12(c)

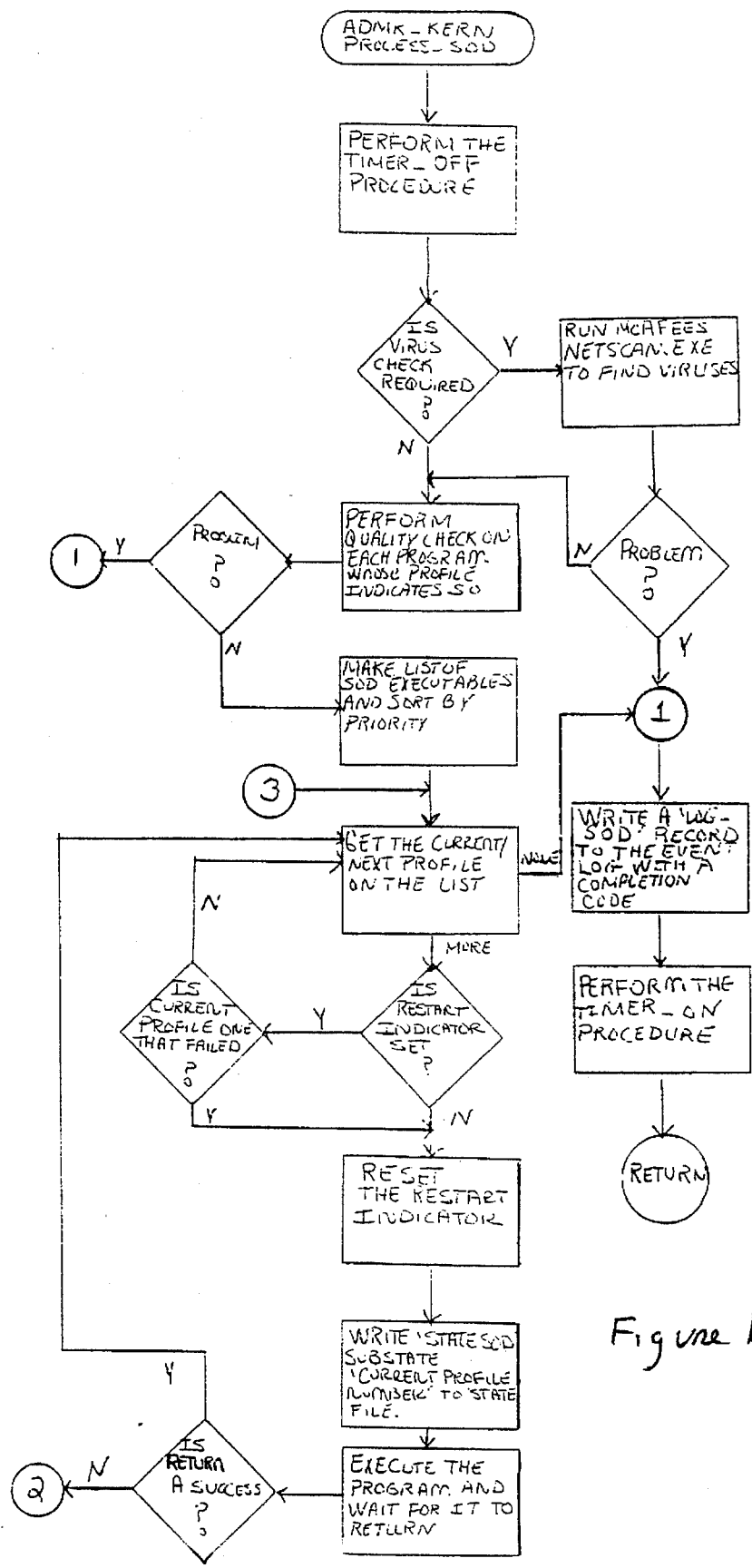
Figure B-13(a)

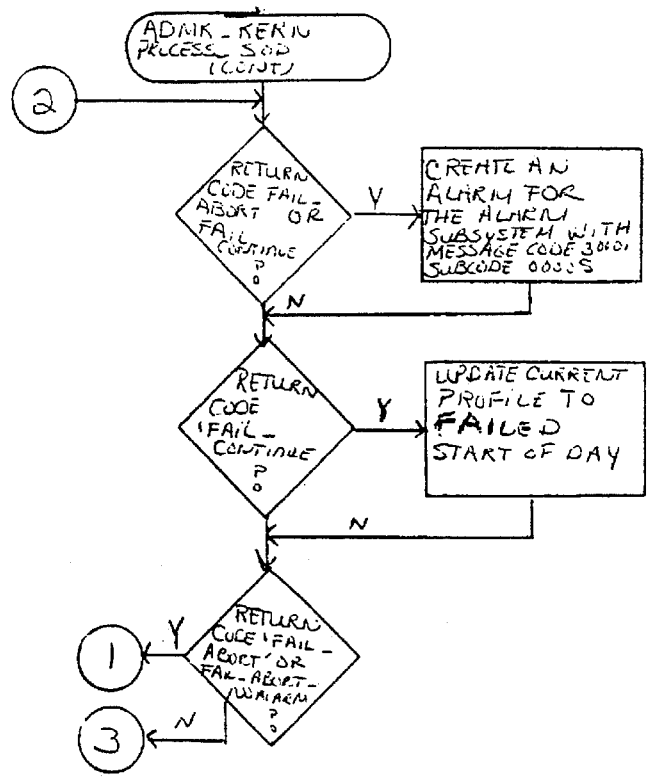
Figure B-13(b)

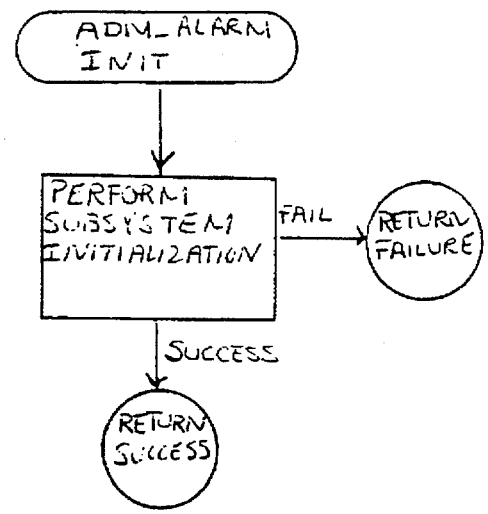
Figure B-14

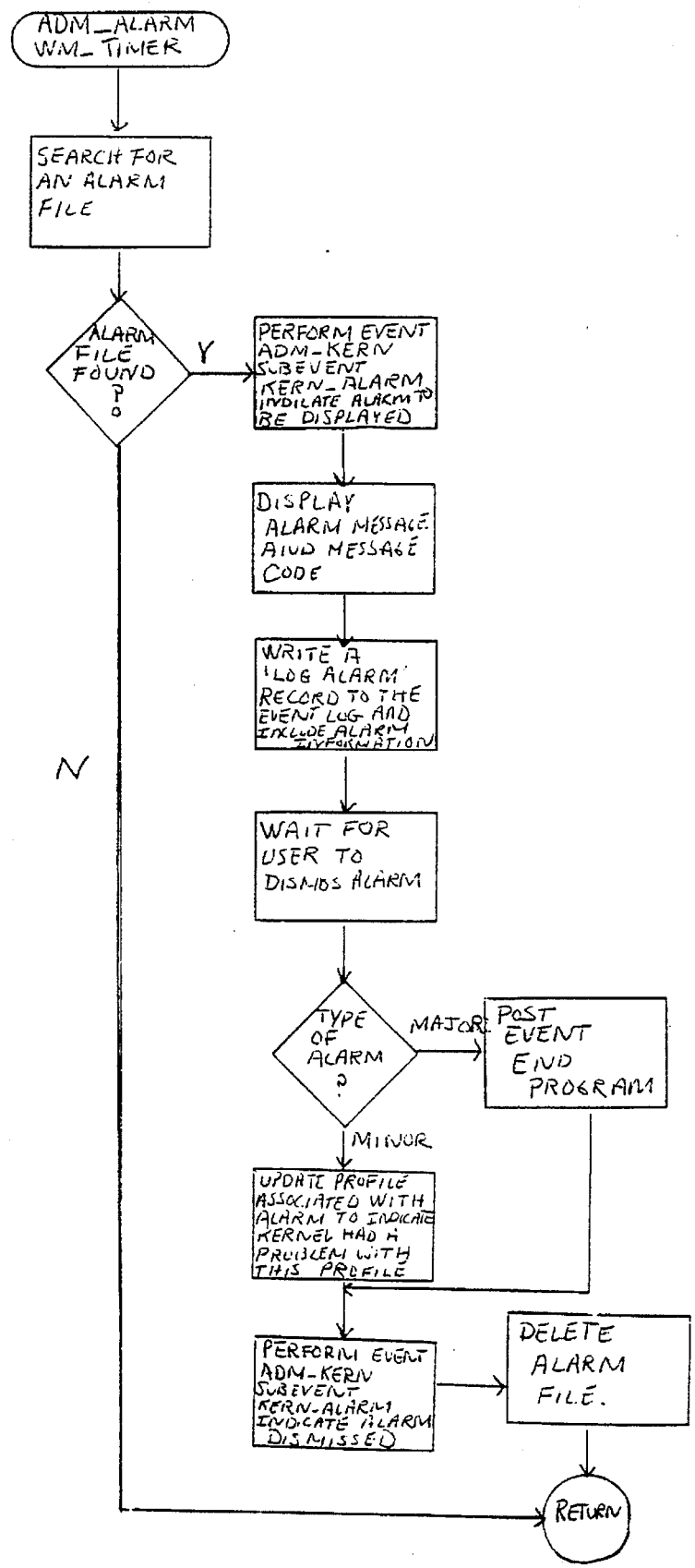
Figure B-15

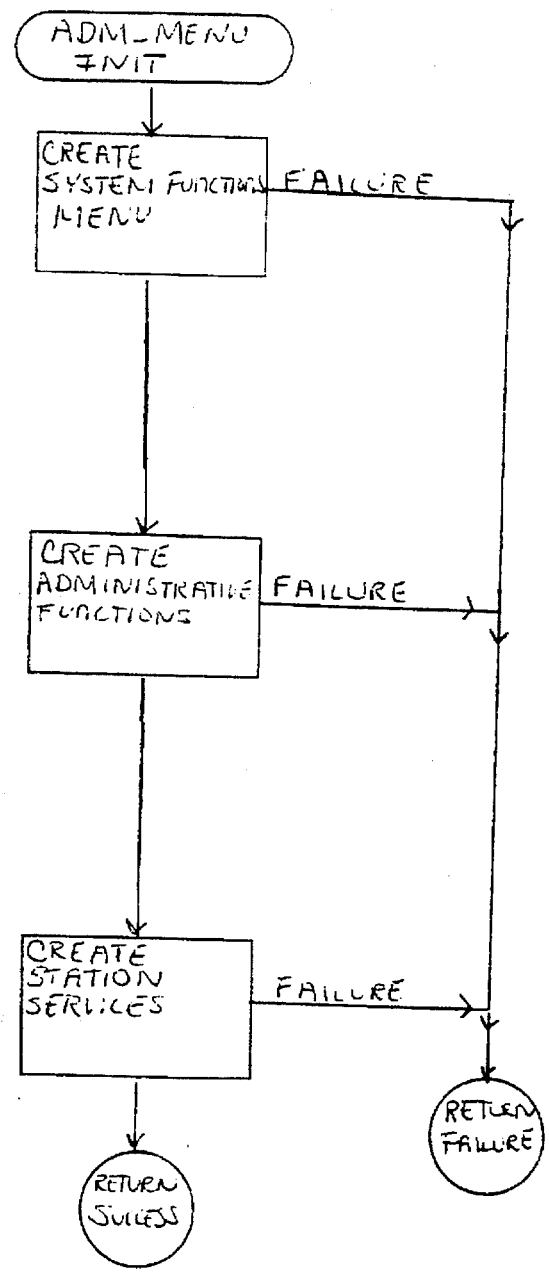
Figure B-16

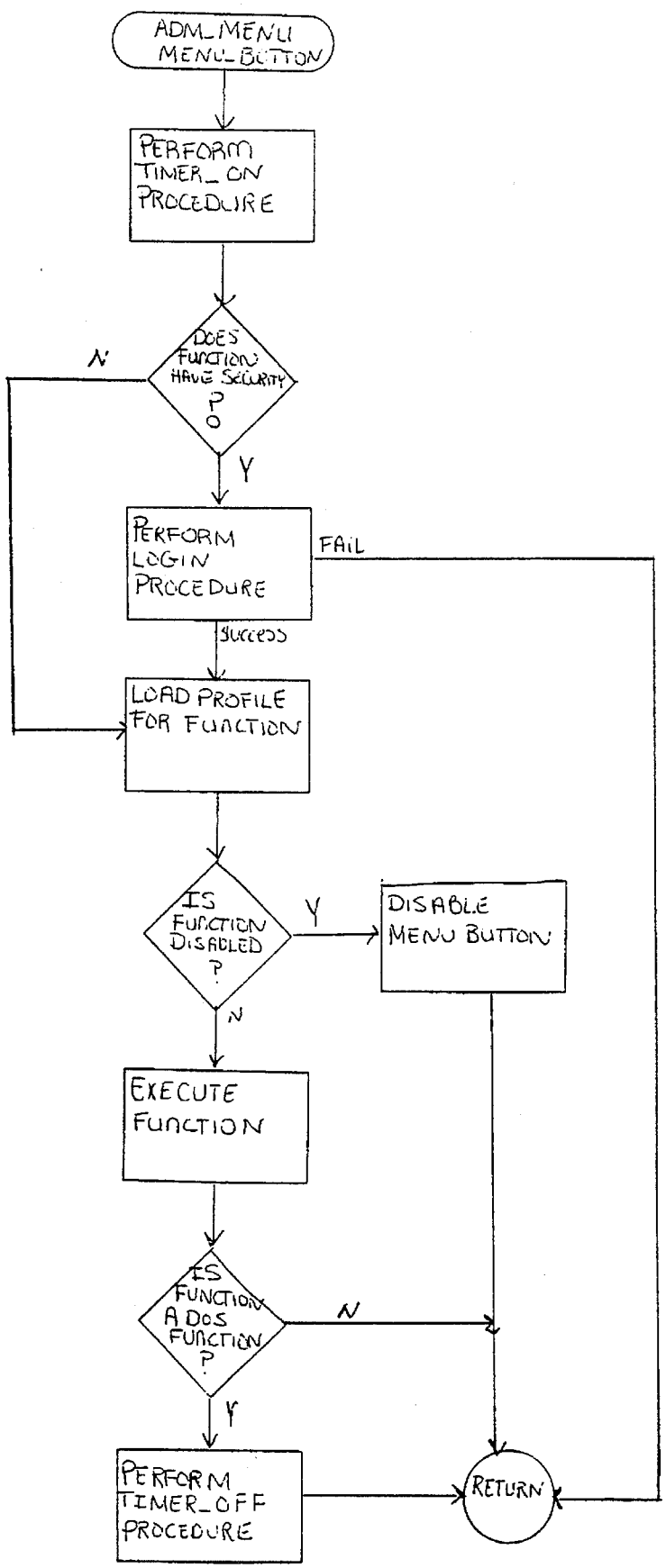
Figure B-17

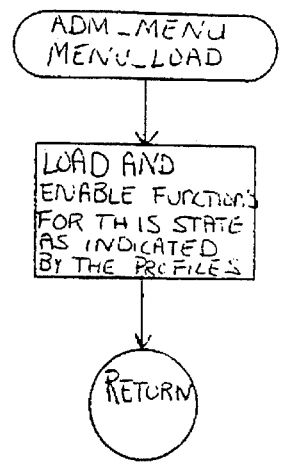
Figure B-18
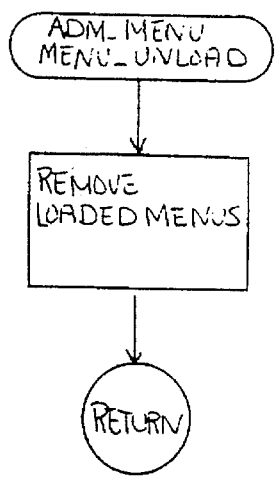
Figure B-19
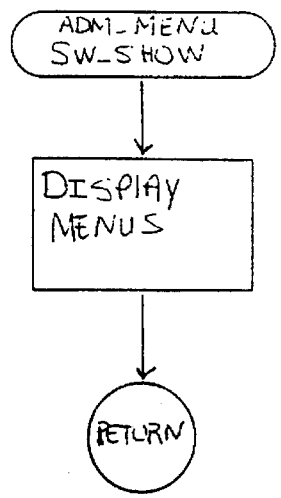
Figure B-20

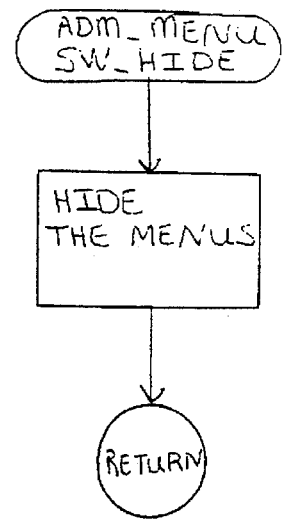
Figure B-21
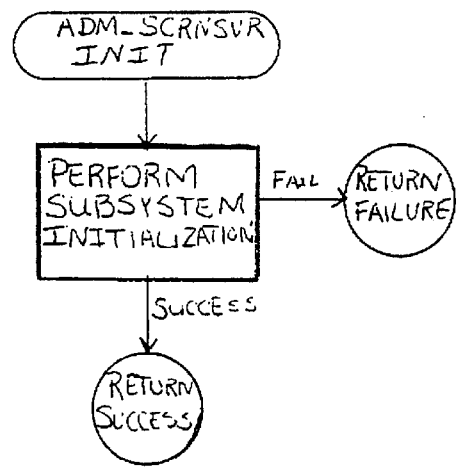
Figure B-22
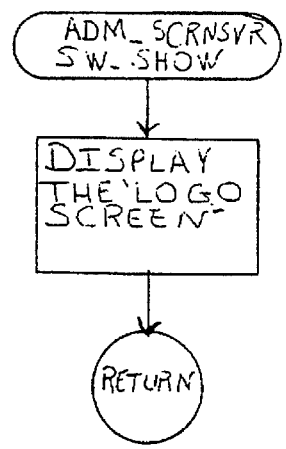
Figure B-23

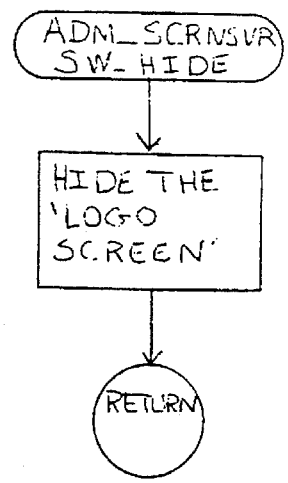
Figure B-24
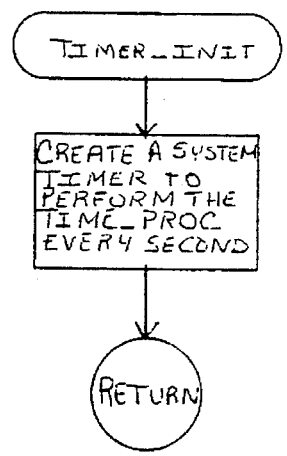
Figure B-25
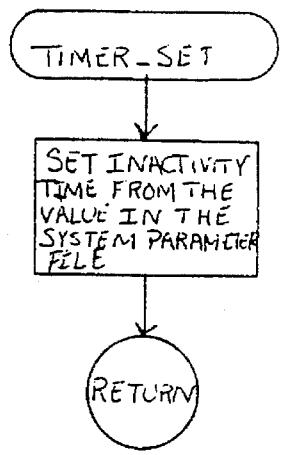
Figure B-26

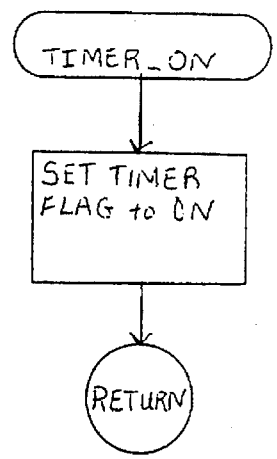
Figure B-27
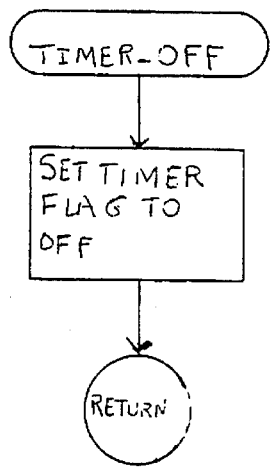
Figure B-28

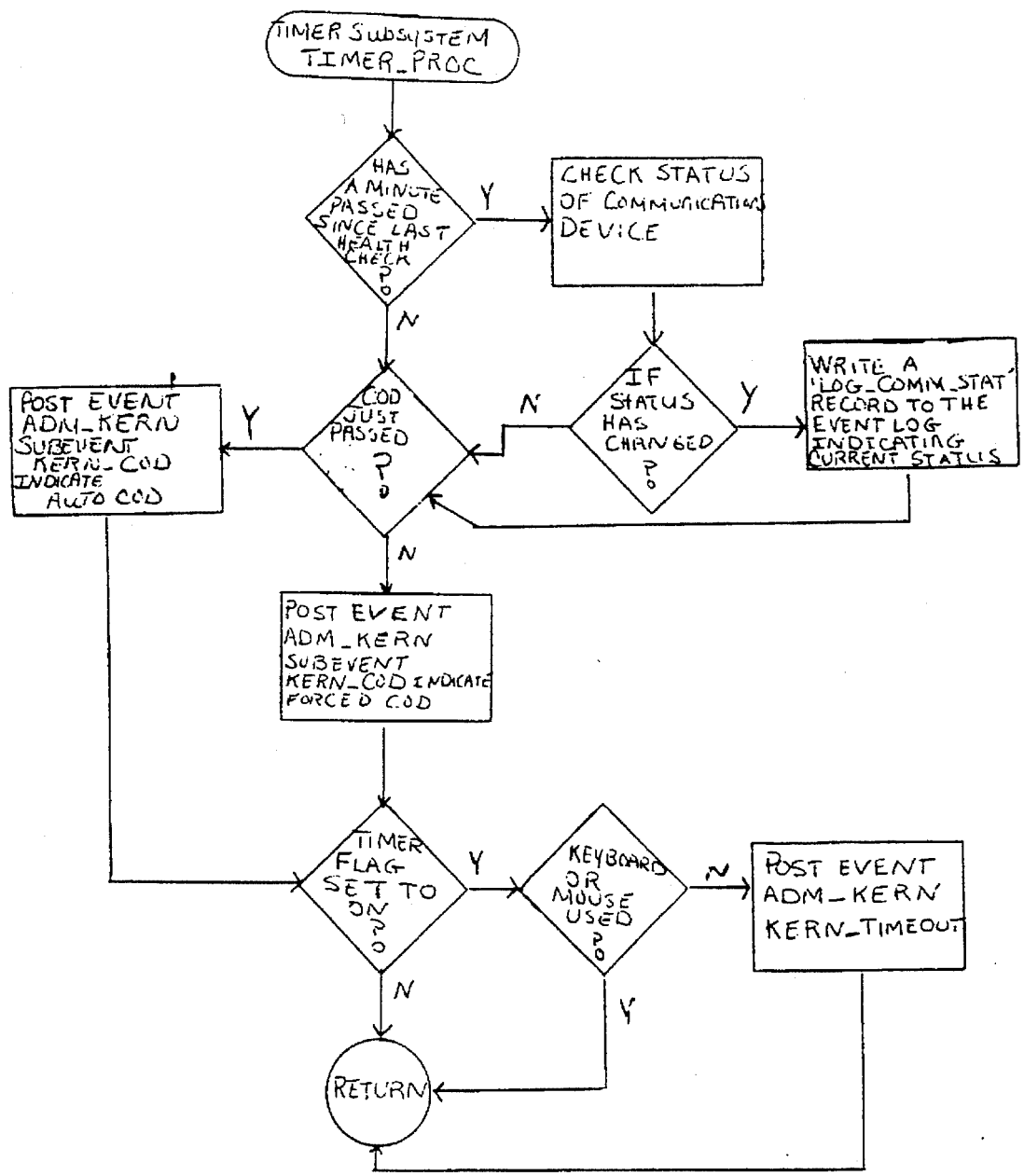
Figure B-29

APPENDIX C

Pseudo Code and Corresponding

Flowcharts for the

Test Station Kernel

Main_Procedure

A flowchart of this procedure is shown in Figure C-1.

050   Post event OSAM_TKER subevent TKER_SET_STATION to the event queue.

075   Set the system state to STATE_NULL.

100   Enable special key handling in the keyboard driver

200   Get next event from the event queue

300   If the event is END_PROGRAM

-   Continue at 1000.

400   Perform the procedure associated with the event

500   Continue at 200.

1000  Exit to operating system.

OSAM_TKER:

TKER_CLOSE

A flowchart of this procedure is shown in Figure C-2.

| | |
|---|---|
| 100 | Set current system state to STATE_CLOSE. |
| 200 | If a general timer is running |
| | - Stop the timer. |
| 300 | If the 'Kill Station' timer is running |
| | - Stop the timer. |
| 400 | Drop the current system state |
| 500 | Write a 'Stop Station' record to the event log. |
| 600 | Return to caller. |

TKER_SET_STATION

A flowchart of this procedure is shown in Figures C-3(a) and C-3(b).

100      Display a screen containing the system date and time.

200      Prompt the user to confirm the date/time.

300      Process user input

- Ok

- Continue at 400

- Cancel

- Post event OSAM_TKER subevent TKER_CLOSE to the event queue

- Continue at 2000.

400      Scan for an in-memory virus.

500      If a virus is present

- Write a record to the event log noting the presence of a virus.

- Display an error message informing the administrator that a virus was detected.

- Post event OSAM_TKER subevent TKER_CLOSE to the event queue

- Continue at 2000.

| | |
|---|---|
| 600 | Display the backdrop screen (blank with program title). |
| 700 | Set a 60 second timer (time outs handled by Timer_Procedure). |
| 800 | Display a screen by which the administrator can enter the station number. |
| 900 | Process user input |

- Ok

- Examine the Station Status files to determine if there is an active station with the same station number as just entered by the administrator.

- If any other station is assigned the same number

- Cancel the 60 second timer started in step 700, above.

- Start a new 60 second timer (time outs handled by Timer_Procedure).

- Display an error message

- Post event OSAM_TKER subevent TKER_SET_STATION to the event queue

- Continue at 1000

- Else

- Update the Station Status File to SET_STATION, NULL, NULL.

- Post event OSA_TKER subevent TKER_IDLE to the event queue.

- Continue at 1000.

- Cancel

- Post event OSAM_TKER subevent TKER_CLOSE to the event queue.

| | |
|---|---|
| 1000 | Kill the 60 second timer. |
| 1100 | Drop the current system state. |
| 1200 | Write a 'Station Up' record to the Event Log. |
| 1300 | Discard any pending 'Kill Station' signals from the Central Admin Station. |
| 1400 | Set a 60 second timer (time outs handled by Kill_Station_Timer_Procedure). |
| 2000 | Return to caller. |

TKER_IDLE

A flowchart of this procedure is shown in Figure C-4.

| | |
|---|---|
| 100 | Set the current system state to STATE_IDLE. |
| 200 | Update the Station Status File to IDLE, NULL, NULL. |
| 300 | Kill the 60 second timer. |
| 400 | Start a 6-second timer (timer ticks handled by Idle_Timer_Procedure). |
| 500 | Display the idle screen. |
| 1000 | Return to caller. |

TKER_KILL_STATION

A flowchart of this procedure is shown in Figure C-5.

| | |
|---|---|
| 100 | Discard any pending 'Kill Station' signals |
| 200 | If a Testing Station Admin has been started |
| | - Post END_PROGRAM to the Testing Station Admin's event queue. |
| 300 | Return to caller. |

TKER_START_TEST

A flowchart of this procedure is shown in Figures C-6(a) and C-6(b).

| | |
|---|---|
| 100 | Drop the current system state. |
| 200 | Set the current system state to STATE_START_TEST. |
| 300 | Load the Job Info File for this station. |
| 400 | If the Job Info File load fails |
| | - Post event OSAM_TKER subevent TKER_CLOSE to the event queue. |
| | - Drop the current system state. |
| | - Continue at 2000. |
| 500 | Update the Station Status File to START_TEST, APPOINTMENT ID, FUNCTION ID. |
| 600 | Display a screen containing a synopsis of the test about to be delivered as shown in figure C-13. |
| 700 | Wait for the Administrator to press the special key sequence to acknowledge reading the screen. |

800   If the job to be run does not have its own confirmation screen

- Display the default confirmation screen.

- Process user input

- Ok

- Continue at 900.

- Cancel

- Drop the current system state.

- Post event OSAM_TKER subevent TKER_IDLE.

- Continue at 2000.

900   Execute the job (Testing Station Admin) specified in the Job Info File.

1000  If the operating system could execute the job

- Drop the current system state.

- Post event OSAM_TKER subevent TKER_TESTING to the event queue.

- If the current job is a *not* a restart of a previously started test

- Set the test start time to the current time.

- Write an 'Event' record to the event log indicating a new test start.

- Else

- Set the test end time to 'undefined'.

- Write a 'Customer Event' record to the event log indicating a test restart.

Else

- Display an error message

- Drop the current system state

- Post event OSAM_TKER subevent TKER_IDLE to the event queue.

2000  Return to caller.

TKER_TESTING

A flowchart of this procedure is shown in Figure C-7.

| | |
|---|---|
| 100 | Set the current system state to STATE_TESTING |
| 200 | Update the Station Status File to TESTING, APPOINTMENT ID, FUNCTION ID. |
| 300 | Return to caller (program reactivated by receipt of TKER_TEST_EXIT). |

TKER_TEST_EXIT

A flowchart of this procedure is shown in Figures C-8(a) and C-8(b).

| | |
|---|---|
| 100 | Drop the current system state. |
| 200 | Set the current system state to STATE_TEST_EXIT. |
| 300 | Update the Station Status File to TEST_EXIT, APPOINTMENT ID, FUNCTION ID |
| 400 | If the return code (from Testing Station Admin) is 'Test Aborted'<br><br>- If it was not a restarted test<br><br>   - Update the appointment to show that the test is not in progress<br><br>   - Void the test start time. |
| 500 | Else<br><br>- Update the appointment with the Testing Station Admin's return code.<br><br>- Set the test end time to the current time.<br><br>- Write an 'End Customer Event' record to the event log. |
| 600 | Update the Station Status File to IDLE, NULL, NULL. |
| 700 | Set a 50 second timer (time out serviced by End_Screen_Timer_Procedure). |
| 800 | Display the Test End screen (screen display terminated by 50 second timer tick). |
| 900 | Post event OSAM_TKER subevent TKER_IDLE to the event queue. |
| 1000 | Drop the current system state. |
| 2000 | Return to caller. |

End_Screen_Timer_Procedure

A flowchart of this procedure is shown in Figure C-9.

100     Terminate display of the Test End Screen.

200     Return to caller.

Idle_Timer_Procedure

A flowchart of this procedure is shown in Figure C-10.

100     If a Job Info File exists for this station

- Kill the 6 second timer.

- Post event OSAM_TKER subevent TKER_START_TEST to the event queue.

200     Return to caller.

Kill_Station_Timer_Procedure

A flowchart of this procedure is shown in Figure C-11.

100     If a 'Kill Station' signal is waiting for this station

- Stop the 'Kill Station' timer.

- Post event OSAM_TKER subevent TKER_KILL_STATION to the event queue.

200     Return to caller.

Timer_Procedure

A flowchart of this procedure is shown in Figure C-12.

100     Terminate display of the current screen.

200     Post event OSAM_TKER subevent TKER_CLOSE to the event queue.

300     Return to caller.

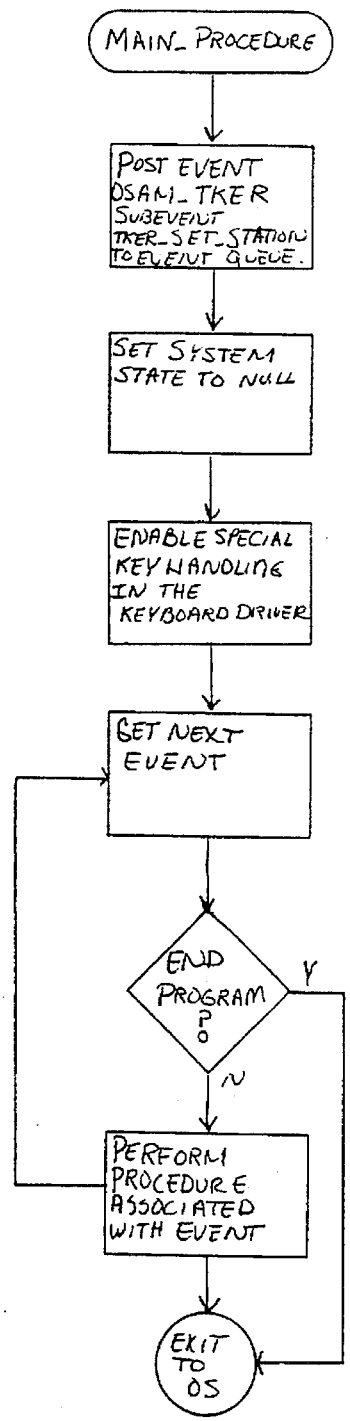
FIGURE C-1

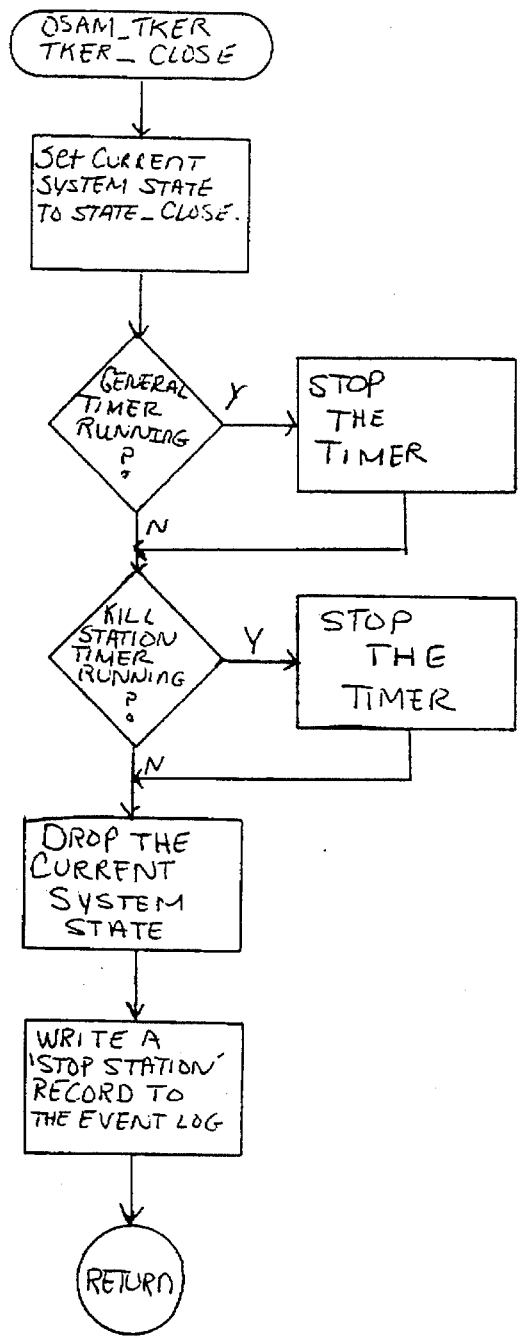
FIGURE C-2

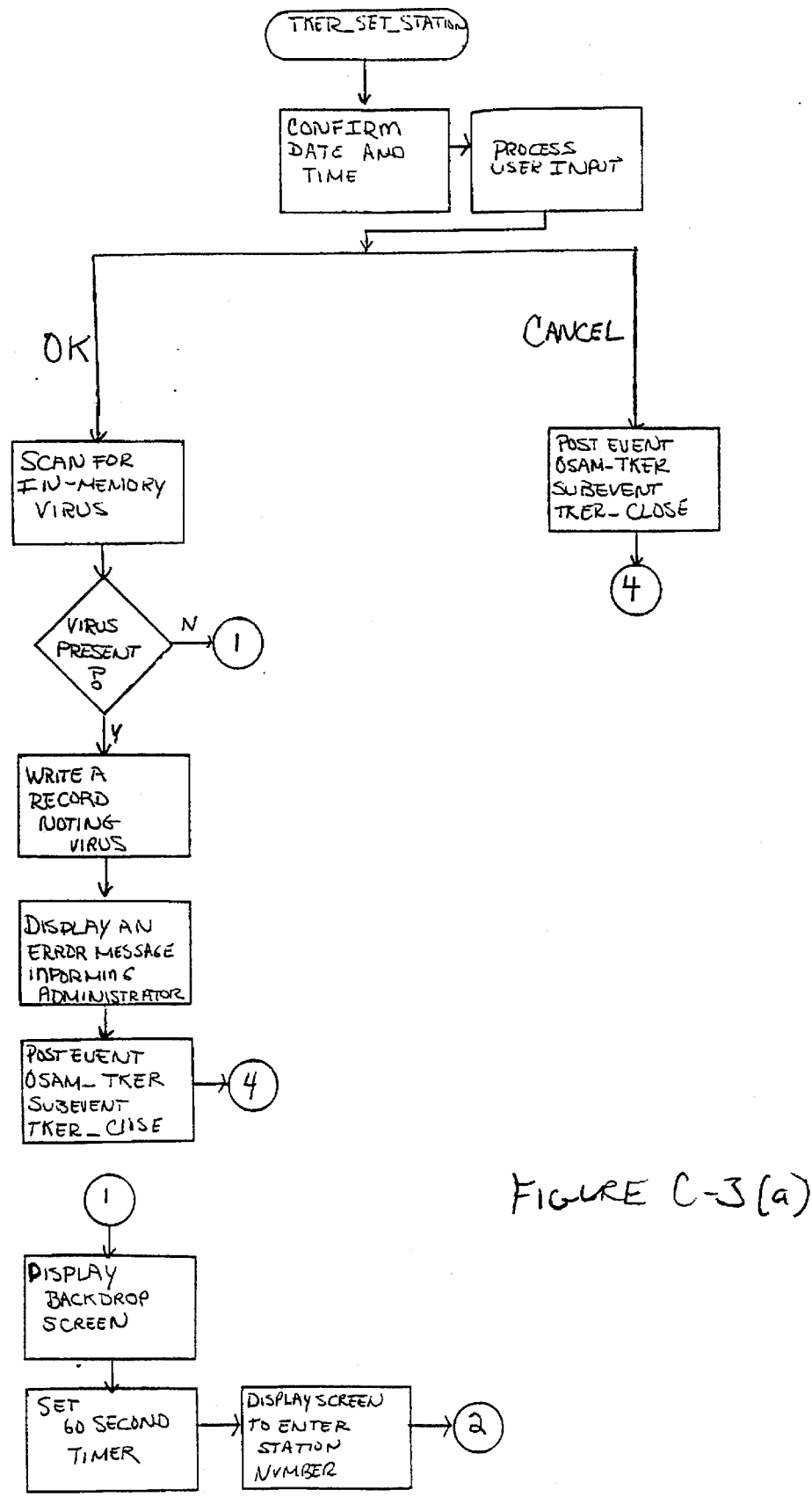
FIGURE C-3(a)

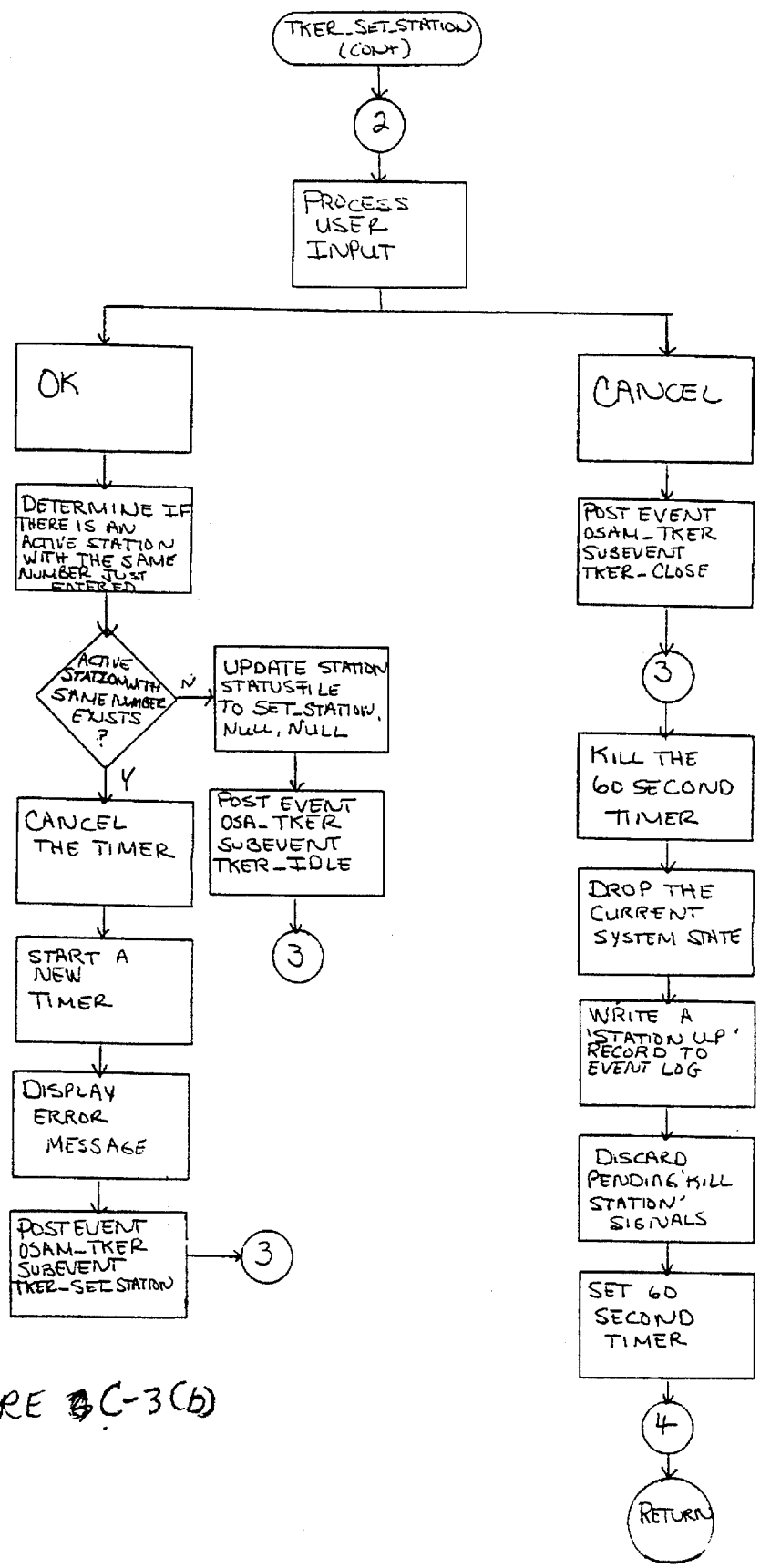
FIGURE C-3(b)

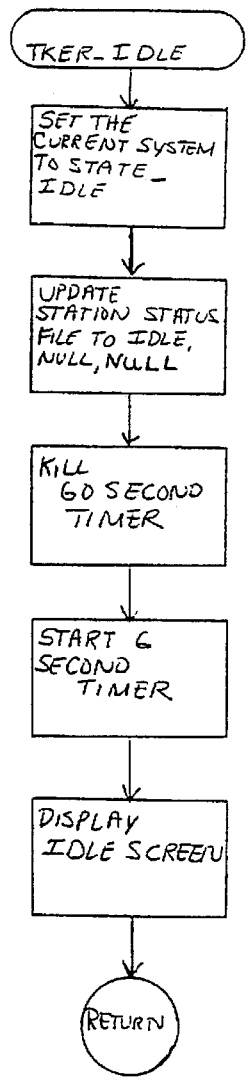
FIGURE C-4
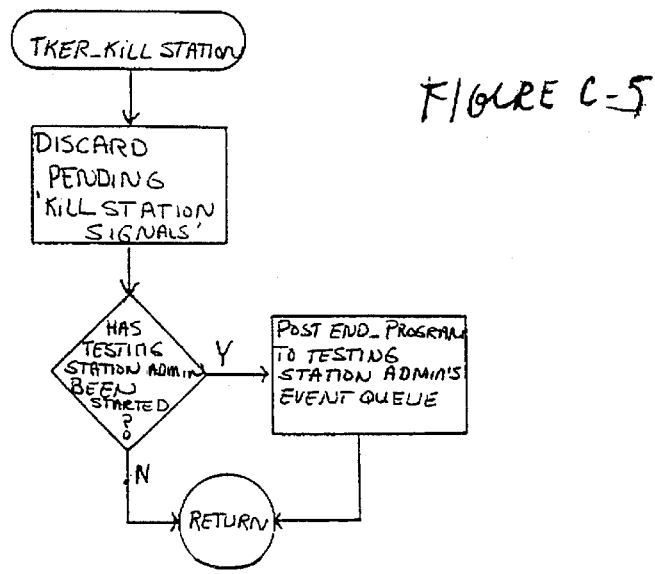
FIGURE C-5

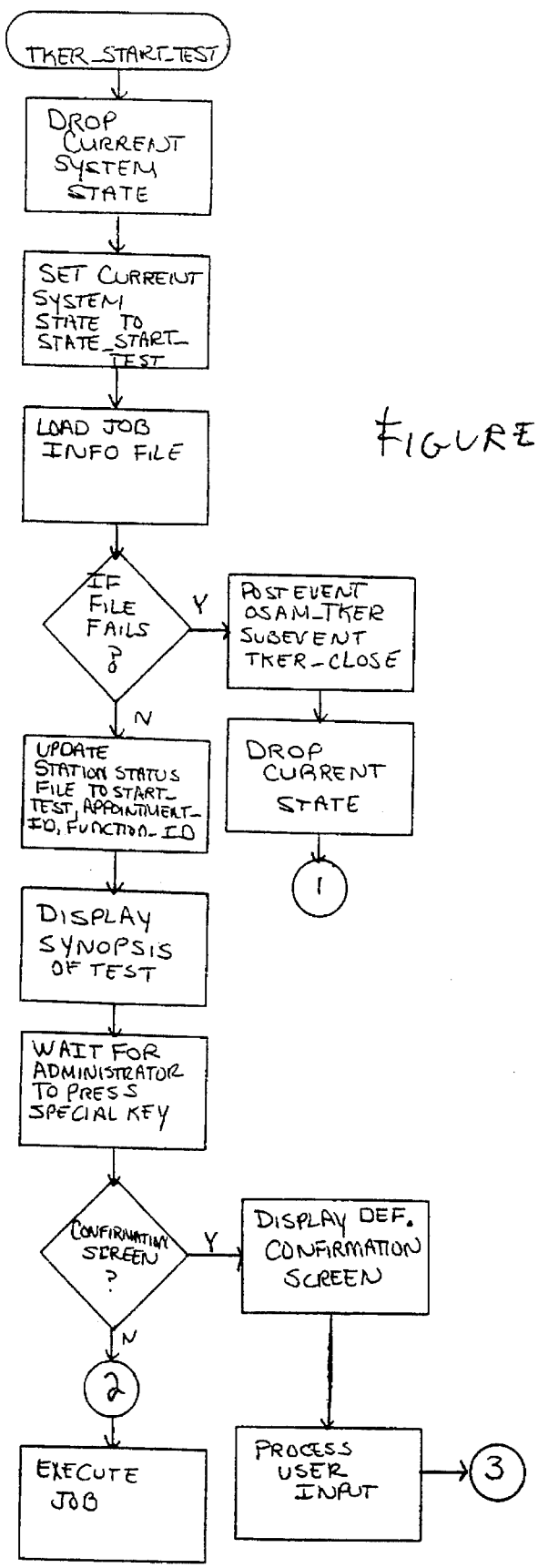
FIGURE C-6(a)

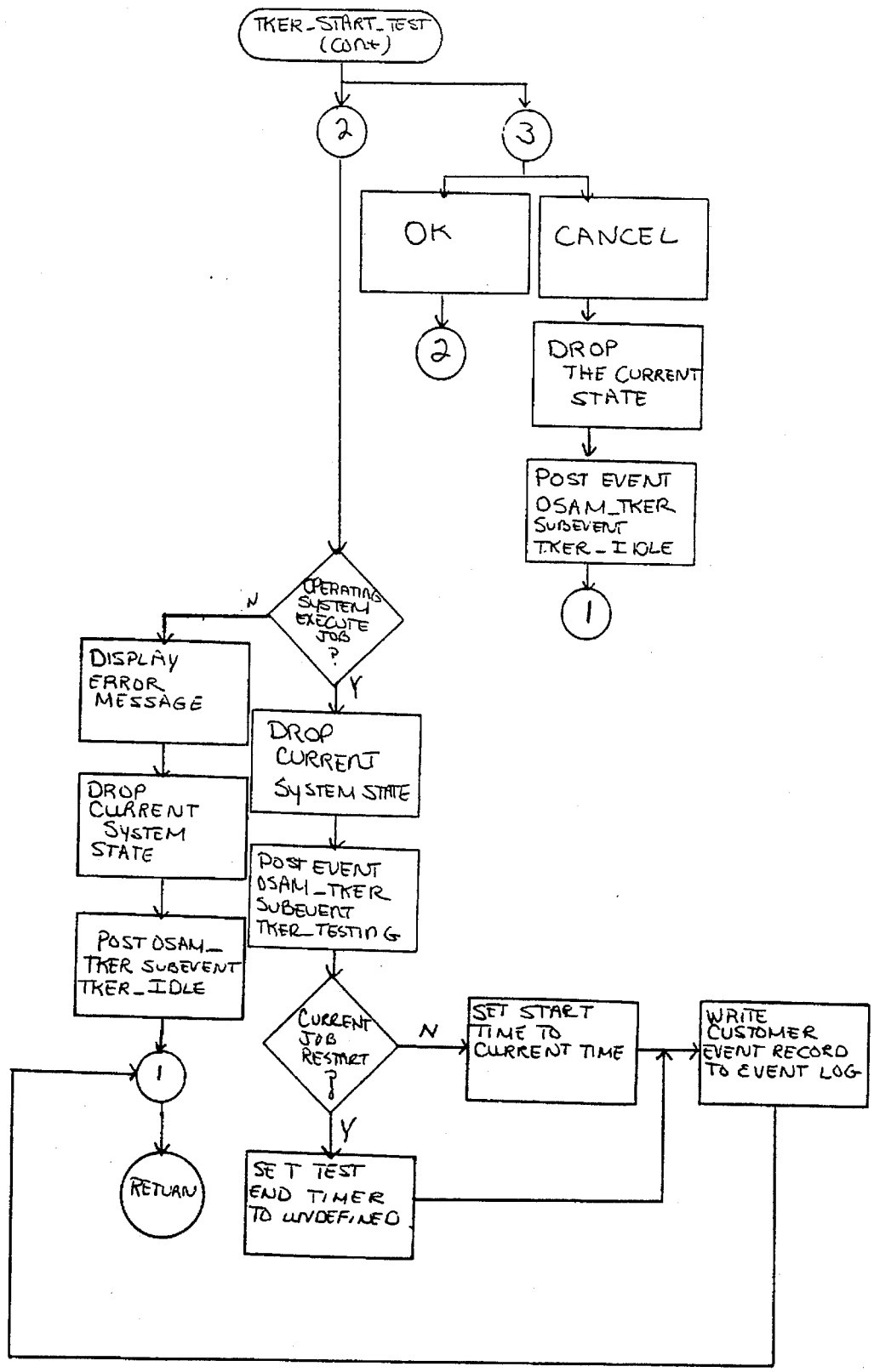
FIGURE C-6(b)

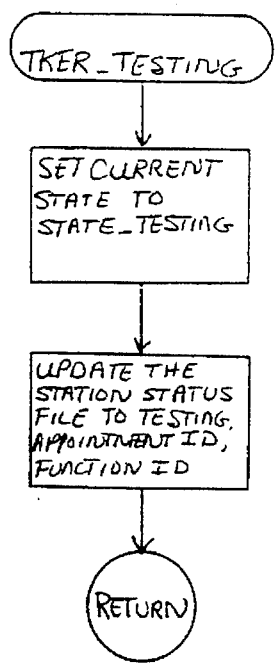
FIGURE C-7(θ)

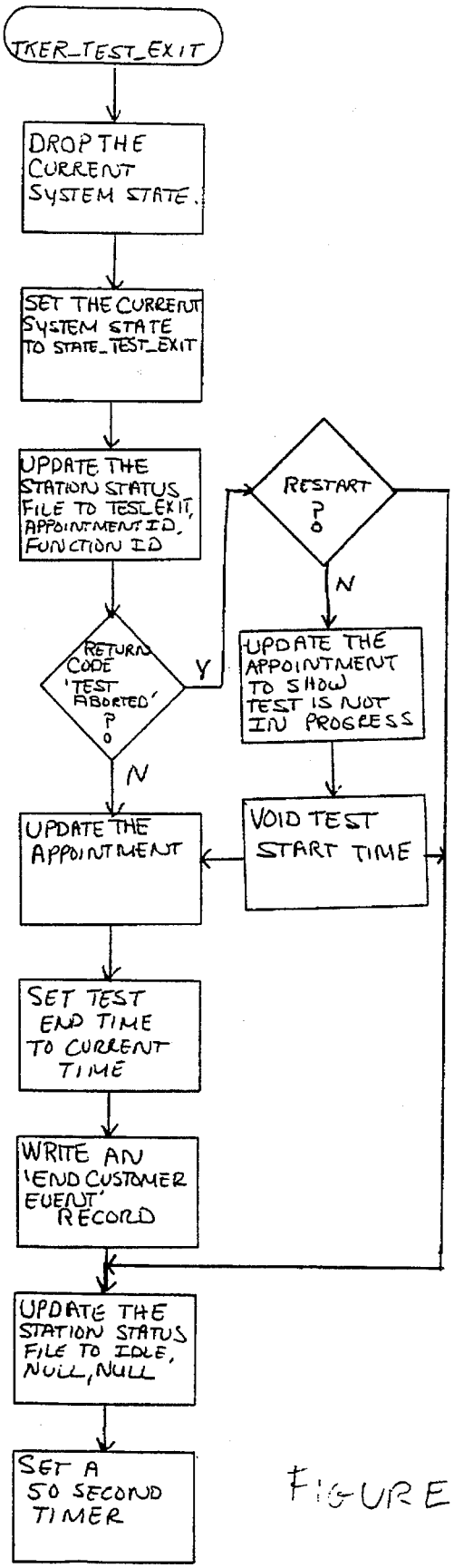
FIGURE C-8(a)

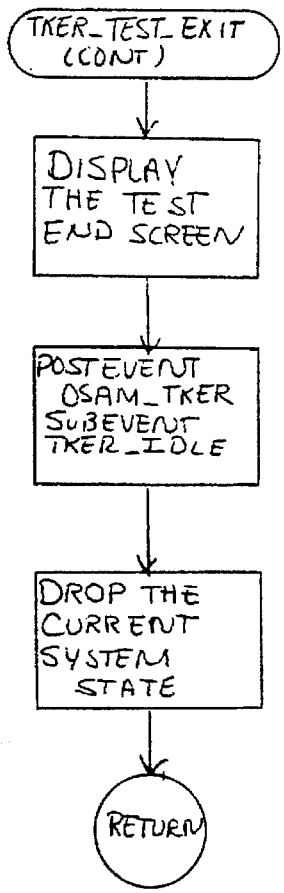
FIGURE C-8(b)

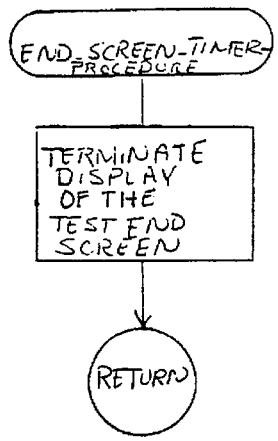
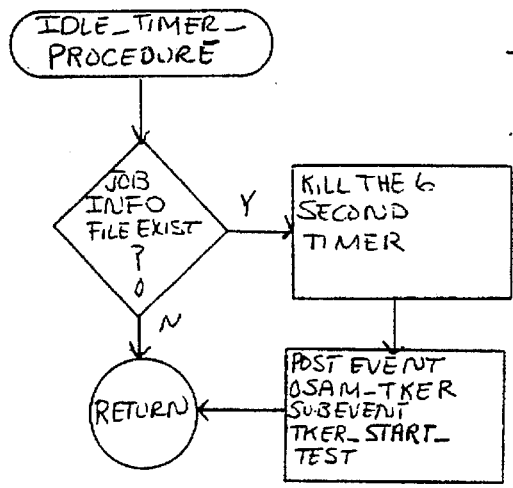
FIGURE C-9
FIGURE C-10
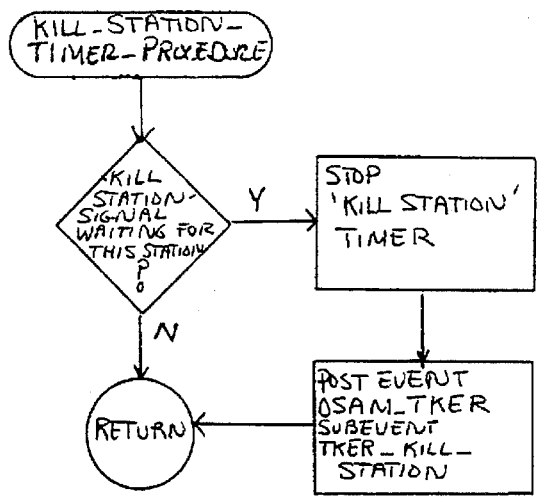
FIGURE C-11

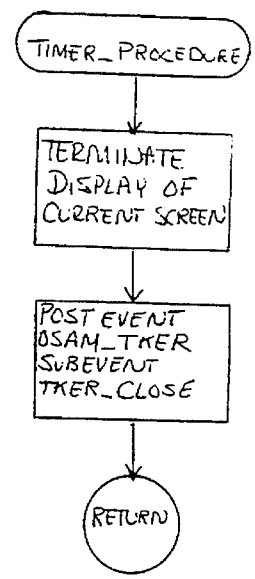
FIGURE C-12

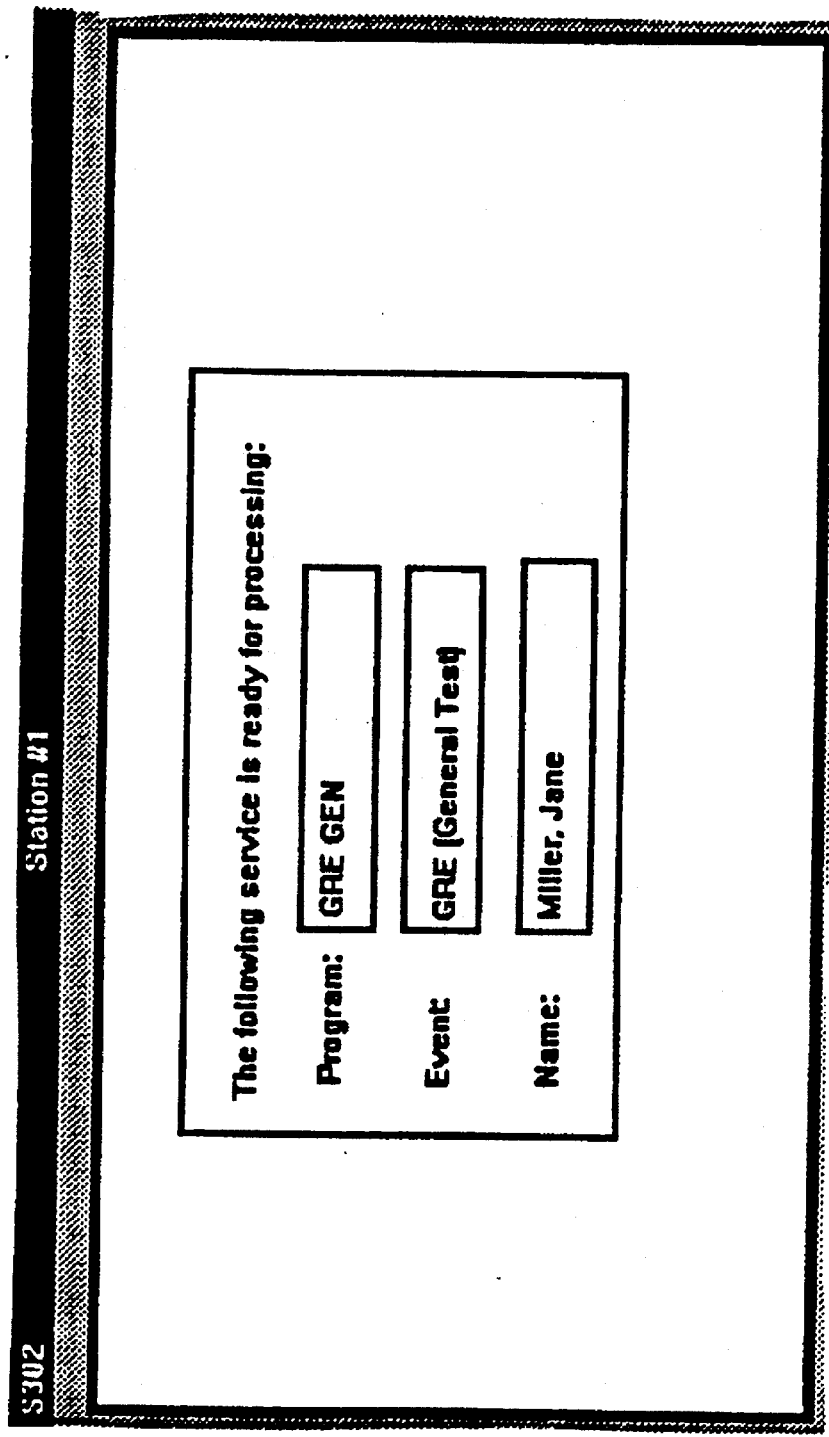
FIGURE C-13

APPENDIX D

Pseudo Code and Corresponding

Flowcharts for the

Start Service Module of the Start Test Subsystem

Main_Procedure

A flowchart of this procedure is shown in Figure D-1

100      Get next event from the event queue.

200      If the event is END_PROGRAM

-    Return to the operating system.

300      Perform the procedure associated with the event.

400      Continue at 100.

UMSG_DISPLAY

A flowchart of this program is shown in Figures D-2(a) and D-2(b).

100       Display a screen Figure 10A containing the list of appointments that are not started.

200       Process user input:

- Start Service

- If no appointment is selected on the screen depicted in Figure 10A

- Display an error message

- Continue at 200.

- Check the function (testing program) specified in the appointment. If the function is disabled

- Display an error message

- Continue at 200.

- Check that the selected appointment is checked in. If not

- Display an error message

- Continue at 200.

- Check that the station reserved for the selected appointment is ready to administer a test. If not

- Display an error message

- Continue at 200.

- If a Central Station Administration program exists for this function

- Execute the program.

- Continue at 1000 (processing reactivated by receipt of UMSG_PARENTNOTIFY).

- Else

- Post event UMSG_DISPLAYESCORT to the event queue.

- Continue at 1000.

- More Info...

- If no appointment is selected on the screen depicted in Figure 10A

- Display an error message.

- Continue at 200.

- Display the screen graphically depicted in Figure D-5.

- Process user input:

- OK

- Remove the screen displayed in the step above and restore the Figure 10A screen display.

- Continue at 200.

- Cancel

- Continue at 1000.

1000 Return to caller.

UMSG_DISPLAYESCORT

A flowchart of this procedure is shown in Figure D-3.

100 Display a screen containing an escort message, the examinee's name and the testing station number as graphically depicted in Figure 10B.

200 Process user input

- Ok

- Build the Job Data File containing the information required to start the Testing Station Administration

- Update the appointment to show that the test is in progress.

- Build the Job Info File containing information required by the Testing Station Kernel.

- Post event END_PROGRAM to the event queue.

- Continue at 1000.

- Cancel

- Post event UMSG_DISPLAY to the event queue

- Continue at 1000

1000 Return to caller.

UMSG_PARENTNOTIFY

A flowchart of this procedure is shown in Figure D-4.

100      If the Central Station Administration program returned success
- Post event UMSG_DISPLAYESCORT to the event queue
- Continue at 1000.

200      If the Central Station Administration program returned cancel
- Post event UMSG_DISPLAY to the event queue.
- Continue at 1000.

300      Else, post END_PROGRAM to the event queue

1000    Return to caller.

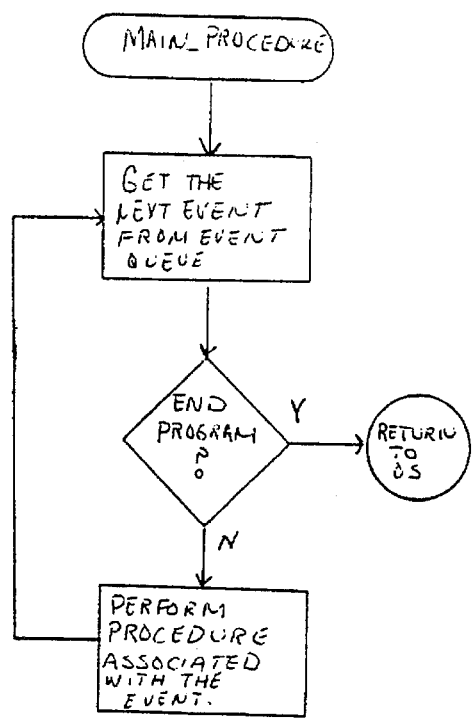
FIGURE D-1

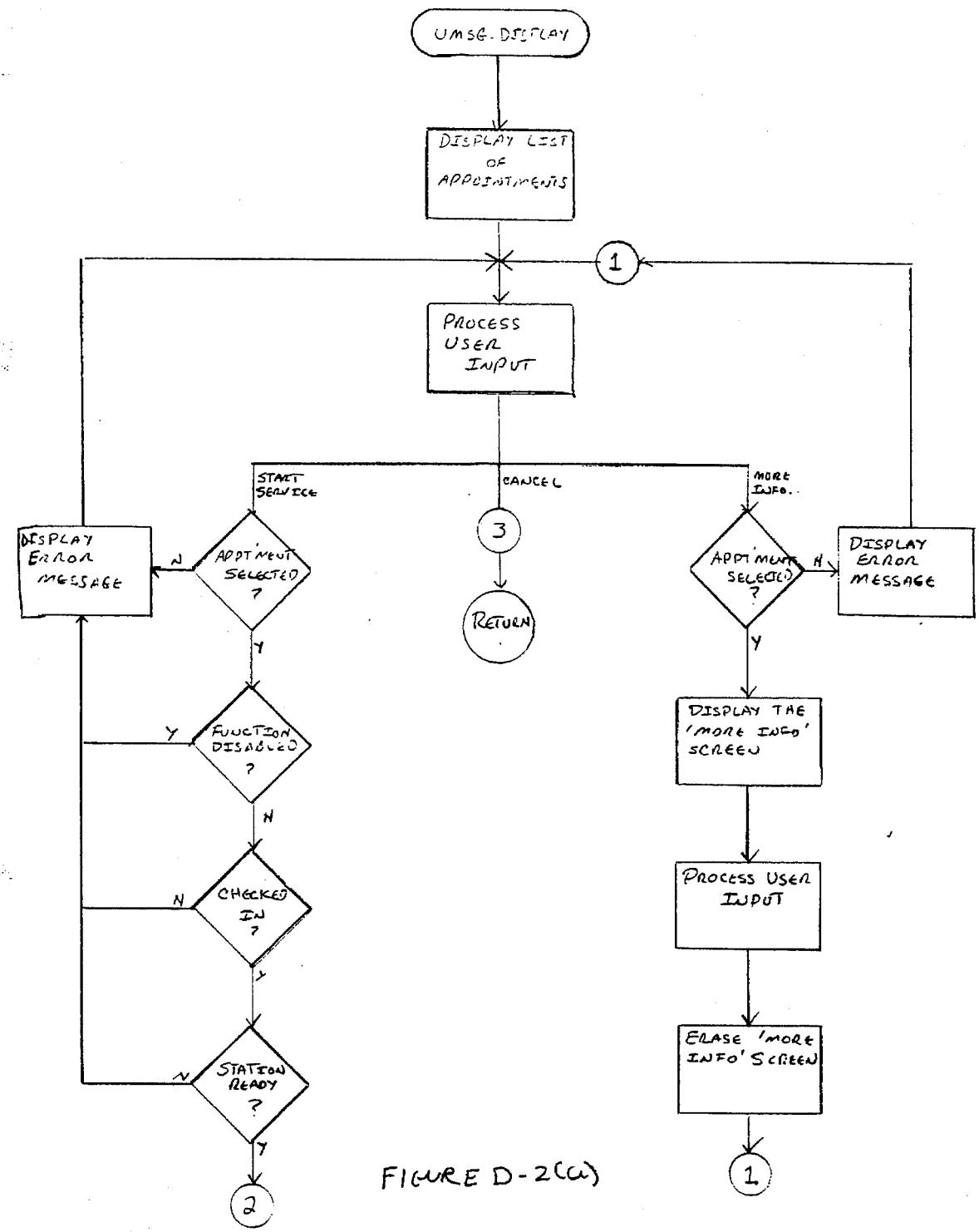
FIGURE D-2(a)

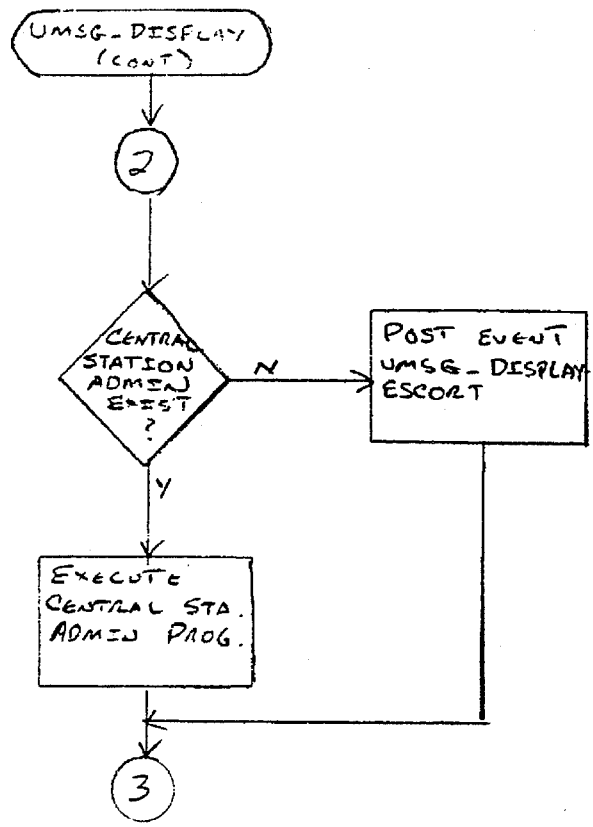
FIGURE D-2(b)

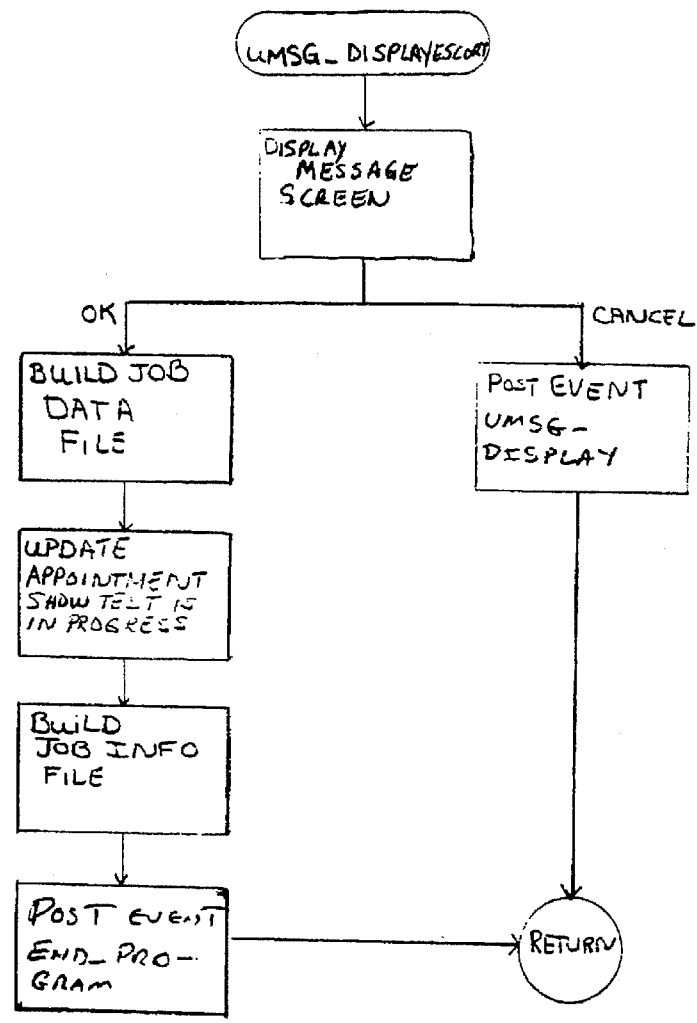
FIGURE D-3

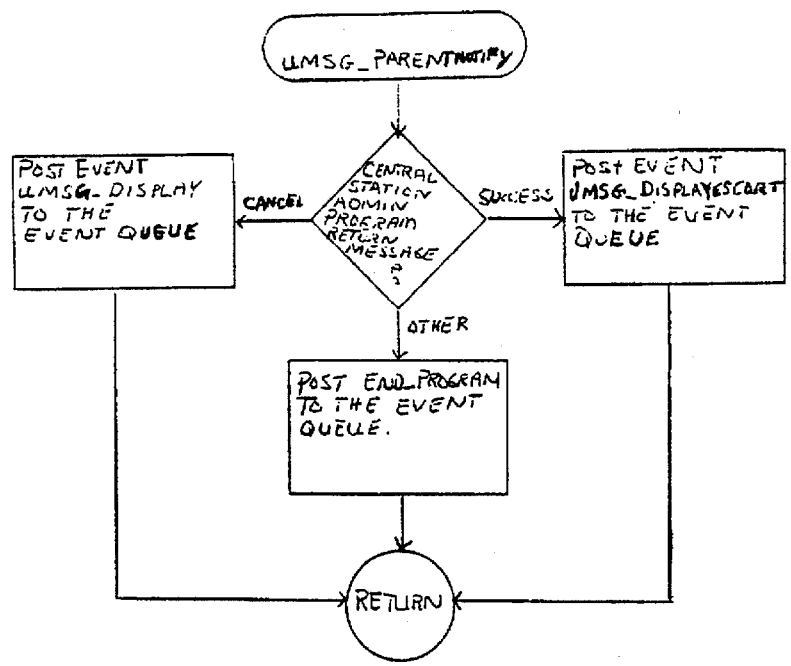
FIGURE D-4

Figure D-5

APPENDIX E

Pseudo Code and Corresponding

Flowcharts for the

General Station Administration

Module of the Start Test Subsystem

Main_Procedure

A flowchart of this procedure is shown in Figure E-1.

| | |
|---|---|
| 050 | Post event UMSG_DISPLAY to the event queue. |
| 100 | Get next event from event queue |
| 200 | If event is END_PROGRAM |
| | - Continue at 1000. |
| 300 | Perform procedure associated with the event |
| 400 | Continue at 100. |
| 1000 | Exit to operating system. |

UMSG_DISPLAY

A flowchart of this procedure is shown in Figure E-2.

100        Load the function specified for the selected appointment.

200        Select a test to deliver from among those available in this testing program: select DEMONSTRATION session, if this is a demo function; select an untimed session if the selected appointment mandates an untimed session.

300        Build a Start Session record of the Examinee Performance Record.

400        Build the Job Data File.

500        Perform event UMSG_PARENTNOTIFY in the Start Service module, now, indicating success.

600        Post event END_PROGRAM to the event queue.

700        Return to caller.

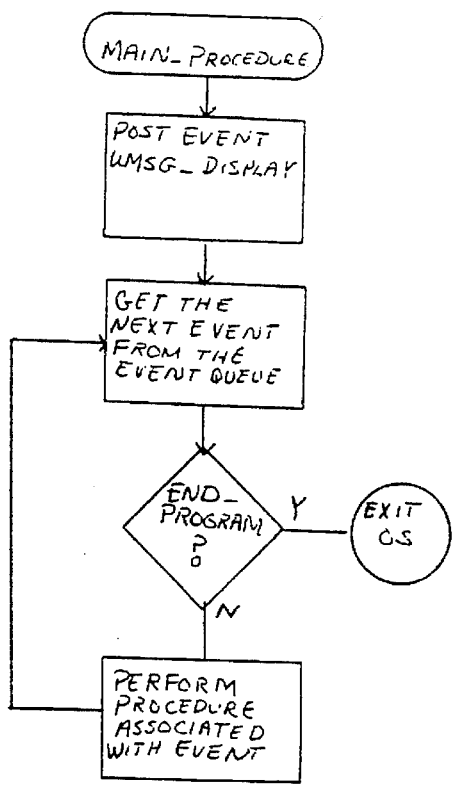
FIGURE E-1
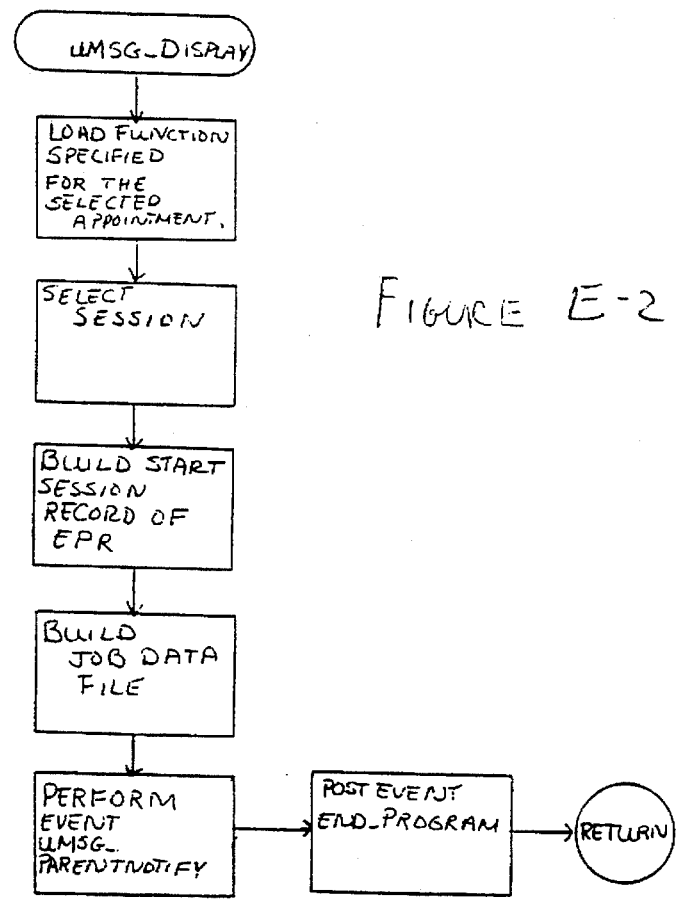
FIGURE E-2

APPENDIX F

Pseudo Code and Corresponding Flowcharts for the Testing Station Administration Subsystem

Main_Procedure

A flowchart of this procedure is shown in Figure F-1.

| | |
|---|---|
| 100 | Post event UMSG_DISPLAYCONF to the event queue. |
| 200 | Enable special key handling in the keyboard driver. |
| 300 | Get the next event from the event queue. |
| 400 | If the event is END_PROGRAM, continue at 1000. |
| 500 | Perform the procedure associated with the event. |
| 600 | Continue at 300. |
| 1000 | Exit to the operating system. |

UMSG_DISPLAYCONF

A flowchart of this procedure is shown in Figure F-2.

| | |
|---|---|
| 100 | Read in the Job Data File. |
| 200 | Display the Examinee Confirmation Screen. |
| 300 | Process user input |

- Administrative Override

- Post event -1 to the Testing Station Kernel

- Post event END_PROGRAM to the event queue.

- Continue at 1000.

- Ok

- Execute the Test Delivery Application (TDA)

- Continue at 1000

1000    Return to caller.

END_TDA

A flowchart of this procedure is shown in Figure F-3.

100    Process the TDA return code:

- Normal End

- If this function returns Examinee Performance Records

- Send the EPR file to the communications manager for transmission to the data center.

- Erase the EPR file, if the communication was successful.

- If there is a photo for this candidate

- Send the photo to communications manager for transmission to the data center.

- Erase the photo file if the communication was successful.

Else

- Remove the EPR and any photo file.

- Remove the Job Data File(s).

- Post event OSAM_TKER subevent TKER_TEST_EXT to the

Testing Station Kernel with parameter 'Test Complete'.

- Continue at 1000.

- Supervisor Quit

- Update the Job Data File to indicate that the job is restartable.

- Post event OSAM_TKER subevent TKER_TEST_EXT to the Testing Station Kernel with parameter 'Supervisor Quit'.

- Continue at 1000.

- Examinee Quit

- Update the Job Data File to indicate that the job is restartable.

- Post event OSAM_TKER subevent TKER_TEST_EXT to the Testing Station Kernel with parameter 'Examinee Quit'.

- Continue at 1000.

- Fatal Error

- Update the Job Data File to indicate that the job is restartable.

- Post event OSAM_TKER subevent TKER_TEST_EXT to the Testing Station Kernel with parameter 'System Error'.

- Continue at 1000.

1000    If an error file was created during execution of the Test Delivery Application

- Send the error file to the communications manager for transmission to the data center.

- Erase the error file if the communication was successful.

1100    Return to caller.

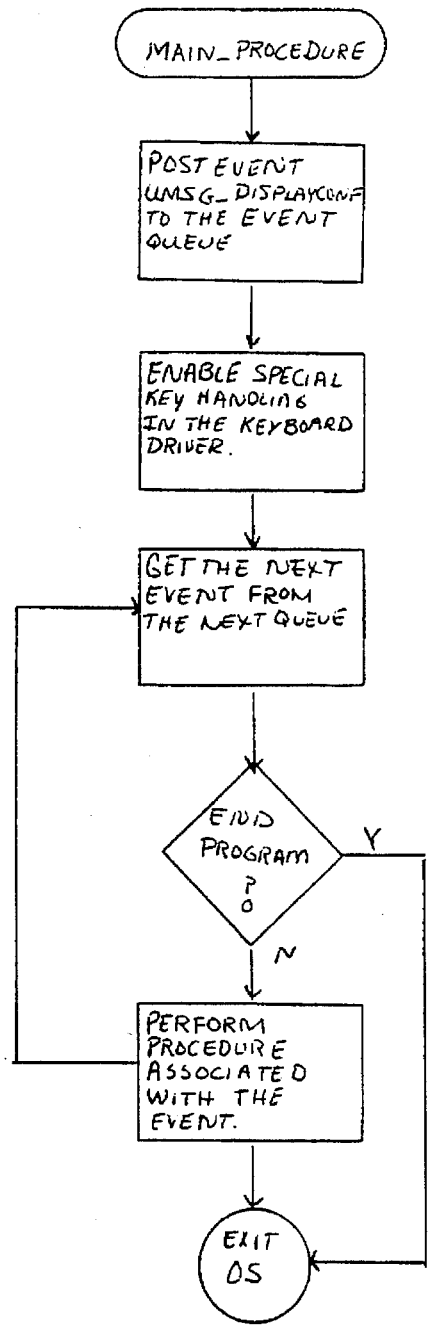
Figure F-1

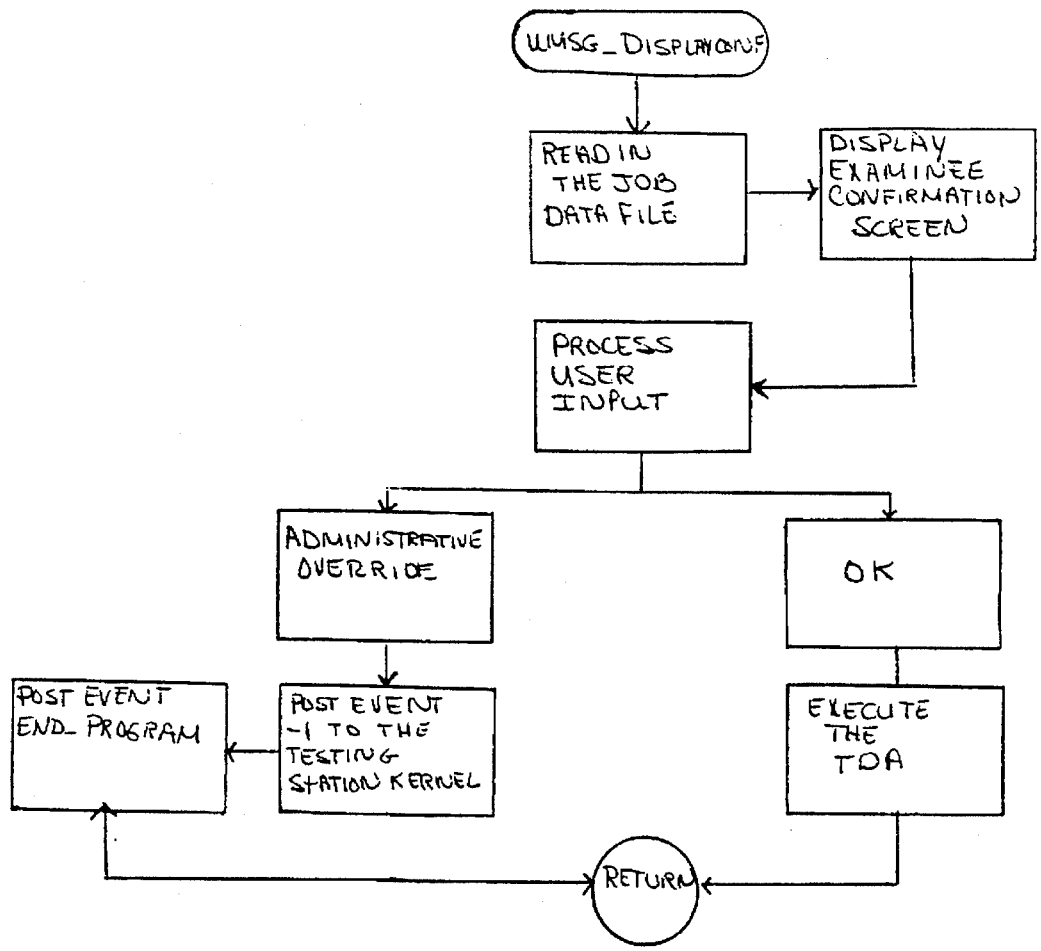
Figure F-2

We claim:

1. A centralized administrative system having a central administration workstation for administering computer based tests to a plurality of examinees on at least one testing workstation, each examinee having an appointment to take a selected computer based test, said appointment being scheduled by a scheduling and registration module, the system comprising:

a plurality of profiles having information identifying and relating to the administrative functions available to said centralized administrative system, wherein said functions are enabled, disabled, and modified based on the information provided by said profiles;

a start-of-day (SOD) subsystem for executing said administrative functions identified by at least some of said plurality of profiles and for receiving an input from said scheduling and registration module, said input being related to an identification and a respective appointment of each examinee, said input defining appointment data;

a check-in subsystem coupled to said SOD subsystem for receiving an input of said appointment data and for confirming said appointment data with each said examinee upon each said examinee's arrival to take said selected computer based test;

a start service module coupled to said SOD and said check-in subsystems for creating a job info file having testing data needed to invoke the selected computer based test after each said examinee's arrival and;

a test station kernel coupled to said start service module for detecting the job info file after said start service module creates said job info file and thereafter initiating the execution of administrative functions identified by at least some of said plurality of profiles and the delivery of said selected computer based test using an appropriate test delivery application.

2. The system of claim 1, wherein said central administration workstation having a display and being remote from each of said testing workstations is provided, the system further comprising:

a start-up procedure for initializing said central administration workstation and for displaying a menu from which said SOD subsystem and said check-in subsystem are executable by an authorized administrator, said start-up procedure, said SOD subsystem, said start service module, and said check-in subsystem being initiated from said central administration workstation.

3. The system of claim 1, wherein a central administration workstation having a display and being remote from each of said testing workstations is provided, said testing workstations and said central administration workstation being coupled to a file server providing program and data storage for both said testing workstations and said central administration workstation.

4. The system of claim 3, wherein said file server provides substantially all of the storage for said centralized administrative system.

5. The system of claim 1, wherein said appropriate test delivery application generates at least one log record, the system further comprising:

a close-of-day subsystem for transmitting said log records so generated to an appropriate post processing system.

6. A method of administering a standardized test using a computer based testing system, said standardized test being given to a plurality of examinees at least one location defining a test center, each said test center providing at least one testing workstation on which said standardized test is deliverable to each of said plurality of examinees in the form of a testing session and a central administration workstation from which said standardized test is administered, comprising the steps of:

storing a plurality of profiles having information identifying and relating to the administrative functions available for execution from said testing and said central administration workstations, wherein said functions are enabled, disabled, and modified based on the information provided by said profiles;

invoking an automated administrative system of said computer based testing system to render said administrative system operative by logging onto said central administration workstation using a unique login identification (ID);

executing a system start-up procedure comprising the steps of:

executing said administrative functions identified by at least some of said plurality of profiles, and receiving an input of appointment data identifying each examinee scheduled to take said standardized test at said one of said test centers over a specified period of time;

verifying said appointment data associated with each examinee upon each examinee's arrival at said one of said test center to take said standardized test;

providing an indication to said administrative system, upon said verification of said appointment data, that said examinee is ready for testing;

initiating the delivery of said standardized test to said examinee on said one of said testing workstations such that questions are presented to said examinee and said examinee provides responses to said questions, said responses being recorded in an examinee performance file; and transmitting said examinee performance file to an appropriate post processing system so that said responses can be scored.

7. The method of claim 6, further comprising the steps of:

assigning each one of said testing workstations for each appointment; and logging onto each testing workstation having at least one assigned appointment using a predetermined login ID different from said unique login ID.

8. The method of claim 6, further comprising the following steps:

generating a job info file having data identifying said standardized test said examinee is scheduled to take;

detecting the existence of said job info file so generated; and said step of initiating the delivery of said standardized test being automatically carried out upon said detection of said job info file.

9. The system of claim 8, further comprising the steps of:

receiving a status input after the delivery of said standardized test is terminated, said status input indicating whether said testing session was terminated prematurely:

providing an indication within said job info file that said standardized test is restartable, if said status input indicates that said standardized test being delivered to said examinee was terminated prematurely; and restarting said standardized test for said examinee if said job info file indicates that said standardized test is restartable.

10. The method of claim 6, further comprising the steps of:

generating an irregularity report having information related to conditions at said one of said test centers and related to conditions of said testing workstation during each testing session; and transmitting said irregularity report to said post processing system.

11. The method of claim 6, further comprising the steps of:

generating security log records at substantially any time while said automated administrative system is operative, said security log records having information related to the security of said standardized tests, said computer based system, and said testing sessions; and transmitting said security log records to an operations center having a capability for monitoring activities at said one test center.

12. An automated administrative system for carrying out administrative events in accordance with an administrative process associated with the delivery of computer based tests to a plurality of examinees at at least one test center, comprising:

a central administration workstation having an administration display and being capable of executing an administrative kernel for invoking said administrative system from an operating system of said central administration workstation and for displaying a menu of administrative options selectable by a test administrator wherein said administrative kernel including a plurality of profiles having information identifying and relating to the administrative functions available to said central administrative workstation, wherein said functions are enabled, disabled, and modified based on the information provided by said profiles;

at least one testing workstation coupled to said central administration workstation and having a test display and being capable of executing a test station kernel for invoking the delivery of said computer based tests, and a test administration subsystem for updating the status of said administrative events when said administrative events are carried out in accordance with the administrative process and informing the administrative kernel of said status; and a file server coupled to said central administration workstation and said at least one testing workstation for storing said administrative kernel, said test station kernel, said test administration subsystem and said computer based tests.

13. The system of claim 12, wherein said plurality of examinees have registered to take at least one computer based test, each said examinee scheduling an appointment to take said computer based test, said appointment being selectable by said test administrator when said examinee arrives at the test center for said scheduled computer based test, said central administration workstation being configured to run a start service module for verifying the status of the scheduled computer based test and the status of the examinee and for initiating a delivery of said at least one computer based test based upon said appointments.

14. The system of claim 13, wherein said central administration workstation is configured to run a general administration station module for creating a job info file having information identifying one appointment and a status of said one appointment.

15. The system of claim 14, wherein said testing kernel detects said job info file so generated and invokes a test station administration program for initiating the delivery of said scheduled computer based test.

16. The system of claim 13, wherein said start service module generates, for each selected appointment, a job data file having data related to said scheduled computer based test.

17. The system of claim 12, wherein the selectable administrative options include at least one of:

a restart test service for restarting at least one computer based test which had been prematurely terminated from a point in the administrative process at which the computer based test was terminated; and an irregularity report generator for generating a report having information related to conditions at said test center.

18. The system of claim 12, wherein said computer based tests are given to examinees utilizing a computer based testing system, said computer based testing system generating at least one of 1) examinee performance records having information related to responses provided by one of said examinees, 2) security log records having information related to the security of the computer based test and the computer based testing system, and 3) an irregularity record having information related to conditions of said testing workstations and said test center, the system further comprising:

a communications manager for transmitting said examinee performance records, said security log records and said irregularity records to an independent data center utilized for administering said computer based tests at said at least one test center.

19. The system of claim 12, wherein said central administration workstation is configured to receive on-line messages from at least an independent data center.

20. The system of claim 12, wherein said system further includes a system maintenance program which can be executed from said central administration workstation.

* * * * *

UNITED STATES PATENT AND TRADEMARK OFFICE
CERTIFICATE OF CORRECTION

PATENT NO. : 5,513,994

DATED : May 7, 1996

INVENTOR(S) : Roger C. KERSHAW et al.

Page 1 of 3

It is certified that error appears in the above-indentified patent and that said Letters Patent is hereby corrected as shown below:

At column 1, line 57, insert --of-- after "many";

At column 2, line 23, delete "Sylvam" and insert --Sylvan--;

At column 8, line 22, delete "35" at the beginning of the line;

At column 9, line 49, delete "Testing" and insert --Test--;

At column 10, line 18, delete "," after the word "module";

At column 12, line 8, insert --to either reset his or her-- after "administrator";

At column 12, line 9, delete "to reset his or her";

Delete columns 17 and 18;

After column 190, insert attached Figure F-3;

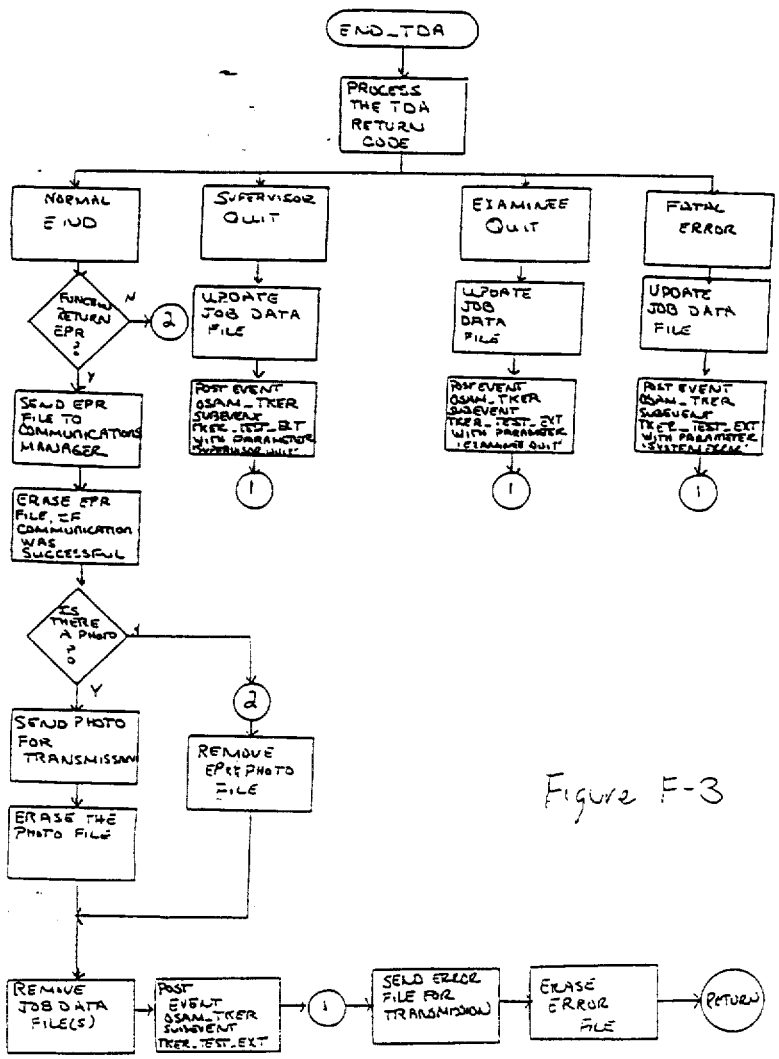
Figure F-3

UNITED STATES PATENT AND TRADEMARK OFFICE
CERTIFICATE OF CORRECTION

PATENT NO. : 5,513,994
DATED : May 7, 1996
INVENTOR(S) : Roger C. Kershaw et al.

It is certified that error appears in the above-indentified patent and that said Letters Patent is hereby corrected as shown below:

At column 191, line 1 of claim 3, delete "a" and insert --said--;

At column 191, line 3 of claim 6, insert --at-- after "examinees";

At column 192, line 5 of claim 9, delete ":" and insert --;--;

At column 193, line 11 of claim 12, insert --,-- after "administrator".

Signed and Sealed this

Tenth Day of September, 1996

Attest:

BRUCE LEHMAN

*Attesting Officer*     *Commissioner of Patents and Trademarks*